(12) United States Patent
Kako et al.

(10) Patent No.: US 8,986,881 B2
(45) Date of Patent: Mar. 24, 2015

(54) ENERGY STORAGE ELEMENT, METHOD OF PRODUCING ENERGY STORAGE ELEMENT, AND NON-AQUEOUS ELECTROLYTE

(71) Applicant: GS Yuasa International Ltd., Kyoto (JP)

(72) Inventors: Tomonori Kako, Kyoto (JP); Sumio Mori, Kyoto (JP); Kenta Nakai, Kyoto (JP); Akihiko Miyazaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 93 days.

(21) Appl. No.: 13/739,170

(22) Filed: Jan. 11, 2013

(65) Prior Publication Data

US 2013/0183580 A1 Jul. 18, 2013

(30) Foreign Application Priority Data

Jan. 16, 2012 (JP) ................................. 2012-006537
Mar. 29, 2012 (JP) ................................. 2012-076129
Mar. 29, 2012 (JP) ................................. 2012-076218

(51) Int. Cl.
*H01M 10/26* (2006.01)
*H01M 10/0567* (2010.01)
(Continued)

(52) U.S. Cl.
CPC ............ *H01M 10/056* (2013.01); *H01M 4/505* (2013.01); *H01M 4/131* (2013.01);
(Continued)

(58) Field of Classification Search
CPC ..................... H01M 10/0567; H01M 10/0525; H01M 4/131; H01M 4/1391; H01M 4/505; H01M 4/525
USPC ................................. 429/206, 226, 223, 224
See application file for complete search history.

(56) References Cited

U.S. PATENT DOCUMENTS

2003/0008213 A1 1/2003 Cho
(Continued)

FOREIGN PATENT DOCUMENTS

| EP | 2528152 | 11/2012 |
| JP | 2005-285491 | 10/2005 |
| JP | 2005-285492 | 10/2005 |
| JP | 2008-010183 | 1/2008 |
| JP | 2010-050079 | 3/2010 |
| JP | 2011-222193 | 11/2011 |

(Continued)

OTHER PUBLICATIONS

Extended European Search Report mailed on Mar. 22, 2013 for the corresponding European patent application No. 13150723.8.

*Primary Examiner* — Jonathan Jelsma
(74) *Attorney, Agent, or Firm* — Rankin, Hill & Clark LLP

(57) ABSTRACT

An energy storage element, wherein a non-aqueous electrolyte contains lithium difluorobis(oxalato)phosphate that is a first additive represented by Formula (1):

[Formula 1]

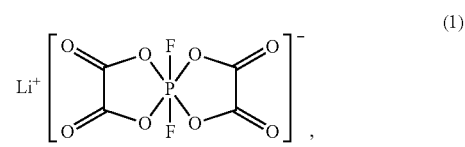

and
lithium tetrafluorooxalatophosphate that is a second additive represented by Formula (2):

[Formula 2]

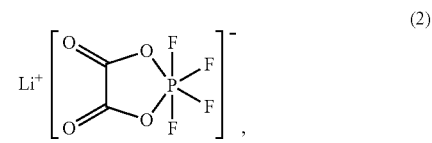

wherein the amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added.

11 Claims, 19 Drawing Sheets

(51) Int. Cl.
  *H01M 4/131* (2010.01)
  *H01M 10/056* (2010.01)
  *H01M 4/505* (2010.01)
  *H01M 4/133* (2010.01)
  *H01M 4/1391* (2010.01)
  *H01M 4/1393* (2010.01)
  *H01M 10/0525* (2010.01)
  *H01M 10/44* (2006.01)

(52) U.S. Cl.
  CPC ............ *H01M 4/133* (2013.01); *H01M 4/1391* (2013.01); *H01M 4/1393* (2013.01); *H01M 10/0525* (2013.01); *H01M 10/0567* (2013.01); *H01M 10/44* (2013.01); *Y02E 60/122* (2013.01)
  USPC ............ 429/206; 429/223; 429/224; 429/226

(56) References Cited

U.S. PATENT DOCUMENTS

| | | |
|---|---|---|
| 2005/0233222 A1 | 10/2005 | Yanagida et al. |
| 2009/0081557 A1 | 3/2009 | Chen et al. |
| 2009/0239146 A1 | 9/2009 | Nakagawa et al. |
| 2010/0128415 A1* | 5/2010 | Ando et al. ............... 361/505 |
| 2011/0236768 A1 | 9/2011 | Tani |
| 2013/0022880 A1 | 1/2013 | Tsujioka et al. |
| 2013/0071731 A1 | 3/2013 | Tokuda et al. |

FOREIGN PATENT DOCUMENTS

| | | |
|---|---|---|
| WO | 2010-067549 | 12/2009 |
| WO | 2011/125397 | 10/2011 |
| WO | 2011/142410 | 11/2011 |

* cited by examiner

FIG. 5A

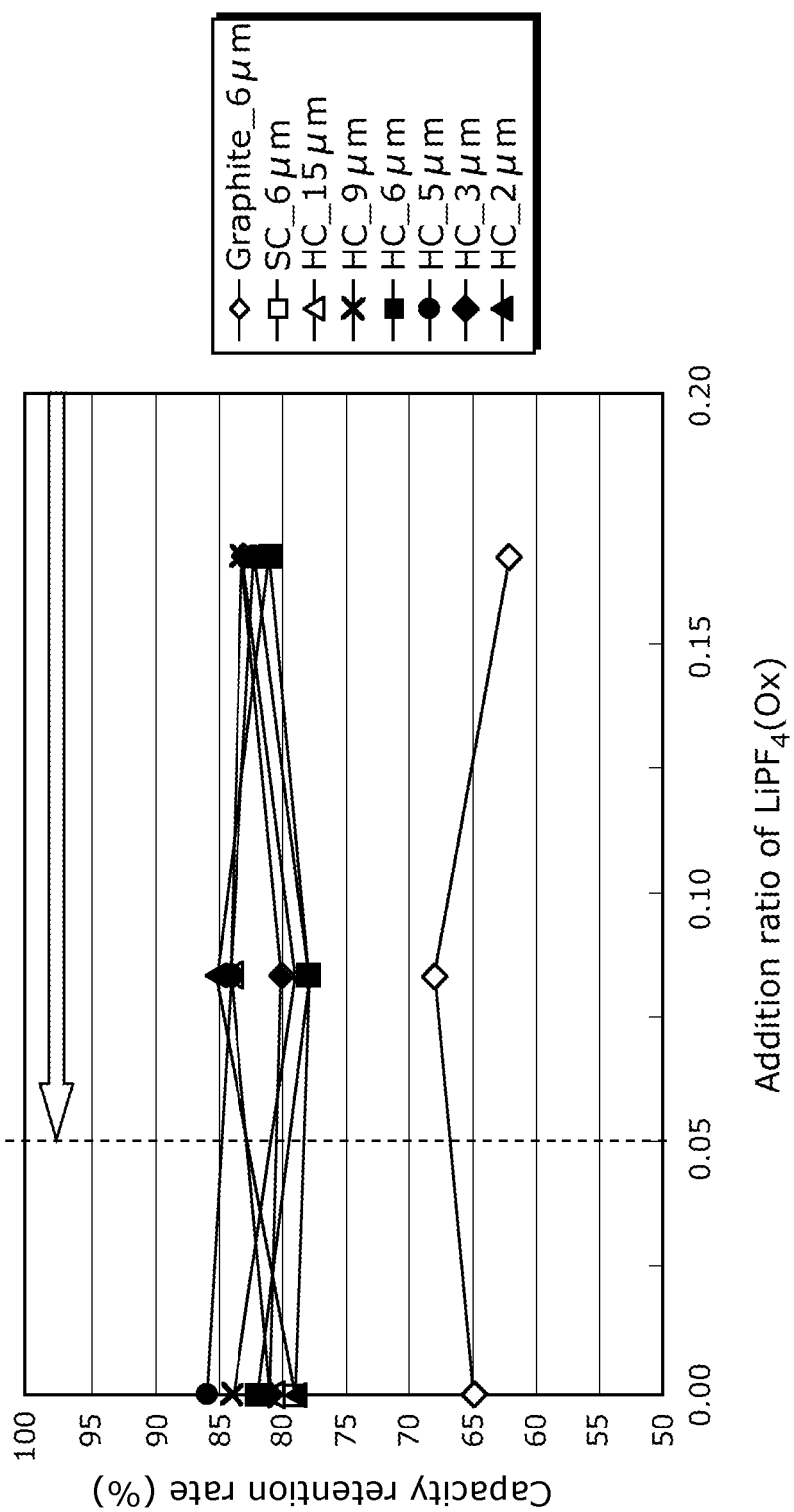

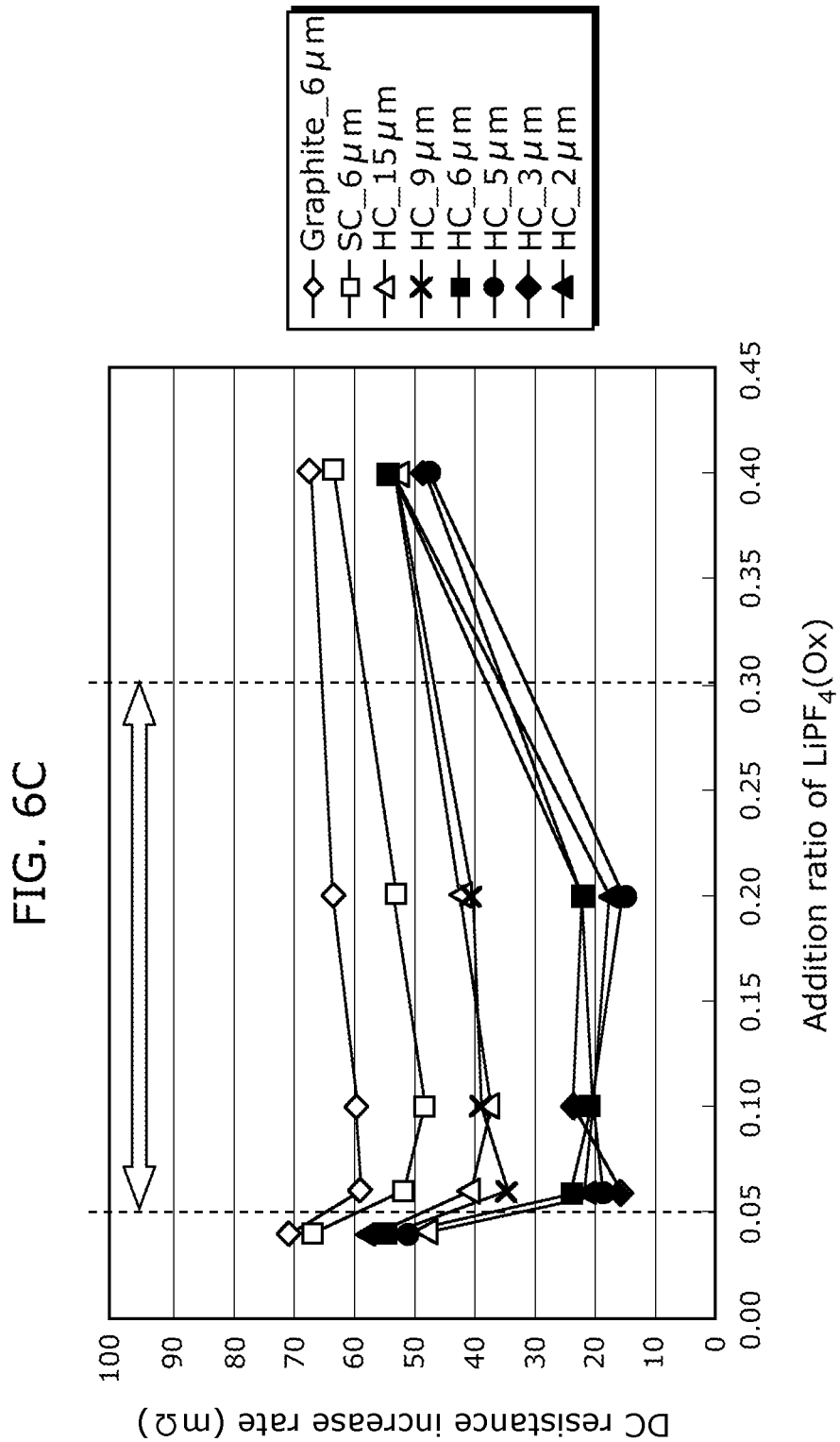

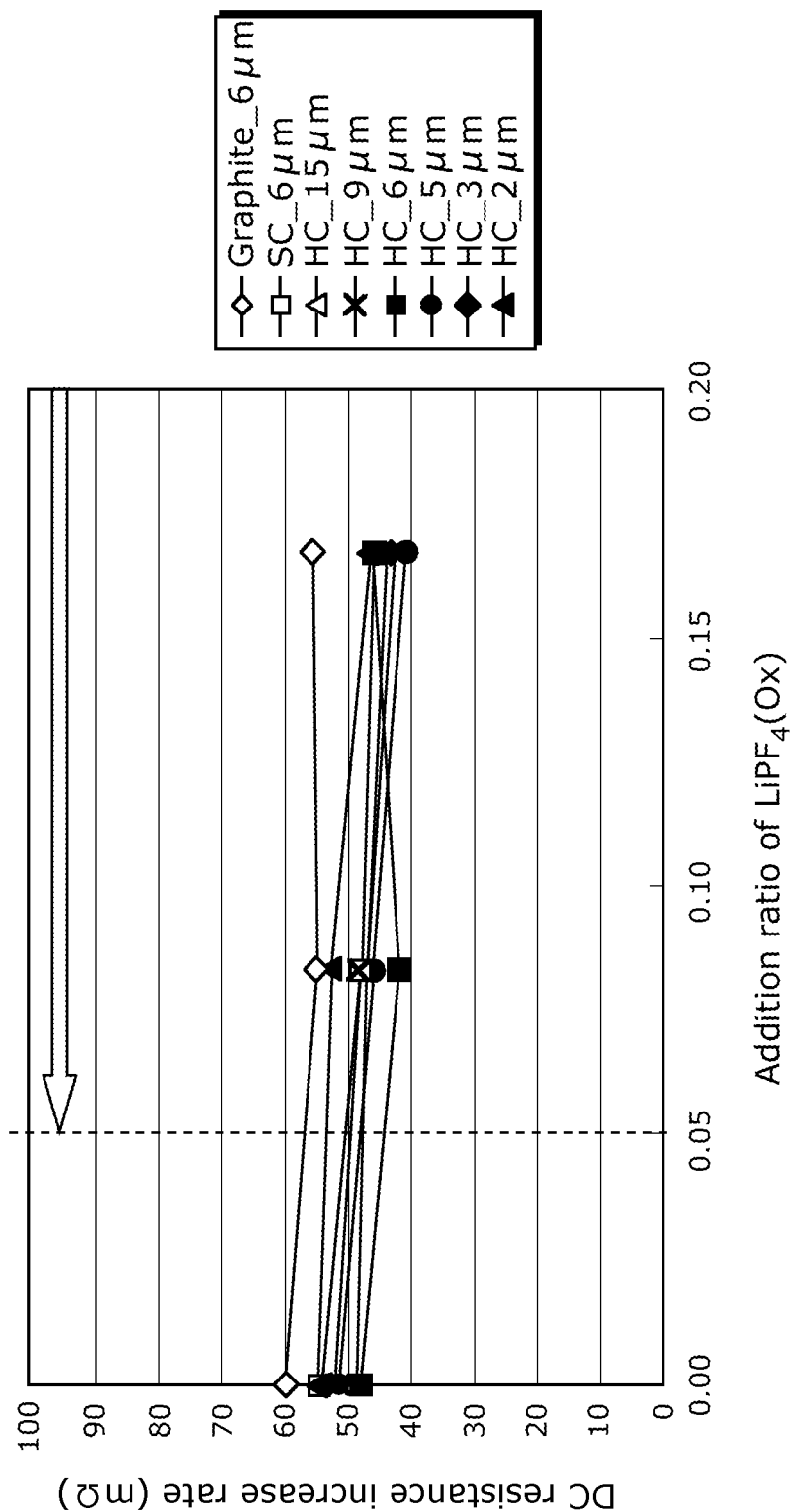

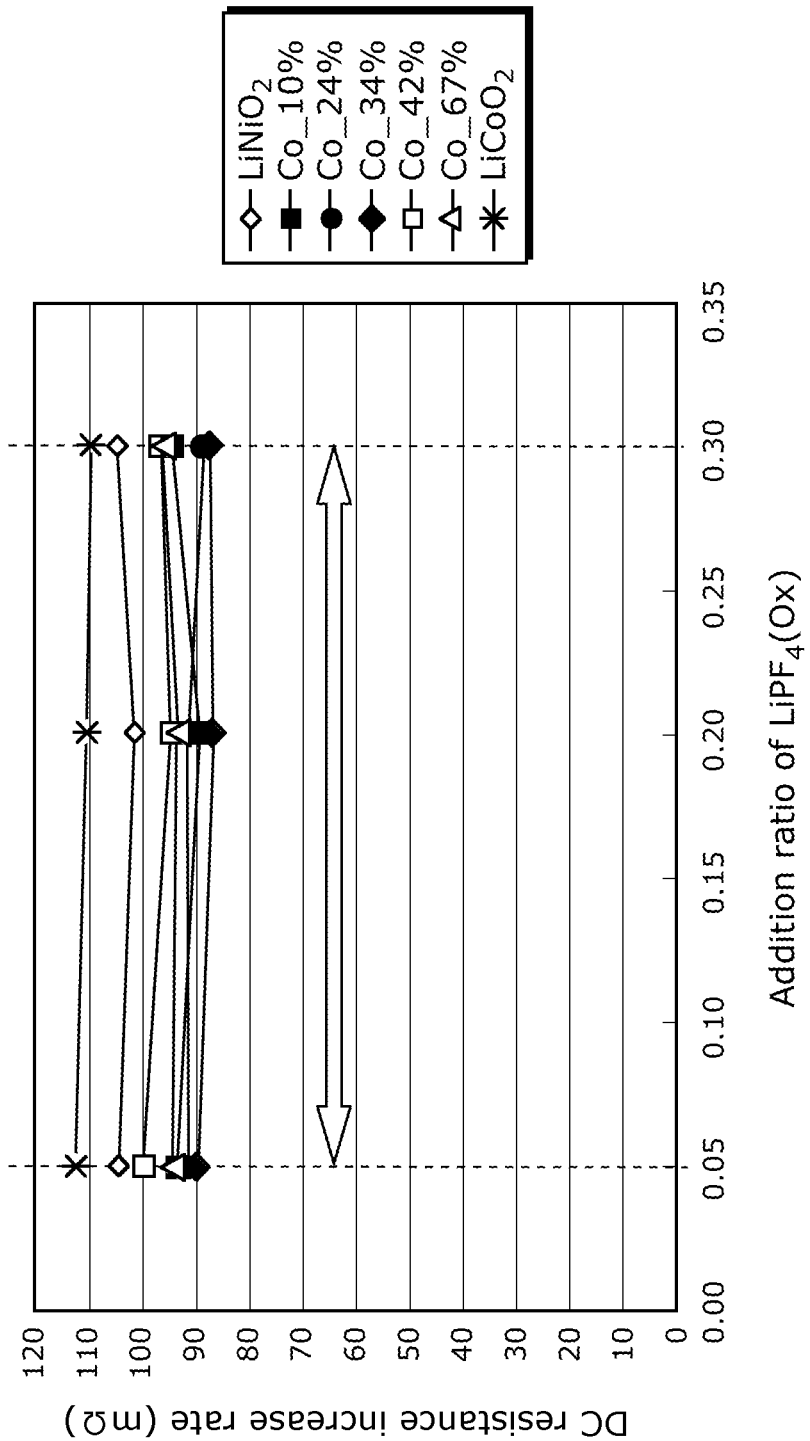

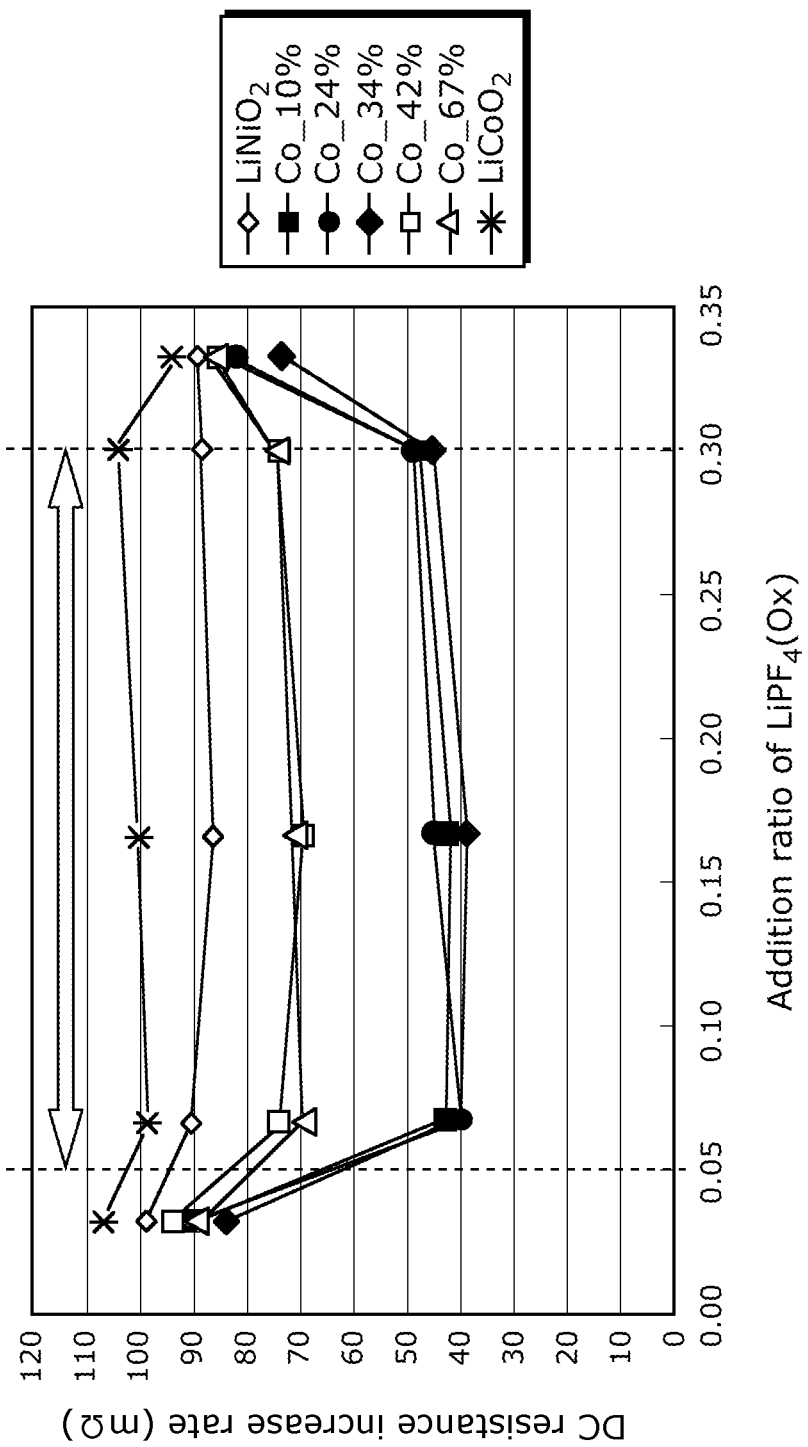

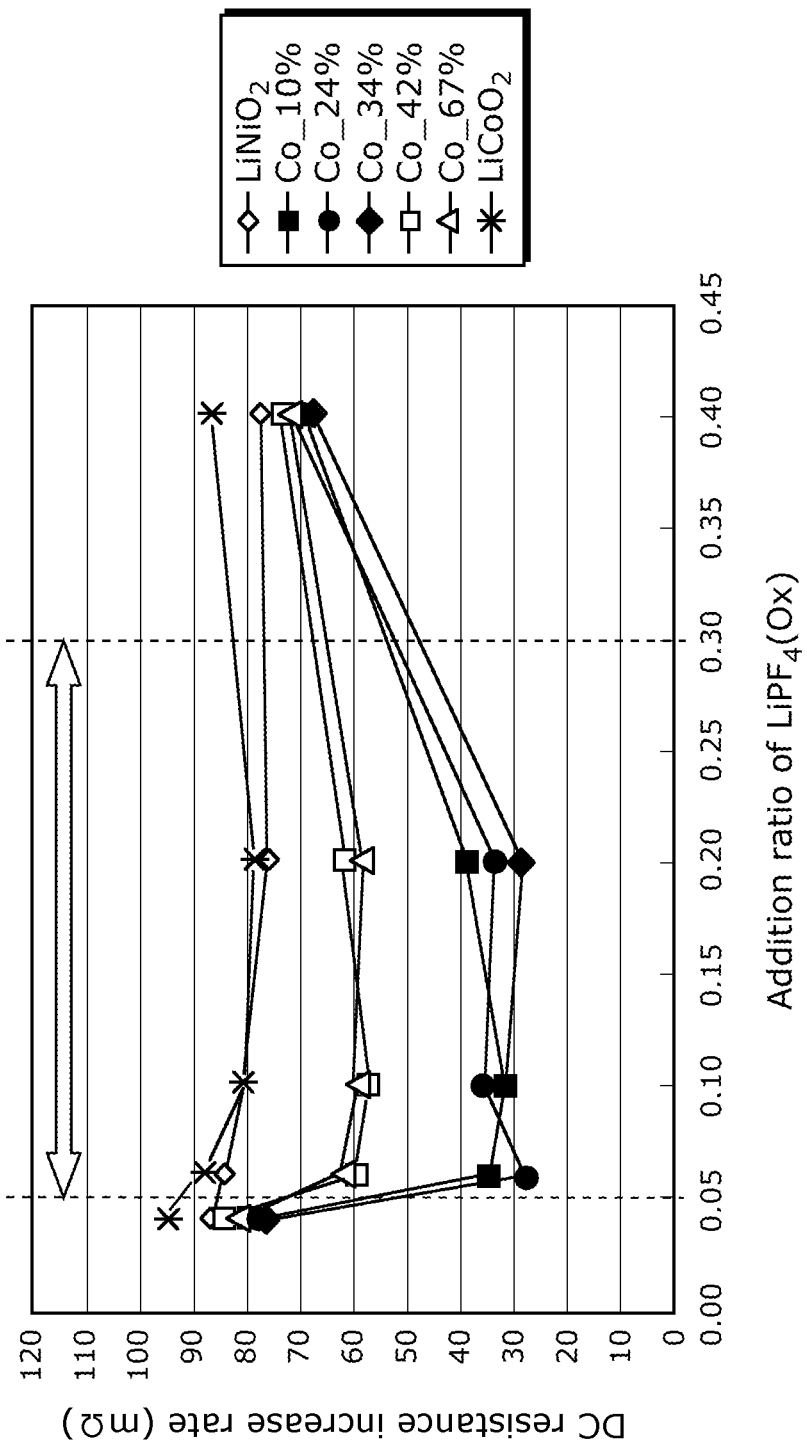

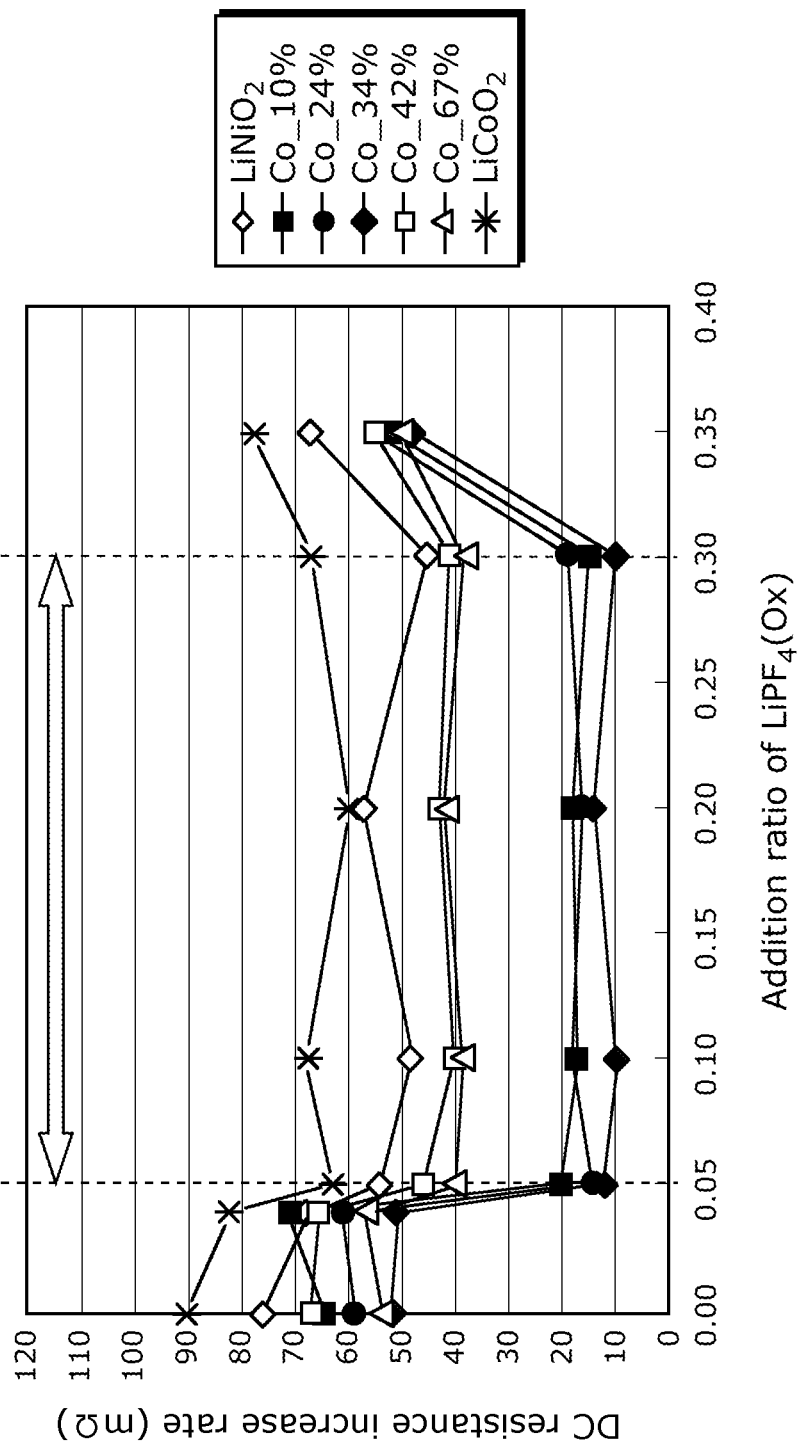

ENERGY STORAGE ELEMENT, METHOD OF PRODUCING ENERGY STORAGE ELEMENT, AND NON-AQUEOUS ELECTROLYTE

CROSS REFERENCE TO RELATED APPLICATIONS

The present application is based on and claims priority of Japanese Patent Application No. 2012-6537 filed on Jan. 16, 2012, Japanese Patent Application No. 2012-76129 filed on Mar. 29, 2012, and Japanese Patent Application No. 2012-76218 filed on Mar. 29, 2012. The entire disclosure of the above-identified application, including the specification, drawings and claims is incorporated herein by reference in its entirety.

FIELD

The present invention relates to energy storage elements including a positive electrode and a negative electrode that occlude and release lithium ions, and a non-aqueous electrolyte. The present invention also relates to methods of producing an energy storage element, and a non-aqueous electrolyte.

BACKGROUND

Development of electric vehicles as substitutes for gasoline vehicles is one of important measures for global environmental issues. For this, studies have been conducted for the use of energy storage elements such as non-aqueous electrolyte secondary batteries as a power supply for the electric vehicles. Here, improvement in battery performance such as high temperature preservation properties is essential to efficient use of the energy storage element.

For this reason, the related art has proposed an energy storage element using a non-aqueous electrolyte to which an ionic metal complex is added (for example, see Patent Literature 1). Such an energy storage element can improve battery performance such as high temperature preservation properties by using the non-aqueous electrolyte prepared by adding the ionic metal complex represented by a formula disclosed in Patent Literature 1.

CITATION LIST

Patent Literature

Patent Literature 1: Japanese Unexamined Patent Application Publication No. 2005-285491

SUMMARY

The energy storage element using the non-aqueous electrolyte in the relate art, however, cannot efficiently improve the battery performance such as high temperature preservation properties because the kind and amount of the compound to be used to improve the battery performance are not clearly described. Accordingly, an object of the present invention is to provide an energy storage element, a method of producing an energy storage element, and a non-aqueous electrolyte that enables efficiently improved battery performance such as high temperature preservation properties.

In order to achieve the above object, an energy storage element according to one aspect of the present invention is an energy storage element including: a positive electrode including a substance that occludes and releases lithium ions, a negative electrode including a substance that occludes and releases lithium ions, and a non-aqueous electrolyte, wherein the non-aqueous electrolyte contains: lithium difluorobis(oxalato)phosphate that is a first additive represented by Formula (1):

[Formula 1]

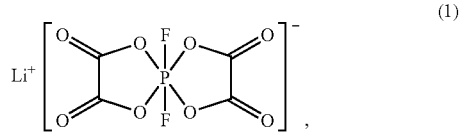

and
lithium tetrafluorooxalatophosphate that is a second additive represented by Formula (2):

[Formula 2]

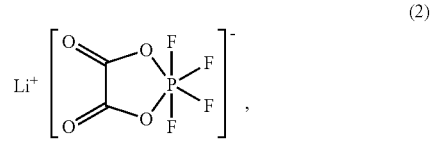

and
an amount of the first additive to be added is not less than 0.3% by weight and not more than 1.0% by weight based on a total weight of the non-aqueous electrolyte, and an amount of the second additive to be added is not less than 0.05 times and not more than 0.3 times the amount of the first additive to be added.

According to this, the non-aqueous electrolyte contains the first additive represented by Formula (1) and the second additive represented by Formula (2). The amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added. Here, as a result of extensive research and studies, the present inventors found out that the battery performance such as high temperature preservation properties can be efficiently improved by adding a predetermined amount of the first additive and a predetermined amount of the second additive to the non-aqueous electrolyte. For this reason, the energy storage element can obtain battery performance such as high temperature preservation properties efficiently improved by adding a predetermined amount of the first additive and a predetermined amount of the second additive to the non-aqueous electrolyte.

Moreover, the negative electrode may include a non-graphitizable carbon having an average particle size D50 of 6 μm or less as a negative electrode active material.

According to this, the non-aqueous electrolyte contained in the energy storage element contains the first additive represented by Formula (1) and the second additive represented by Formula (2), the amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added. Moreover, the negative electrode in the energy storage element includes a non-graphitizable carbon having an average particle size D50 of 6 μm or less as a negative electrode active material.

Here, a negative electrode active material having a small particle size used for a higher output of the energy storage element leads to increase in the contact area between the negative electrode active material and the non-aqueous electrolyte. For this reason, a side reaction such as reduction and decomposition of the non-aqueous electrolyte deteriorates the negative electrode active material. Namely, in the negative electrode active material having a small particle size, deterioration of the active material itself and deterioration thereof by the side reaction progress at the same time.

As a result of extensive research and studies, the present inventors found out that in the negative electrode active material containing a non-graphitizable carbon having an average particle size D50 of 6 μm or less, the side reaction of the non-aqueous electrolyte can be significantly suppressed by adding a predetermined amount of the first additive and a predetermined amount of the second additive to the non-aqueous electrolyte. Thus, the present inventors found out that the performance of the energy storage element such as high temperature preservation properties can be efficiently improved by significantly suppressing deterioration of the negative electrode active material due to the side reaction. For this reason, the energy storage element enables a higher output and significantly improved performance such as high temperature preservation properties when the negative electrode in the energy storage element includes the negative electrode active material including a non-graphitizable carbon having an average particle size D50 of 6 μm or less, and a predetermined amount of the first additive and a predetermined amount of the second additive are added to the non-aqueous electrolyte.

Moreover, the non-graphitizable carbon may have an average particle size D50 of 2 μm or more.

According to this, a non-graphitizable carbon having an average particle size D50 of 2 μm or more is used. Namely, in the case of a non-graphitizable carbon having an average particle size D50 of less than 2 μm, its excessively small particle size makes handling difficult, leading to higher production cost. Additionally, such a non-graphitizable carbon has a problem of productivity: for example, the non-graphitizable carbon cannot be applied stably in application of the non-graphitizable carbon to the negative electrode. For this reason, improved productivity and reduced cost can be attained by using a non-graphitizable carbon having an average particle size D50 of 2 μm or more.

Moreover, the positive electrode may include a lithium transition metal oxide represented by $Li_xCo_yNi_zMn_{(1-y-z)}O_2$ as a positive electrode active material wherein $0.95 \le x \le 1.2$, $0.1 \le y \le 0.34$, $0 < z$, and $1-y-z > 0$.

According to this, the non-aqueous electrolyte contained in the energy storage element contains the first additive represented by Formula (1) and the second additive represented by Formula (2). The amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added. Moreover, the positive electrode in the energy storage element includes a lithium transition metal oxide represented by $Li_xCo_yNi_zMn_{(1-y-z)}O_2$ (wherein $0.95 \le x \le 1.2$, $0.1 \le y \le 0.34$, $0 < z$, and $1-y-z > 0$) as the positive electrode active material.

Here, the positive electrode active material using a complex oxide using three components of nickel (Ni), manganese (Mn), and cobalt (Co) enables a higher output of the energy storage element. When the complex oxide is used, however, cobalt is used in the positive electrode active material. This causes oxidation and decomposition of the non-aqueous electrolyte in the positive electrode. As a result, the non-aqueous electrolyte deteriorates, reducing the battery performance.

As a result of extensive research and studies, the present inventors found out that by adding a predetermined amount of the first additive and a predetermined amount of the second additive to the non-aqueous electrolyte, oxidation and decomposition of the non-aqueous electrolyte can be significantly suppressed in the positive electrode active material using the lithium transition metal oxide in which the ratio of cobalt in the transition metal is adjusted to 10 to 34%. Thus, the present inventors found out that the performance of the energy storage element such as high temperature preservation properties can be efficiently improved by significantly suppressing deterioration of the non-aqueous electrolyte caused by the positive electrode active material. For this reason, the energy storage element enables efficiently improved performance such as high temperature preservation properties when the energy storage element includes the positive electrode having the positive electrode active material containing the lithium transition metal oxide represented by $Li_xCo_yNi_zMn_{(1-y-z)}O_2$ (wherein $0.95 \le x \le 1.2$, $0.1 \le y \le 0.34$, $0 < z$, and $1-y-z > 0$), and a predetermined amount of the first additive and a predetermined amount of the second additive are added to the non-aqueous electrolyte.

Moreover, the lithium transition metal oxide may be represented by $Li_xNi_{(1-y)/2}Mn_{(1-y)/2}Co_yO_2$ wherein $1.1 \le x \le 1.2$, and $0.1 \le y \le 0.3$.

According to this, the lithium transition metal oxide contained in the positive electrode as the positive electrode active material is represented by $Li_xNi_{(1-y)/2}Mn_{(1-y)/2}Co_yO_2$ (wherein $1.1 \le x \le 1.2$, and $0.1 \le y \le 0.34$). Namely, the positive electrode includes the lithium transition metal oxide as the positive electrode active material wherein Ni and Mn have the same ratio. Thus, when Ni and Mn in the positive electrode active material have the same ratio, the positive electrode active material has higher stability in its crystal structure. For this reason, an energy storage element having high cycle performance and preservation performance can be achieved.

Moreover, in order to achieve the above object, a method of producing an energy storage element according to one aspect of the present invention is a method of producing an energy storage element including a positive electrode including a substance that occludes and releases lithium ions, a negative electrode including a substance that occludes and releases lithium ions, and a non-aqueous electrolyte, the method including: injecting the non-aqueous electrolyte into the energy storage element, the non-aqueous electrolyte having lithium difluorobis(oxalato)phosphate and lithium tetrafluorooxalatophosphate added, the lithium difluorobis(oxalato) phosphate being a first additive represented by Formula (3):

[Formula 3]

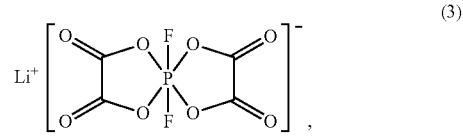

and
the lithium tetrafluorooxalatophosphate being a second additive represented by Formula (4):

[Formula 4]

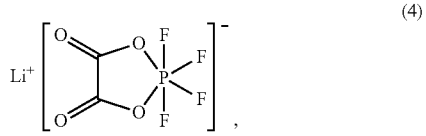

(4)

and;
pre-charging the energy storage element more than once before sealing a non-aqueous electrolyte injection hole, the energy storage element having the non-aqueous electrolyte injected in the injecting, wherein the non-aqueous electrolyte having the first additive and the second additive added is injected in the injecting, an amount of the first additive to be added being not less than 0.3% by weight and not more than 1.0% by weight based on a total weight of the non-aqueous electrolyte and an amount of the second additive to be added being not less than 0.05 times and not more than 0.3 times the amount of the first additive to be added.

According to this, the method of producing an energy storage element includes the pre-charging step of pre-charging the energy storage element more than once before sealing the non-aqueous electrolyte injection hole, in which the energy storage element has the non-aqueous electrolyte having the first additive and the second additive added thereto. Here, the present inventors found out that the battery performance such as high temperature preservation properties can be efficiently improved by pre-charging the energy storage element more than once before sealing the non-aqueous electrolyte injection hole in the state where the non-aqueous electrolyte has the first additive and the second additive added thereto. For this reason, the method of producing an energy storage element enables production of an energy storage element whose battery performance such as high temperature preservation properties can be improved by pre-charging the energy storage element more than once before sealing the non-aqueous electrolyte injection hole.

Moreover, in the injecting, the non-aqueous electrolyte having the first additive and the second additive added is injected into the energy storage element including the negative electrode including a non-graphitizable carbon having an average particle size D50 of 6 μm or less as a negative electrode active material, the amount of the first additive to be added being not less than 0.3% by weight and not more than 1.0% by weight based on the total weight of the non-aqueous electrolyte and the amount of the second additive to be added being not less than 0.05 times and not more than 0.3 times the amount of the first additive to be added According to this, in the method of producing an energy storage element, the non-aqueous electrolyte having a predetermined amount of the first additive and a predetermined amount of the second additive added thereto is injected into the energy storage element including the non-graphitizable carbon having an average particle size D50 of 6 μm or less, and the energy storage element is pre-charged more than once before sealing the non-aqueous electrolyte injection hole. Here, the present inventors found out that the performance of the energy storage element such as high temperature preservation properties can be efficiently improved by pre-charging the energy storage element more than once before sealing the non-aqueous electrolyte injection hole in the state where the energy storage element has the non-aqueous electrolyte injected thereinto. For this reason, the method of producing an energy storage element enables production of an energy storage element whose performance such as high temperature preservation properties can be efficiently improved by pre-charging the energy storage element more than once before sealing the non-aqueous electrolyte injection hole.

Moreover, in the injecting, the non-aqueous electrolyte having the first additive and the second additive added may be injected into the energy storage element including the positive electrode including a lithium transition metal oxide represented by $Li_xCo_yNi_zMn_{(1-y-z)}O_2$ as a positive electrode active material wherein $0.95 \leq x \leq 1.2$, $0.1 \leq y \leq 0.34$, $0<z$, and $1-y-z>0$, the amount of the first additive to be added being not less than 0.3% by weight and not more than 1.0% by weight based on the total weight of the non-aqueous electrolyte and the amount of the second additive to be added being not less than 0.05 times and not more than 0.3 times the amount of the first additive to be added.

According to this, in the method of producing an energy storage element, the non-aqueous electrolyte having a predetermined amount of the first additive and a predetermined amount of the second additive added thereto is injected into the energy storage element including the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$), and the energy storage element is pre-charged more than once before sealing the non-aqueous electrolyte injection hole. Here, the present inventors found out that the performance of the energy storage element such as high temperature preservation properties can be efficiently improved by pre-charging the energy storage element more than once before sealing the non-aqueous electrolyte injection hole in the state where the energy storage element has the non-aqueous electrolyte injected thereinto. For this reason, the method of producing an energy storage element enables production of an energy storage element whose performance such as high temperature preservation properties can be efficiently improved by pre-charging the energy storage element more than once before sealing the non-aqueous electrolyte injection hole.

The present invention can be realized not only as such an energy storage element or method of producing an energy storage element, but also as a non-aqueous electrolyte having the first additive and the second additive added thereto.

The present invention can also be realized as a non-aqueous electrolyte having the first additive and the second additive added thereto and used in an energy storage element having a negative electrode including a non-graphitizable carbon having an average particle size D50 of 6 μm or less as a negative electrode active material.

Further, the present invention can be realized as a non-aqueous electrolyte wherein the non-aqueous electrolyte is used in the energy storage element including the positive electrode including a lithium transition metal oxide represented by $Li_xCo_yNi_zMn_{(1-y-z)}O_2$ as a positive electrode active material wherein $0.95 \leq x \leq 1.2$, $0.1 \leq y \leq 0.34$, $0<z$, and $1-y-z>0$.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5A is a graph showing the capacity retention rate of the energy storage element when 0.2% by weight of the first additive is added, and the amount of the second additive to be added and the kind and particle size of a negative electrode active material are varied.

FIG. 5E is a graph showing the capacity retention rate of the energy storage element when 1.2% by weight of the first additive is added, and the amount of the second additive to be added and the kind and particle size of the negative electrode active material are varied.

FIG. 6C is a graph showing the DC resistance increase rate of the energy storage element when 0.5% by weight of the first additive is added, and the amount of the second additive to be added and the kind and particle size of the negative electrode active material are varied.

FIG. 6E is a graph showing the DC resistance increase rate of the energy storage element when 1.2% by weight of the first additive is added, and the amount of the second additive to be added and the kind and particle size of the negative electrode active material are varied.

FIG. 7A is a graph showing the DC resistance increase rate of the energy storage element when 0.2% by weight of the first additive is added, and the amount of the second additive to be added and a positive electrode active material are varied.

FIG. 7B is a graph showing the DC resistance increase rate of the energy storage element when 0.3% by weight of the first additive is added, and the amount of the second additive to be added and the positive electrode active material are varied.

FIG. 7C is a graph showing the DC resistance increase rate of the energy storage element when 0.5% by weight of the first additive is added, and the amount of the second additive to be added and the positive electrode active material are varied.

FIG. 7D is a graph showing the DC resistance increase rate of the energy storage element when 1.0% by weight of the first additive is added, and the amount of the second additive to be added and the positive electrode active material are varied.

DESCRIPTION OF EMBODIMENT

Figure 1:
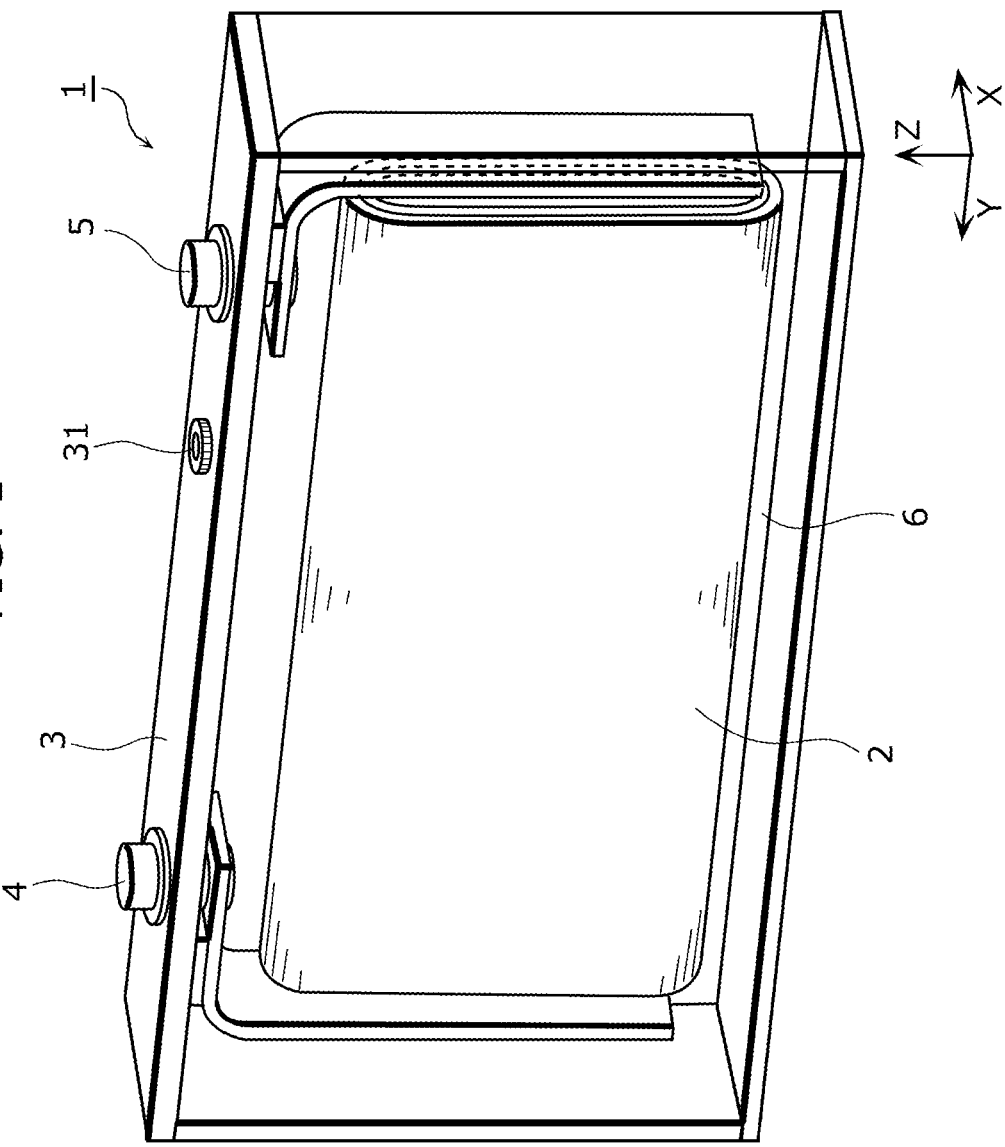
FIG. 1 is a perspective view of an appearance of an energy storage element according to one embodiment.

The ionic metal complex used in the energy storage element in the related art above is represented by a formula that generalizes many kinds of compounds. For this reason, in the energy storage element in the related art, it is unclear which compound represented by the formula can be used to efficiently improve the battery performance. The amount of the compound to be used is also unclear.

Accordingly, the energy storage element using the non-aqueous electrolyte in the related art has no clear description of the kind and amount of the compound to be used to efficiently improve the battery performance such as high temperature preservation properties. For this reason, the battery performance cannot be efficiently improved.

The present invention provides an energy storage element and method of producing an energy storage element and non-aqueous electrolyte that enable efficiently improved battery performance such as high temperature preservation properties.

Moreover, the negative electrode using a negative electrode active material having a small particle size enables a higher output of the energy storage element. Use of such a negative electrode active material having a small particle size, however, leads to increase in the contact area between the negative electrode active material and the non-aqueous electrolyte. For this reason, a side reaction such as reduction and decomposition of the non-aqueous electrolyte deteriorates the negative electrode active material. For this reason, in the negative electrode active material having a small particle size, deterioration of the active material itself and deterioration thereof by the side reaction progress at the same time. The progression of deterioration in the negative electrode active material leads to reduced battery performance.

For this reason, it can be thought that the battery performance is improved by using the non-aqueous electrolyte in the energy storage element in the related art to which an ionic metal complex is added, but the ionic metal complex is represented by a formula that generalizes many kinds of compounds. For this reason, in the energy storage element in the related art, it is unclear which compound represented by the formula can be used to efficiently improve the battery performance. The amount of the compound to be used is also unclear. No clear description is found about the kind and particle size of the negative electrode active material effective in improving the battery performance.

Thus, use of the negative electrode active material having a small particle size enables a higher output of the energy storage element, but causes reduction in the battery performance due to the negative electrode active material deteriorated by the side reaction of the non-aqueous electrolyte. In this case, in the energy storage element in the related art, no clear description is found about the kind and amount of the compound to be used to improve the battery performance and the kind and particle size of the negative electrode active material effective in improving the battery performance. For this reason, the energy storage element using the non-aqueous electrolyte in the related art cannot obtain efficiently improved performance such as high temperature preservation properties while such an energy storage element enables a higher output of the energy storage element.

The present invention provides an energy storage element, method of producing an energy storage element, and non-aqueous electrolyte that enable a higher output of the energy storage element and efficiently improved performance of the energy storage element such as high temperature preservation properties.

Further, when cobalt is used as the positive electrode active material, the non-aqueous electrolyte oxidizes and decomposes in the positive electrode, thereby reducing the battery performance.

For this reason, it can be thought that the battery performance is improved by using the non-aqueous electrolyte in the energy storage element in the related art to which an ionic metal complex is added, but the ionic metal complex is represented by a formula that generalizes many kinds of compounds. For this reason, in the energy storage element in the related art, it is unclear which compound represented by the formula can be used to efficiently improve the battery performance. The amount of the compound to be used is also unclear. No clear description is found about the kind and particle size of the positive electrode active material effective in improving the battery performance.

Thus, the energy storage element using the non-aqueous electrolyte in the related art cannot obtain efficiently improved the performance such as high temperature preservation properties.

The present invention provides an energy storage element, method of producing an energy storage element, and non-aqueous electrolyte that enable efficiently improved performance of the energy storage element such as high temperature preservation properties can be efficiently improved.

Hereinafter, with reference to the drawings, an energy storage element and a method of producing an energy storage element according to an embodiment will be described. The embodiment described below shows inclusive or specific examples. Namely, numeric values, shapes, materials, components, arrangements, positions, and connection forms of the components, steps, order of the steps, and the like shown in the embodiment below are only examples, and will not limit the present invention. Among the components in the embodiments below, components not described in independent claims expressing the highest concept will be described as arbitrary components.

Embodiment

First, a configuration of an energy storage element according to Embodiment will be described.

FIG. 1 is a perspective view of an appearance of an energy storage element 1 according to Embodiment. This is a perspective view of an inside of a container.

The energy storage element 1 is a secondary battery that can charge and discharge electricity, and more specifically, a non-aqueous electrolyte secondary battery such as lithium ion secondary batteries. The energy storage element 1 may be a capacitor. As shown in FIG. 1, the energy storage element 1 includes an electrode assembly 2, a container 3, a positive electrode terminal 4, a negative electrode terminal 5, and a non-aqueous electrolyte 6.

The electrode assembly 2 includes a positive electrode, a negative electrode, and a separator, although the detailed illustration will be omitted. The electrode assembly 2 is a member that can store electricity. Namely, the electrode assembly 2 is a group of electrodes produced by rolling a positive electrode plate, a negative electrode plate, and a separator interposed therebetween into a roll. The positive electrode plate and the negative electrode plate each include a substance that occludes and releases lithium ions. The electrode assembly 2 is accommodated inside of the container 3.

The separator is a microporous sheet formed of a resin. The separator is impregnated with the non-aqueous electrolyte 6 containing an organic solvent and an electrolyte salt. The positive electrode plate and the negative electrode plate are formed as follows: for example, a mixed agent paste prepared by mixing a powder such as an active material, a binder, and a conductive aid with an organic solvent is applied onto a surface of a metallic current collector, and dried; and the surface is pressed by a roll press or the like thereby to adjust the thickness of the mixed agent layer.

In FIG. 1, the group of electrodes has an elliptical shape, but may have a circular shape. Moreover, the shape of the group of electrodes is not limited to the roll type. The group of electrodes may have a shape of a laminate of flat electrode plates.

Here, the positive electrode plate, negative electrode plate, separator, and the like used in the energy storage element 1 are not particularly different from those used in the related art. Accordingly, those usually used can be used.

As the positive electrode active material used in the energy storage element 1, known materials can be properly used as long as the active material is a positive electrode active material that can occlude and release lithium ions. For example, the positive electrode active material can be selected from complex oxides represented by $Li_xMO_y$ (M represents at least one transition metal) (such as $Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, and $Li_xNi_yMn_{(2-y)}O_4$); polyanion compounds represented by $Li_{w-}Me_x(XO_y)_z$ (Me represents at least one transition metal, X is P, Si, B, or V, for example) (such as $LiFePO_4$, $LiMnPO_4$, $LiNiPO_4$, $LiCoPO_4$, $Li_3V_2(PO_4)_3$, $Li_2MnSiO_4$, and $Li_2CoPO_4F$); and the like. The elements or polyanions in these compounds may be partially replaced by other element or anionic species. The surfaces of these compounds may be coated with a metal oxide such as $ZrO_2$, $WO_2$, MgO, and $Al_2O_3$, or carbon. Further, examples of the positive electrode active material include, but not limited to, conductive polymer compounds such as disulfide materials, polypyrrole materials, polyaniline materials, polyparastyrene materials, polyacetylene materials, polyacene materials; and carbonaceous materials having a pseudo graphite structure. These compounds may be used alone, or may be used by mixing two or more.

As the negative electrode active material used in the energy storage element 1, known negative materials can be properly used as long as the material is a negative electrode active material that can occlude and release lithium ions. Examples of the negative electrode active material include lithium metal, lithium alloys (lithium metal-containing alloys such as lithium-aluminum, lithium-lead, lithium-tin, lithium-aluminum-tin, lithium-gallium, and Wood's alloy), alloys that can occlude and release lithium ions, carbon materials (such as graphite, non-graphitizable carbon, graphitizable carbon, low-temperature fired carbon, and amorphous carbon), metal oxides, lithium metal oxides (such as $Li_4Ti_6O_{12}$), and polyphosphoric acid compounds. Among these, particularly preferable are graphite, non-graphitizable carbon, and graphitizable carbon.

The positive electrode active material and the negative electrode active material each are mixed with a binder, a conductive aid, and the like. The mixture is applied onto the surface of the current collector. The applied mixture is pressed, and dried. Thus, the positive electrode and the negative electrode each are formed.

For the current collector, copper, nickel, iron, stainless steel, titanium, aluminum, fired carbon, conductive polymers, conductive glass, Al—Cd alloys, and the like can be used. Further, for the purposes of adhesiveness, conductivity, and reduction resistance, the surfaces of the current collectors formed of these materials may be subjected to crosslinking with a crosslinking agent such as chitosan and chitin, which are polysaccharide polymers, or may be treated with carbon, nickel, titanium, or silver.

As a conductive material to be mixed with the positive electrode active material and the negative electrode active material, conductive powder materials such as carbon powders and carbon fibers are preferably used. Preferable carbon powders are various carbon blacks such as acetylene black, furnace black, ketjen black, and graphite powder. These conductive materials can be used alone or in combination. The amount of the conductive material to be contained in a positive electrode mixed material may be properly selected according to the kind and amount of the positive electrode active material, and the amount of the conductive material to be contained in a negative electrode mixed material may be properly selected according to the kind and amount of the negative electrode active material.

Alternatively, the positive electrode active material having a particle surface treated to enhance conductivity may be used instead of use of the conductive material or in combination with the conductive material.

The binder is not particularly limited. Examples of the binder include polyvinylidene fluorides (PVDF), polytetrafluoroethylenes, polyethylenes, polypropylenes, aramide resins, polyamides, polyimides, polyamidimides, polyacrylonitriles, polyacrylic acids, polyacrylic acid methyl ester, polyacrylic acid ethyl ester, polyacrylic acid hexyl ester, polymethacrylic acids, polymethacrylic acid methyl ester, polymethacrylic acid ethyl ester, polymethacrylic acid hexyl ester, polyvinylpyrrolidones, hexafluoropolypropylenes, styrene butadiene rubbers, and carboxymethyl cellulose. These may be used alone, or may be used by mixing two or more.

As the separator used in the energy storage element 1, organic solvent-insoluble woven fabrics, non-woven fabrics, and synthetic resin microporous membranes formed of a polyolefin resin such as polyethylene are used. The separator may be those produced by laminating a plurality of microporous membranes having a different material, weight average molecular weight, or porosity, these microporous membranes properly containing a variety of additives such as a plasticizer, an antioxidant, and a flame retardant, or these microporous membranes having the surface(s) coated with an inorganic oxide such as silica. Particularly, synthetic resin microporous membranes can be suitably used. Among these, polyolefin microporous membranes such as polyethylene and polypropylene microporous membranes, polyethylene and polypropylene microporous membranes composited with aramide or polyimide, or composite microporous membranes thereof are suitably used because of their thickness, membrane strength, membrane resistance, and the like.

Alternatively, a solid electrolyte such as polymer solid electrolytes can be used. Such a solid electrolyte also can serve as the separator. Further, a combination of the synthetic resin microporous membrane and the polymer solid electrolyte may be used. In this case, a porous polymer solid electrolyte membrane may be used as the polymer solid electrolyte, and the polymer solid electrolyte may further contain an electrolyte. In this case, the polymer solid electrolyte causes reduction in the output of the battery, however. Accordingly, preferably, a minimum amount of the polymer solid electrolyte is used.

The positive electrode terminal 4 is arranged in an upper portion of the container 3, and connected to the positive electrode plate via a positive electrode lead.

The negative electrode terminal 5 is arranged in an upper portion of the container 3, and connected to the negative electrode plate via a negative electrode lead.

The container 3 has an electrolyte injection hole 31 arranged in the upper portion thereof.

The current collector connects the positive electrode terminal 4, the negative electrode terminal 5, the container 3, the positive electrode terminal 4, and the negative electrode terminal 5 to the electrode assembly 2. The current corrector and the like used in the related art can be used as it is.

The kind of the non-aqueous electrolyte 6 is not particularly limited unless the non-aqueous electrolyte impairs the performance as the electrolyte secondary battery. Various non-aqueous electrolytes can be selected. The organic solvent for the non-aqueous electrolyte 6 is not particularly limited. Examples of the organic solvent include ethylene carbonate, propylene carbonate, butylene carbonate, trifluoropropylene carbonate, γ-butyrolactone, γ-valerolactone, sulfolane, 1,2-dimethoxyethane, 1,2-diethoxyethane, tetrahydrofuran, 2-methyltetrahydrofuran, 2-methyl-1,3-dioxolane, dioxolane, fluoroethyl methyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, dimethyl carbonate, diethyl carbonate, ethyl methyl carbonate, methyl propyl carbonate, ethyl propyl carbonate, dipropyl carbonate, methyl isopropyl carbonate, ethyl isopropyl carbonate, diisopropyl carbonate, dibutyl carbonate, acetonitrile, fluoroacetonitrile, alkoxy- and halogen-substituted cyclic phosphazenes or linear phosphazenes such as ethoxypentafluorocyclotriphosphazene, diethoxytetrafluorocyclotriphosphazene, and phenoxypentafluorocyclotriphosphazene, phosphoric acid esters such as triethyl phosphate, trimethyl phosphate, and trioctyl phosphate, boric acid esters such as triethyl borate and tributyl borate, and non-aqueous solvents such as N-methyloxazolidinone and N-ethyloxazolidinone. When the solid electrolyte is used, a porous polymer solid electrolyte membrane may be used as the polymer solid electrolyte, and the polymer solid electrolyte may further contain an electrolyte. When a gel polymer solid electrolyte is used, an electrolyte that forms the gel may be different from an electrolyte contained in micropores or the like. When a high output is required in HEV application or the like, however, it is more preferable that the non-aqueous electrolyte is used alone as the electrolyte rather than use of the solid electrolyte or the polymer solid electrolyte.

The electrolyte salts of the non-aqueous electrolyte 6 are not particularly limited. Examples of the electrolyte salts include ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$, KSCN, and a mixture of two or more thereof.

In the energy storage element 1, a combination of these organic solvents and electrolyte salts is used as the electrolyte. Among these electrolytes, use of a mixture of ethylene carbonate, dimethyl carbonate, and methyl ethyl carbonate is preferable because the mixture provides the maximum conductivity of lithium ions.

Here, the non-aqueous electrolyte 6 contains a first additive and a second additive, each of which forms a coating in the electrode to promote permeation of lithium ions.

The first additive is lithium difluorobis(oxalato)phosphate ($LiPF_2(Ox)_2$) represented by Formula (5):

[Formula 5]

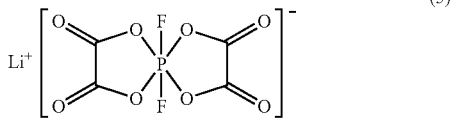

(5)

The second additive is lithium tetrafluorooxalatophosphate ($LiPF_4(Ox)$) represented by Formula (6):

[Formula 6]

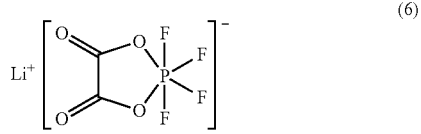

(6)

Here, the amount of the first additive to be added is not less than 0.3% by weight and not more than 1.0% by weight based on the total weight of the non-aqueous electrolyte 6, and the amount of the second additive to be added is not less than 0.05 times and not more than 0.3 times the amount of the first additive to be added.

Further, if the amount of the first additive to be added and the amount of the second additive to be added have the relationship above, a third additive may be added to the non-aqueous electrolyte 6. Examples of the third additive include, but not limited to, lithium difluorophosphate; carbonates such as vinylene carbonate, methylvinylene carbonate, ethylvinylene carbonate, propylvinylene carbonate, phenylvinylene carbonate, vinylethylene carbonate, divinylethylene carbonate, dimethylvinylene carbonate, diethylvinylene carbonate, and fluoroethylene carbonate; vinyl esters such as vinyl acetate and vinyl propionate; sulfides such as diallyl sulfide, allyl phenyl sulfide, allyl vinyl sulfide, allyl ethyl sulfide, propyl sulfide, diallyl disulfide, allyl ethyl disulfide, allyl propyl disulfide, and allyl phenyl disulfide; cyclic sulfonic acid esters such as 1,3-propane sultone, 1,4-butane sultone, 1,3-propene sultone, and 1,4-butene sultone; cyclic disulfonic acid esters such as methylene methanedisulfonate, ethylene methanedisulfonate, propylene methanedisulfonate, ethylene ethanedisulfonate, and propylene ethanedisulfonate; linear sulfonic acid esters such as bis(vinylsulfonyl)methane, methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, methyl benzylsulfonate, ethyl benzylsulfonate, propyl benzylsulfonate, benzyl methanesulfonate, benzyl ethanesulfonate, and benzyl propanesulfonate; sulfurous acid esters such as dimethyl sulfite, diethyl sulfite, ethyl methyl sulfite, methyl propyl sulfite, ethyl propyl sulfite, diphenyl sulfite, methyl phenyl sulfite, ethylmethyl sulfite, vinyl ethylene sulfite, divinyl ethylene sulfite, propylene sulfite, vinyl propylene sulfite, butylene sulfite, vinyl butylene sulfite, vinylene sulfite, and phenyl ethylene sulfite; sulfuric acid esters such as dimethyl sulfate, diethyl sulfate, diisopropyl sulfate, dibutyl sulfate, ethylene glycol sulfuric acid ester, propylene glycol sulfuric acid ester, butylene glycol sulfuric acid ester, and pentene glycol sulfuric acid ester; aromatic compounds such as benzene, toluene, xylene, fluorobenzene, biphenyl, cyclohexylbenzene, 2-fluorobiphenyl, 4-fluorobiphenyl, diphenyl ether, tert-butylbenzene, orthoterphenyl, meta-terphenyl, naphthalene, fluoronaphthalene, cumene, fluorobenzene, and 2,4-difluoroanisole; halogen-substituted alkanes such as perfluorooctane; and silyl esters such as tris(trimethylsilyl) borate, bis(trimethylsilyl) sulfate, and tris(trimethylsilyl) phosphate. The structures and contents of the additives contained in the non-aqueous electrolyte 6 can be examined according to known various analysis methods. For example, GC-MS, GC-FID, $^1$H-NMR, $^{13}$C-NMR, $^{19}$F-NMR, $^{31}$P-NMR, and the like can be used.

As the third additive, these compounds exemplified above may be used alone or in combination.

Next, a method of producing the energy storage element 1 will be described.

Figure 2:
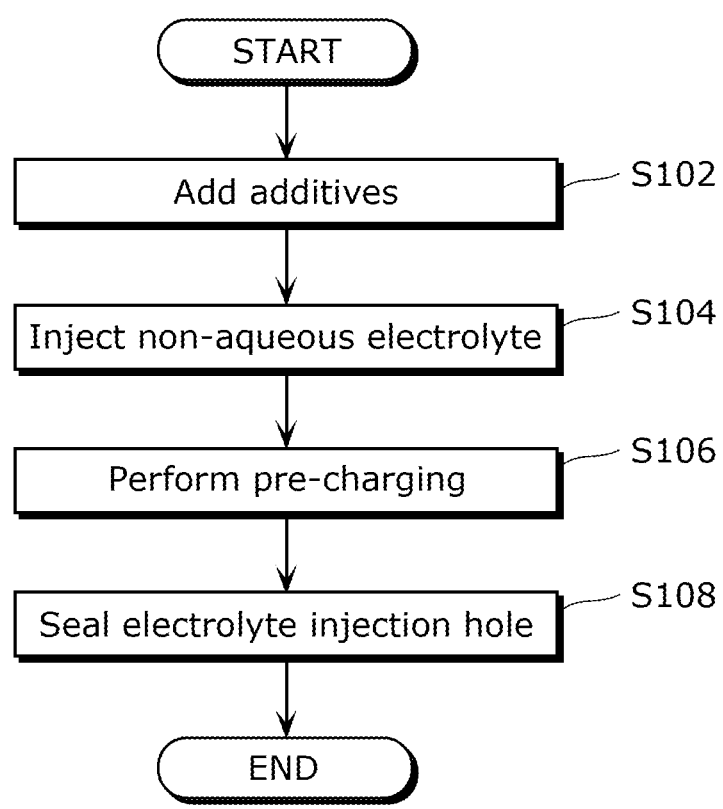
FIG. 2 is a flowchart of an example of a method of producing an energy storage element according to one embodiment.

FIG. 2 is a flowchart showing an example of a method of producing the energy storage element 1 according to Embodiment. Among the steps of producing the energy storage element 1, the flowchart shown in FIG. 2 describes a step of adding the additives to a step of sealing the electrolyte injection hole 31. Hereinafter, steps before the step of adding the additives and steps after the step of sealing the electrolyte injection hole 31 are not particularly different from those used in the related art and are the same as those usually used, and therefore the description will be omitted.

As shown in FIG. 2, first, as the step of adding the additives, lithium difluorobis(oxalato)phosphate as the first additive represented by Formula (5) and lithium tetrafluorooxalatophosphate as the second additive represented by Formula (6) are added to the non-aqueous electrolyte 6 (S102).

Specifically, not less than 0.3% by weight and not more than 1.0% by weight of the first additive based on the total weight of the non-aqueous electrolyte 6 and the second additive having an amount not less than 0.05 times and not more than 0.3 times the amount of the first additive to be added are added. The third additive may be added to the non-aqueous electrolyte 6.

Then, as an electrolyte injecting step, the non-aqueous electrolyte 6 having the additives added thereto is injected from the electrolyte injection hole 31 into the energy storage element 1 (S104).

Alternatively, the non-aqueous electrolyte 6 may be injected into the energy storage element 1, and the first additive and the second additive may be added to the non-aqueous electrolyte 6. In this case, the order of adding the first additive and the second additive is not limited. The two additives may be added at the same time, or the additives may be added sequentially from one of the additives.

Next, as a pre-charging step, pre-charging is performed more than once on the energy storage element 1 including the non-aqueous electrolyte 6 having the first additive and the second additive added thereto (S106).

At this time, a coating is formed in the electrode by the first additive and second additive contained in the non-aqueous electrolyte 6 that penetrates into the electrode assembly 2. A gas generated during forming the coating is discharged to the outside of the battery via the electrolyte injection hole 31 not sealed yet.

Finally, the electrolyte injection hole 31 is sealed (S108). Namely, the electrolyte injection hole 31 is sealed to make the container 3 airtight.

The function of the mixed coating of the first additive and the second additive improves by adding the first additive and the second additive and performing pre-charging as above. This improves the capacity retention rate in a charge discharge cycle, and reduces the DC resistance.

Hereinafter, the effect of adding these first additive and second additive will be described in detail.

EXAMPLES

Examples of the energy storage element 1 and its production method according to Embodiment will be described. Examples 1-1 to 1-15 below relate to the energy storage element 1 and its production method according to Embodiment. In Examples 1-1 to 1-15 and Comparative Examples 1-1 to 1-37 described below, the production and evaluation test of the energy storage element 1 were performed under the same conditions except that the kinds and amounts of the additives to be added to the non-aqueous electrolyte 6 were different.

Specifically, an energy storage element in Example 1-1 was produced as follows.
(1) Production of Positive Electrode Plate 5% by mass of polyvinylidene fluoride as the binder, 5% by mass of acetylene black as the conductive agent, and 90% by mass of $LiNi_{0.17}CO_{0.66}Mn_{0.17}O_2$ as the positive electrode active material were mixed. N-methyl-2-pyrrolidone was added to the mixture to prepare a paste. The paste was applied to both surfaces of a positive electrode current collector having a thickness of 20 μm and formed of an aluminum foil, and dried. Thus, a positive electrode plate was produced, and a positive electrode lead was attached to the positive electrode plate.
(2) Production of Negative Electrode Plate As the negative electrode active material, 92% by mass of a non-graphitizable carbon and 8% by mass of polyvinylidene fluoride as the binder were added to N-methyl-2-pyrrolidone to prepare a paste. The non-graphitizable carbon had an average particle size D50 of 9 μm obtained by measurement using a laser diffraction particle size distribution analyzer SALD2200 made by SHIMADZU Corporation according to laser diffractometry. Then, the obtained paste was applied to both surfaces of a negative electrode current collector having a thickness of 10 μm and formed of a copper foil, and dried. Thus, a negative electrode plate was produced, and a negative electrode lead was attached to the negative electrode plate.
(3) Production of Battery As the separator, a polyethylene microporous membrane was used. The non-aqueous electrolyte used was prepared according to the following method. Namely, $LiPF_6$ was dissolved in a mixed solvent of ethylene carbonate (EC):dimethyl carbonate (DMC):ethylmethyl carbonate (EMC)=3:3:4 (volume ratio), and adjusted to be 1 mol/L after preparation. Further, 0.30% by mass of the first additive represented by Formula (5) and 0.02% by mass of the second additive represented by Formula (6) were added based on total mass of the non-aqueous electrolyte to prepare a non-aqueous electrolyte.

Thus, using these materials, the energy storage element in Example 1-1 having a nominal capacity of 450 mAh was produced according to the order shown in FIG. 2.

Moreover, an energy storage element in Comparative Example 1-1 was produced as follows.

The energy storage element was produced in Comparative Example 1-1 in the same manner as in Example 1-1 except that as the non-aqueous electrolyte used, $LiPF_6$ was dissolved in a mixed solvent of ethylene carbonate (EC):dimethyl carbonate (DMC):ethylmethyl carbonate (EMC)=3:3:4 (volume ratio) and adjusted to be 1 mol/L after preparation.

Energy storage elements in Examples 1-2 to 1-15 and Comparative Examples 1-2 to 1-19 were produced as follows.

In Examples 1-2 to 1-15 and Comparative Examples 1-2 to 1-19, an energy storage element was produced in the same manner as in Example 1-1 except that as the non-aqueous electrolyte used, $LiPF_6$ was dissolved in a mixed solvent of ethylene carbonate (EC):dimethyl carbonate (DMC):ethylmethyl carbonate (EMC)=3:3:4 (volume ratio) and adjusted to be 1 mol/L after preparation, and the first additive represented by Formula (5) and the second additive represented by Formula (6) were added at a concentration shown in Table 1 based on the total mass of the non-aqueous electrolyte.

Energy storage elements in Comparative Examples 1-20 to 1-37 were produced as follows.

In Comparative Examples 1-20 to 1-37, an energy storage element was produced in the same manner as in Example 1-1 except that as the non-aqueous electrolyte used, $LiPF_6$ was dissolved in a mixed solvent of ethylene carbonate (EC): dimethyl carbonate (DMC):ethylmethyl carbonate (EMC)=3:3:4 (volume ratio) and adjusted to be 1 mol/L after preparation, and two additives selected from the group consisting of the first additive represented by Formula (5), the second additive represented by Formula (6), lithium difluoro (oxalato)borate ($LiBF_2(Ox)$), and lithium bisoxalatoborate ($LiB(Ox)_2$) were added in a concentration shown in Table 2 based on the total mass of the non-aqueous electrolyte.
(4) Evaluation Test Next, an evaluation test (test of battery performance after preservation at a high temperature) was performed as follows.

Using the respective batteries in Examples 1-1 to 1-15 and Comparative Examples 1-1 to 1-37, an initial discharge capacity check test was performed according to the following method. The battery was charged to 4.2 V at 25° C. and a constant current of 450 mA, and further charged at a constant voltage of 4.2 V. The total charging time was 3 hours. Then, the battery was discharged on the condition of a constant current of 450 mA and a final voltage of 2.5 V. Thus, the initial discharge capacity was measured.

After the initial discharge capacity was measured, the battery was subjected to an exposure test at 60° C. according to the following method. The battery was charged to 4.03 V at a constant current of 450 mA, and further charged at a constant voltage of 4.03 V. The total charging time was 3 hours. The SOC (State Of Charge) of the battery was set at 80%, and preserved inside of a thermostat at 60° C. for 30 days (one month). The thermostat was cooled to 25° C., and the battery was discharged on the condition of a constant current of 450 mA and a final voltage of 2.5 V. Then, charge and discharge were performed on the same condition as that in the initial charge capacity check test. The preservation test at 60° C. was repeated for 6 months. Here, "SOC is 80%" means that a charged electricity amount is 80% of the capacity of the battery.

After the preservation test at 60° C. was repeated for 6 months, the discharge capacity after preservation was measured on the same condition as that in the measurement of the discharge capacity performed on each of the batteries at the initial stage. The ratio of the thus-obtained discharge capacity after preservation to the initial discharge capacity was defined as the capacity retention rate after preservation.

Next, the DC resistance after preservation was measured according to the following method. The battery was charged to 3.73 V at 25° C. and a constant current of 450 mA, and further charged at a constant voltage of 3.73 V. The total charging time was 3 hours. Thereby, the SOC of the battery was set at 50%, and preserved at −20° C. for 5 hours. Then, the battery was discharged at 90 mA (I1) for 10 seconds, and the voltage (E1) at this time was measured. Further, the battery was discharged at 225 mA (I2) for 10 seconds, and the voltage (E2) at this time was measured.

Using the measured values, the DC resistance value Rx at −20° C. was calculated using Rx=|(E1−E2)/discharge current (I1−I2)|.

The values of the capacity retention rate and DC resistance thus calculated are shown in Table 1 below.

Namely, in Table 1 below, in Examples 1-1 to 1-15 and Comparative Examples 1-1 to 1-19, the values of the capacity retention rate and DC resistance of the energy storage element when the amounts of the first additive ($LiPF_2(Ox)_2$) and the second additive ($LiPF_4(Ox)$) to be added are varied are compared.

are shown when the amount of the first additive ($LiPF_2(Ox)_2$) to be added is 0.3% by weight based on the total weight of the non-aqueous electrolyte. Specifically, the values of the capacity retention rate and DC resistance of the energy storage element are shown wherein in Example 1-1, the amount of the second additive ($LiPF_4(Ox)$) to be added is 0.05 times the amount of the first additive to be added; in Example 1-2, the amount of the second additive to be added is 0.17 times the amount of the first additive to be added; in Example 1-3, the amount of the second additive to be added is 0.23 times the amount of the first additive to be added; in Example 1-4, the amount of the second additive to be added is 0.30 times the amount of the first additive to be added.

In Examples 1-5 to 1-7, the values of the capacity retention rate and DC resistance of the energy storage element are shown when the amount of the first additive to be added is 0.6% by weight based on the total weight of the non-aqueous electrolyte. Specifically, the values of the capacity retention rate and DC resistance of the energy storage element are shown wherein in Example 1-5, the amount of the second additive to be added is 0.05 times the amount of the first additive to be added; in Example 1-6, the amount of the second additive to be added is 0.17 times the amount of the first additive to be added; in Example 1-7, the amount of the second additive to be added is 0.30 times the amount of the first additive to be added.

In Examples 1-8 to 1-11, the values of the capacity retention rate and DC resistance of the energy storage element are

TABLE 1

| | Added amount of $LiPF_2(Ox)_2$ [wt %] | Added amount of $LiPF_4(Ox)$ [wt %] | Ratio to $LiPF_2(Ox)_2$ | Capacity retention rate after preservation [%] | DC resistance after preservation [mΩ] |
|---|---|---|---|---|---|
| Comparative Example 1-1 | 0 | 0 | 0.00 | 62 | 698 |
| Comparative Example 1-2 | 0.20 | 0 | 0.00 | 65 | 680 |
| Comparative Example 1-3 | 0.20 | 0.01 | 0.05 | 67 | 675 |
| Comparative Example 1-4 | 0.20 | 0.06 | 0.30 | 64 | 690 |
| Comparative Example 1-5 | 0.30 | 0 | 0.00 | 75 | 552 |
| Comparative Example 1-6 | 0.30 | 0.01 | 0.03 | 76 | 546 |
| Example 1-1 | 0.30 | 0.02 | 0.05 | 85 | 498 |
| Example 1-2 | 0.30 | 0.05 | 0.17 | 82 | 485 |
| Example 1-3 | 0.30 | 0.07 | 0.23 | 88 | 462 |
| Example 1-4 | 0.30 | 0.09 | 0.30 | 83 | 475 |
| Comparative Example 1-7 | 0.30 | 0.10 | 0.33 | 74 | 523 |
| Comparative Example 1-8 | 0.60 | 0 | 0.00 | 78 | 531 |
| Comparative Example 1-9 | 0.60 | 0.02 | 0.03 | 77 | 519 |
| Example 1-5 | 0.60 | 0.03 | 0.05 | 84 | 458 |
| Example 1-6 | 0.60 | 0.10 | 0.17 | 86 | 432 |
| Example 1-7 | 0.60 | 0.18 | 0.30 | 83 | 447 |
| Comparative Example 1-10 | 0.60 | 0.20 | 0.33 | 75 | 509 |
| Comparative Example 1-11 | 0.90 | 0 | 0.00 | 79 | 515 |
| Comparative Example 1-12 | 0.90 | 0.03 | 0.03 | 77 | 509 |
| Example 1-8 | 0.90 | 0.05 | 0.05 | 89 | 424 |
| Example 1-9 | 0.90 | 0.10 | 0.11 | 87 | 413 |
| Example 1-10 | 0.90 | 0.20 | 0.22 | 90 | 399 |
| Example 1-11 | 0.90 | 0.27 | 0.30 | 85 | 402 |
| Comparative Example 1-13 | 0.90 | 0.30 | 0.33 | 72 | 498 |
| Comparative Example 1-14 | 1.00 | 0 | 0.00 | 82 | 502 |
| Comparative Example 1-15 | 1.00 | 0.04 | 0.04 | 80 | 491 |
| Example 1-12 | 1.00 | 0.05 | 0.05 | 89 | 406 |
| Example 1-13 | 1.00 | 0.10 | 0.10 | 91 | 387 |
| Example 1-14 | 1.00 | 0.20 | 0.20 | 90 | 395 |
| Example 1-15 | 1.00 | 0.30 | 0.30 | 88 | 402 |
| Comparative Example 1-16 | 1.00 | 0.35 | 0.35 | 76 | 487 |
| Comparative Example 1-17 | 1.10 | 0 | 0.00 | 70 | 581 |
| Comparative Example 1-18 | 1.10 | 0.06 | 0.05 | 68 | 562 |
| Comparative Example 1-19 | 1.10 | 0.33 | 0.30 | 71 | 577 |

Here, in Examples 1-1 to 1-4, the values of the capacity retention rate and DC resistance of the energy storage element shown when the amount of the first additive to be added is 0.9% by weight based on the total weight of the non-aqueous electrolyte. Specifically, the values of the capacity retention rate and DC resistance of the energy storage element are shown wherein in Example 1-8, the amount of the second additive to be added is 0.05 times the amount of the first additive to be added; in Example 1-9, the amount of the second additive to be added is 0.11 times the amount of the first additive to be added; in Example 1-10, the amount of the second additive to be added is 0.22 times the amount of the first additive to be added; in Example 1-11, the amount of the second additive to be added is 0.30 times the amount of the first additive to be added.

In Examples 1-12 to 1-15, the values of the capacity retention rate and DC resistance of the energy storage element are shown when the amount of the first additive to be added is 1.0% by weight based on the total weight of the non-aqueous electrolyte. Specifically, the values of the capacity retention rate and DC resistance of the energy storage element are shown wherein in Example 1-12, the amount of the second additive to be added is 0.05 times the amount of the first additive to be added; in Example 1-13, the amount of the second additive to be added is 0.10 times the amount of the first additive to be added; in Example 1-14, the amount of the second additive to be added is 0.20 times the amount of the first additive to be added; in Example 1-15, the amount of the second additive to be added is 0.30 times the amount of the first additive to be added.

In Comparative Example 1-1, the values of the capacity retention rate and DC resistance of the energy storage element are shown when no first additive or second additive are added.

In Comparative Examples 1-2 to 1-4, the values of the capacity retention rate and DC resistance of the energy storage element are shown when the amount of the first additive to be added is 0.2% by weight based on the total weight of the non-aqueous electrolyte. Specifically, the values of the capacity retention rate and DC resistance of the energy storage element are shown wherein in Comparative Example 1-2, the amount of the second additive to be added is 0 times the amount of the first additive to be added; in Comparative Example 1-3, the amount of the second additive to be added is 0.05 times the amount of the first additive to be added; in Comparative Example 1-4, the amount of the second additive to be added is 0.30 times the amount of the first additive to be added.

In Comparative Examples 1-5 to 1-7, the values of the capacity retention rate and DC resistance of the energy storage element are shown when the amount of the first additive to be added is 0.3% by weight based on the total weight of the non-aqueous electrolyte. Specifically, the values of the capacity retention rate and DC resistance of the energy storage element are shown wherein in Comparative Example 1-5, the amount of the second additive to be added is 0 times the amount of the first additive to be added; in Comparative Example 1-6, the amount of the second additive to be added is 0.03 times the amount of the first additive to be added; in Comparative Example 1-7, the amount of the second additive to be added is 0.33 times the amount of the first additive to be added.

In Comparative Examples 1-8 to 1-10, the values of the capacity retention rate and DC resistance of the energy storage element are shown when the amount of the first additive to be added is 0.6% by weight based on the total weight of the non-aqueous electrolyte. Specifically, the values of the capacity retention rate and DC resistance of the energy storage element are shown wherein in Comparative Example 1-8, the amount of the second additive to be added is 0 times the amount of the first additive to be added; in Comparative Example 1-9, the amount of the second additive to be added is 0.03 times the amount of the first additive to be added; in Comparative Example 1-10, the amount of the second additive to be added is 0.33 times the amount of the first additive to be added.

In Comparative Examples 1-11 to 1-13, the values of the capacity retention rate and DC resistance of the energy storage element are shown when the amount of the first additive to be added is 0.9% by weight based on the total weight of the non-aqueous electrolyte. Specifically, the values of the capacity retention rate and DC resistance of the energy storage element are shown wherein in Comparative Example 1-11, the amount of the second additive to be added is 0 times the amount of the first additive to be added; in Comparative Example 1-12, the amount of the second additive to be added is 0.03 times the amount of the first additive to be added; in Comparative Example 1-13, the amount of the second additive to be added is 0.33 times the amount of the first additive to be added.

In Comparative Examples 1-14 to 1-16, the values of the capacity retention rate and DC resistance of the energy storage element are shown when the amount of the first additive to be added is 1.0% by weight based on the total weight of the non-aqueous electrolyte. Specifically, the values of the capacity retention rate and DC resistance of the energy storage element are shown wherein in Comparative Example 1-14, the amount of the second additive to be added is 0 times the amount of the first additive to be added; in Comparative Example 1-15, the amount of the second additive to be added is 0.04 times the amount of the first additive to be added; in Comparative Example 1-16, the amount of the second additive to be added is 0.35 times the amount of the first additive to be added.

In Comparative Examples 1-17 to 1-19, the values of the capacity retention rate and DC resistance of the energy storage element are shown when the amount of the first additive to be added is 1.1% by weight based on the total weight of the non-aqueous electrolyte. Specifically, the values of the capacity retention rate and DC resistance of the energy storage element are shown wherein in Comparative Example 1-17, the amount of the second additive to be added is 0 times the amount of the first additive to be added; in Comparative Example 1-18, the amount of the second additive to be added is 0.05 times the amount of the first additive to be added; in Comparative Example 1-19, the amount of the second additive to be added is 0.30 times the amount of the first additive to be added.

Figure 3:
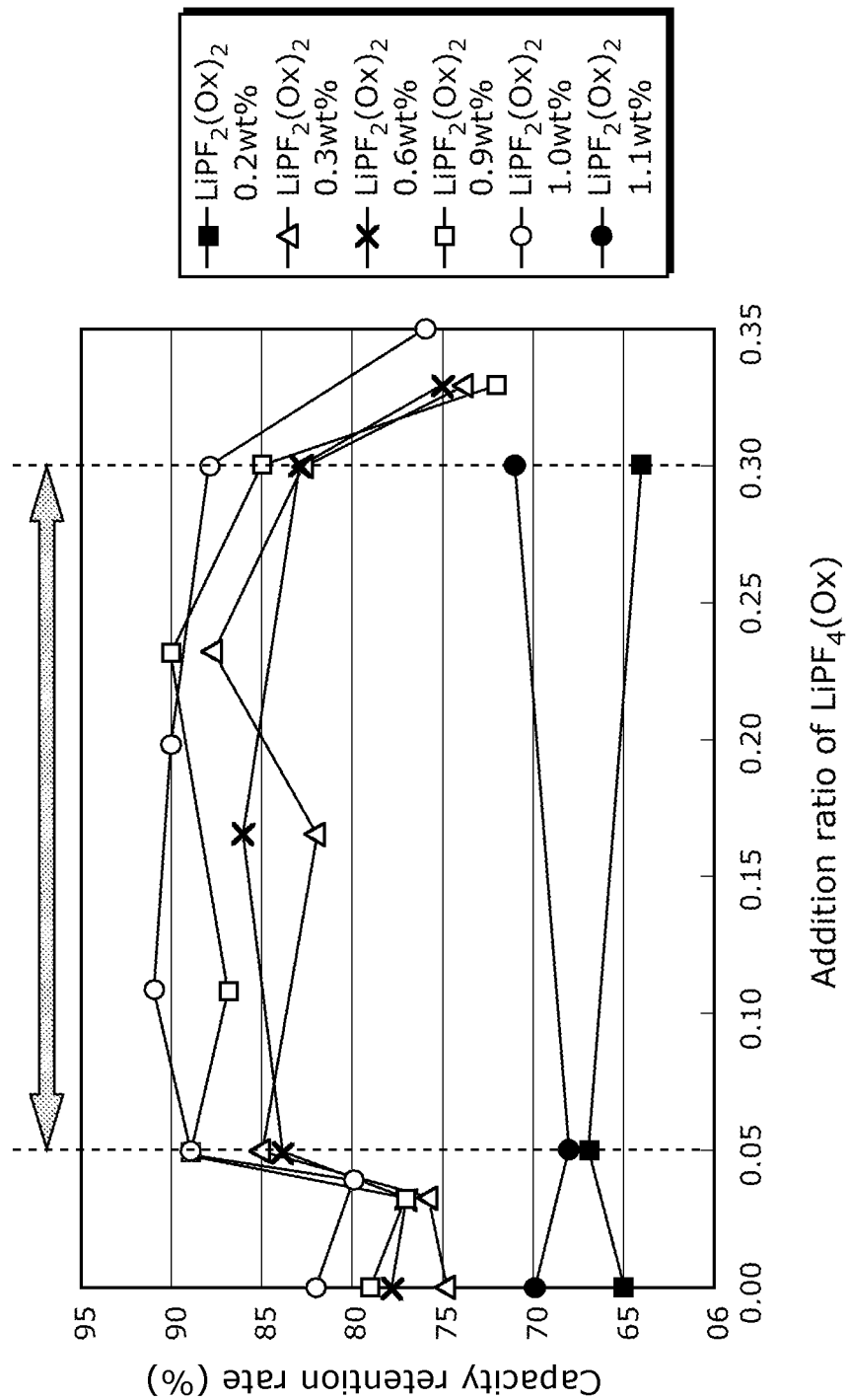
FIG. 3 is a graph showing the capacity retention rate of the energy storage element when the amount of a first additive to be added and the amount of a second additive to be added are varied.

FIG. 3 is a graph showing the capacity retention rate of the energy storage element when the amount of the first additive to be added and the amount of the second additive to be added are varied. Specifically, FIG. 3 is a graph of the values of the capacity retention rates in Examples 1-1 to 1-15 and Comparative Examples 1-1 to 1-19 for comparison of the capacity retention rate of the energy storage element.

Here, in the graph, the abscissa designates the ratio of the amount of the second additive ($LiPF_4(Ox)$) to be added to the amount of the first additive ($LiPF_2(Ox)_2$) to be added; the ordinate designates the capacity retention rate.

As shown in Table 1 above and FIG. 3, the capacity retention rate indicates a significantly high value when the amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added. Such a high capacity retention rate can suppress reduction in the storage capacity of the energy storage element.

Figure 4:
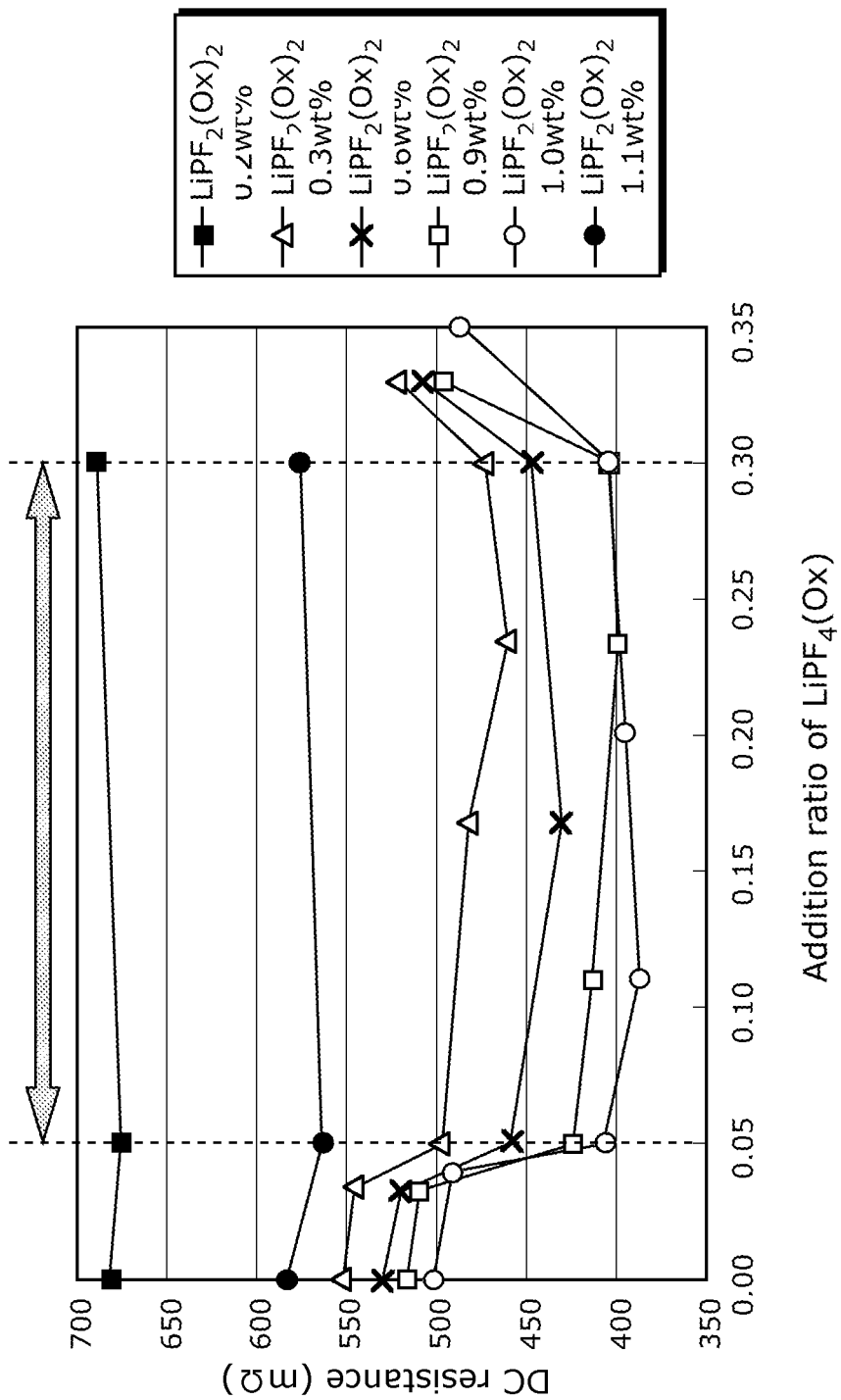
FIG. 4 is a graph showing the DC resistance of the energy storage element when the amount of the first additive to be added and the amount of the second additive to be added are varied.

FIG. 4 is a graph showing the DC resistance of the energy storage element when the amount of the first additive to be added and the amount of the second additive to be added are varied. Specifically, FIG. 4 is a graph of the values of the DC resistances in Examples 1-1 to 1-15 and Comparative Examples 1-1 to 1-19 for comparison of the DC resistance of the energy storage element.

Here, in the graph of FIG. 3, the abscissa designates the ratio of the amount of the second additive ($LiPF_4(Ox)$) to be added to the amount of the first additive ($LiPF_2(Ox)_2$) to be added; the ordinate designates the DC resistance.

As shown in Table 1 above and FIG. 4, the DC resistance indicates a significantly low value when the amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added. Such a low DC resistance enables a higher output of the energy storage element.

Next, in Table 2 below, in Examples 1-1 to 1-15 described above and Comparative Examples 1-20 to 1-37 described below, the values of the capacity retention rate and DC resistance of the energy storage element when the kinds of the additives are varied are compared.

TABLE 2

|  | Added amount of $LiPF_2(Ox)_2$ [wt %] | Added amount of $LiPF_4(Ox)$ [wt %] | Added amount of $LiBF_2(Ox)$ [wt %] | Added amount of $LiB(Ox)_2$ [wt %] | Capacity retention rate after preservation [%] | DC resistance after preservation [m Ω] |
|---|---|---|---|---|---|---|
| Comparative Example 1-20 |  |  | 0.30 |  | 68 | 602 |
| Comparative Example 1-21 |  | 0.07 | 0.30 |  | 69 | 597 |
| Comparative Example 1-22 |  |  |  | 0.30 | 72 | 645 |
| Comparative Example 1-23 |  | 0.07 |  | 0.30 | 71 | 632 |
| Comparative Example 1-24 | 0.30 |  | 0.07 |  | 74 | 564 |
| Comparative Example 1-25 | 0.30 |  |  | 0.07 | 76 | 578 |
| Example 1-1 | 0.30 | 0.02 |  |  | 85 | 498 |
| Example 1-2 | 0.30 | 0.05 |  |  | 82 | 485 |
| Example 1-3 | 0.30 | 0.07 |  |  | 88 | 462 |
| Example 1-4 | 0.30 | 0.09 |  |  | 83 | 475 |
| Comparative Example 1-26 |  |  | 0.60 |  | 73 | 608 |
| Comparative Example 1-27 |  | 0.10 | 0.60 |  | 72 | 604 |
| Comparative Example 1-28 |  |  |  | 0.60 | 75 | 658 |
| Comparative Example 1-29 |  | 0.10 |  | 0.60 | 75 | 647 |
| Comparative Example 1-30 | 0.60 |  | 0.10 |  | 76 | 542 |
| Comparative Example 1-31 | 0.60 |  |  | 0.10 | 79 | 568 |
| Example 1-5 | 0.60 | 0.03 |  |  | 84 | 458 |
| Example 1-6 | 0.60 | 0.10 |  |  | 86 | 432 |
| Example 1-7 | 0.60 | 0.18 |  |  | 83 | 447 |
| Comparative Example 1-32 |  |  | 1.00 |  | 77 | 628 |
| Comparative Example 1-33 |  | 0.10 | 1.00 |  | 76 | 635 |
| Comparative Example 1-34 |  |  |  | 1.00 | 79 | 662 |
| Comparative Example 1-35 |  | 0.10 |  | 1.00 | 77 | 671 |
| Comparative Example 1-36 | 1.00 |  | 0.10 |  | 81 | 528 |
| Comparative Example 1-37 | 1.00 |  |  | 0.10 | 83 | 549 |
| Example 1-12 | 1.00 | 0.05 |  |  | 89 | 406 |
| Example 1-13 | 1.00 | 0.10 |  |  | 91 | 387 |
| Example 1-14 | 1.00 | 0.20 |  |  | 90 | 395 |
| Example 1-15 | 1.00 | 0.30 |  |  | 88 | 402 |

Here, in Comparative Examples 1-20, 1-21, 1-24, 1-26, 1-27, 1-30, 1-32, 1-33, and 1-36, the values of the capacity retention rate and DC resistance of the energy storage element when a fourth additive LiBF$_2$(Ox) is added are shown. Namely, the fourth additive is added instead of the first additive and/or the second additive.

Specifically, the values of the capacity retention rate and DC resistance of the energy storage element are shown wherein in Comparative Example 1-20, only the fourth additive is added at an amount of 0.3% by weight based on the total weight of the non-aqueous electrolyte; in Comparative Example 1-21, the amount of the fourth additive to be added is 0.3% by weight based on the total weight of the non-aqueous electrolyte, and the amount of the second additive (LiPF$_4$(Ox)) to be added is 0.23 times the amount of the fourth additive to be added; in Comparative Example 1-24, the amount of the first additive (LiPF$_2$(Ox)$_2$) to be added is 0.3% by weight based on the total weight of the non-aqueous electrolyte, and the amount of the fourth additive to be added is 0.23 times the amount of the first additive to be added.

The values of the capacity retention rate and DC resistance of the energy storage element are shown wherein in Comparative Example 1-26, only the fourth additive is added at an amount of 0.6% by weight based on the total weight of the non-aqueous electrolyte; in Comparative Example 1-27, the amount of the fourth additive to be added is 0.6% by weight based on the total weight of the non-aqueous electrolyte, and the amount of the second additive to be added is 0.17 times the amount of the fourth additive to be added; in Comparative Example 1-30, the amount of the first additive to be added is 0.6% by weight based on the total weight of the non-aqueous electrolyte, and the amount of the fourth additive to be added is 0.17 times the amount of the first additive to be added.

The values of the capacity retention rate and DC resistance of the energy storage element are shown wherein in Comparative Example 1-32, only the fourth additive is 1.0% by weight based on the total weight of the non-aqueous electrolyte; in Comparative Example 1-33, the amount of the fourth additive to be added is 1.0% by weight based on the total weight of the non-aqueous electrolyte, and the amount of the second additive to be added is 0.10 times the amount of the fourth additive to be added; in Comparative Example 1-36, the amount of the first additive to be added is 1.0% by weight based on the total weight of the non-aqueous electrolyte, and the amount of the fourth additive to be added is 0.10 times the amount of the first additive to be added.

In Comparative Examples 1-22, 1-23, 1-25, 1-28, 1-29, 1-31, 1-34, 1-35, and 1-37, the values of the capacity retention rate and DC resistance of the energy storage element when a fifth additive LiB(Ox)$_2$ is added are shown. Namely, the fifth additive is added instead of the first additive and/or the second additive.

Specifically, the values of the capacity retention rate and DC resistance of the energy storage element are shown wherein in Comparative Example 1-22, only the fifth additive is added at an amount of 0.3% by weight based on the total weight of the non-aqueous electrolyte; in Comparative Example 1-23, the amount of the fifth additive to be added is 0.3% by weight based on the total weight of the non-aqueous electrolyte, and the amount of the second additive (LiPF$_4$(Ox)) to be added is 0.23 times the amount of the fifth additive to be added; in Comparative Example 1-25, the amount of the first additive (LiPF$_2$(Ox)$_2$) to be added is 0.3% by weight based on the total weight of the non-aqueous electrolyte, and the amount of the fifth additive to be added is 0.23 times the amount of the first additive to be added.

The values of the capacity retention rate and DC resistance of the energy storage element are shown wherein in Comparative Example 1-28, only the fifth additive is added at an amount of 0.6% by weight based on the total weight of the non-aqueous electrolyte; in Comparative Example 1-29, the amount of the fifth additive to be added is 0.6% by weight based on the total weight of the non-aqueous electrolyte, and the amount of the second additive to be added is 0.17 times the amount of the fifth additive to be added; in Comparative Example 1-31, the amount of the first additive to be added is 0.6% by weight based on the total weight of the non-aqueous electrolyte, and the amount of the fifth additive to be added is 0.17 times the amount of the first additive to be added.

The values of the capacity retention rate and DC resistance of the energy storage element are shown wherein in Comparative Example 1-34, only the fifth additive is added at an amount of 1.0% by weight based on the total weight of the non-aqueous electrolyte; in Comparative Example 1-35, the amount of the fifth additive to be added is 1.0% by weight based on the total weight of the non-aqueous electrolyte, and the amount of the second additive to be added is 0.10 times the amount of the fifth additive to be added; in Comparative Example 1-37, the amount of the first additive to be added is 1.0% by weight based on the total weight of the non-aqueous electrolyte, and the amount of the fifth additive to be added is 0.10 times the amount of the first additive to be added.

The same data is shown in Examples 1-1 to 1-15 in Table 2 and in Examples 1-1 to 1-15 in Table 1.

The capacity retention rate is 68 to 83% in Comparative Examples 1-20 to 1-37 while the capacity retention rate indicates a high value of 82 to 91% in Examples 1-1 to 1-15. Namely, addition of the first additive and the second additive provides a significantly higher value of the capacity retention rate as in Examples 1-1 to 1-15 than addition of the fourth additive or the fifth additive as in Comparative Examples 1-20 to 1-37. Such a high capacity retention rate can suppress reduction in the storage capacity of the energy storage element.

The DC resistance is 528 to 671 mΩ in Comparative Examples 1-20 to 1-37 while the DC resistance indicates a low value of 387 to 498 mΩ in Examples 1-1 to 1-15. Namely, addition of the first additive and the second additive provides a significantly low value of the DC resistance as in Examples 1-1 to 1-15 than addition of the fourth additive or the fifth additive as in Comparative Examples 1-20 to 1-37. Such a low DC resistance enables a higher output of the energy storage element.

Thus, use of a combination of the first additive and the second additive as the additives can improve the capacity retention rate, and reduce the DC resistance. As a result, a remarkable effect of improving the battery performance can be obtained.

As above, according to the energy storage element 1 according to Embodiment, the non-aqueous electrolyte 6 contains the first additive represented by Formula (5) and the second additive represented by Formula (6), wherein the amount of the first additive to be added is not less than 0.3% by weight and not more than 1.0% by weight based on the total weight of the non-aqueous electrolyte 6, and the amount of the second additive to be added is not less than 0.05 times and not more than 0.3 times the amount of the first additive to be added. Here, as a result of extensive research and studies, the present inventors found out that the battery performance such as high temperature preservation properties can be efficiently improved by adding a predetermined amount of the first additive and a predetermined amount of the second additive to the non-aqueous electrolyte 6. For this reason, the energy storage element 1 can obtain the battery performance such as high temperature preservation properties efficiently improved by adding a predetermined amount of the first additive and a predetermined amount of the second additive to the non-aqueous electrolyte 6.

Moreover, the method of producing the energy storage element 1 according to Embodiment includes: adding the first additive and the second additive to the non-aqueous electrolyte 6; and injecting the non-aqueous electrolyte 6 having the additives into the energy storage element 1. In the addition step, the first additive is added at an amount of not less than 0.3% by weight and not more than 1.0% by weight based on the total weight of the non-aqueous electrolyte 6, and the second additive is added at an amount not less than 0.05 times and not more than 0.3 times the amount of the first additive to be added. Thus, the method of producing the energy storage element 1 enables production of an energy storage element whose battery performance such as high temperature preservation properties can be efficiently improved by adding a predetermined amount of the first additive and a predetermined amount of the second additive to the non-aqueous electrolyte 6.

The method of producing the energy storage element 1 also includes pre-charging the energy storage element 1 more than once before sealing the non-aqueous electrolyte injection hole, wherein the energy storage element 1 has the non-aqueous electrolyte 6 having the first additive and the second additive added thereto. Here, the present inventors found out that the battery performance such as high temperature preservation properties can be efficiently improved because a gas generated by addition of the first additive and the second additive can be discharged to the outside of the battery by pre-charging the energy storage element more than once before sealing the electrolyte injection hole 31 in the state where the non-aqueous electrolyte 6 has the first additive and the second additive added thereto. For this reason, the method of producing the energy storage element 1 enables production of the energy storage element 1 whose battery performance such as high temperature preservation properties can be efficiently improved by pre-charging the energy storage element more than once before sealing the non-aqueous electrolyte injection hole.

The present invention can be realized not only as such an energy storage element 1 or method of producing the energy storage element 1, but also as the non-aqueous electrolyte 6 having the first additive and the second additive added thereto.

Modification 1

Next, Modification 1 of Embodiment above will be described. In Embodiment, known materials can be properly used as the negative electrode active material used in the energy storage element 1 as long as the material is a negative electrode active material that can occlude and release lithium ions.

In Modification 1, however, a non-graphitizable carbon (hard carbon) having an average particle size D50 of 6 μm or less is used as the negative electrode active material used in the energy storage element 1. Here, the average particle size D50 (also referred to as a 50% particle size or a median diameter) is a particle size in particle size distribution at a cumulative value of 50%. More specifically, the average particle size D50 means a particle size when a powder is divided into two based on the particle size, and the powder in a larger particle size range is equal to the powder in a smaller particle size range.

It is difficult to handle a non-graphitizable carbon having an average particle size D50 less than 2 μm because of its excessively small particle size, leading to increased production cost. Additionally, such a non-graphitizable carbon has a problem of productivity: for example, the non-graphitizable carbon cannot be applied stably in application of the non-graphitizable carbon to the negative electrode. For this reason, the non-graphitizable carbon preferably has an average particle size D50 of 2 μm or more. The configuration other than the negative electrode active material is the same as that of the energy storage element 1 according to Embodiment, and therefore the description will be omitted.

Namely, as the electrolyte injecting step in FIG. 2 (S104 in FIG. 2), the non-aqueous electrolyte 6 having the additives added thereto is injected via the electrolyte injection hole 31 into the energy storage element 1 including the negative electrode including the non-graphitizable carbon having an average particle size D50 of 6 μm or less as the negative electrode active material. As described above, the non-graphitizable carbon preferably has an average particle size D50 of 2 μm or more. The steps other than the electrolyte injecting step are the same as those in the method of producing the energy storage element 1 according to Embodiment, and therefore the description will be omitted.

As above, the first additive and the second additive are added to the non-aqueous electrolyte 6 in the energy storage element 1 including the non-graphitizable carbon having an average particle size D50 of 6 μm or less as the negative electrode active material, and the energy storage element 1 is pre-charged. Thereby, the function of the mixed coating of the first additive and the second additive is improved, therefore suppressing reduction in the capacity retention rate accompanied by preservation at a high temperature and increase in the DC resistance.

Hereinafter, an effect of adding the first additive and the second additive to the non-aqueous electrolyte 6 in the energy storage element 1 including the non-graphitizable carbon as the negative electrode active material will be described in detail.

EXAMPLES

Examples of the energy storage element 1 and its production method according to Modification 1 will be described. Examples 2-1 to 2-40 below all relate to the energy storage element 1 and its production method according to Modification 1 described above. In Examples 2-1 to 2-40 and Comparative Examples 2-1 to 2-152 described below, the production and evaluation test of the energy storage element 1 were performed under the same conditions except that the kinds and amounts of the additives to be added to the non-aqueous electrolyte 6 and the kind and particle size of the negative electrode active material were different.

Specifically, an energy storage element in Example 2-1 was produced as follows.

(1) Production of Positive Electrode Plate

5% by mass of polyvinylidene fluoride as the binder, 5% by mass of acetylene black as the conductive agent, and 90% by mass of $LiNi_{0.17}Co_{0.66}Mn_{0.17}O_2$ as the positive electrode active material were mixed. N-methyl-2-pyrrolidone was added to the mixture to prepare a paste. The paste was applied to both surfaces of a positive electrode current collector having a thickness of 20 μm and formed of an aluminum foil, and dried. Thus, a positive electrode plate was produced, and a positive electrode lead was attached to the positive electrode plate.

(2) Production of Negative Electrode Plate

As the negative electrode active material, 92% by mass of a non-graphitizable carbon and 8% by mass of polyvinylidene fluoride as the binder were added to N-methyl-2-pyrrolidone to prepare a paste. The non-graphitizable carbon had an average particle size D50 of 6 μm obtained by measurement using a laser diffraction particle size distribution analyzer SALD2200 made by SHIMADZU Corporation according to laser diffractometry. Then, the obtained pastes was applied to both surfaces of a negative electrode current collector having a thickness of 10 μm and formed of a copper foil. Thus, a negative electrode plate was produced, and a negative electrode lead was attached to the negative electrode plate.

(3) Production of Battery

As the separator, a polyethylene microporous membrane was used. The non-aqueous electrolyte used was prepared according to the following method. Namely, LiPF$_6$ was dissolved in a mixed solvent of ethylene carbonate (EC):dimethyl carbonate (DMC):ethylmethyl carbonate (EMC)=3:3:4 (volume ratio), and adjusted to be 1 mol/L after preparation. Further, 0.30% by weight of the first additive represented by Formula (5) and 0.02% by weight of the second additive represented by Formula (6) in Embodiment were added based on the total mass of the non-aqueous electrolyte to prepare a non-aqueous electrolyte.

Thus, using these materials, the energy storage element in Example 2-1 having a nominal capacity of 450 mAh was produced according to the order shown in FIG. 2.

Moreover, an energy storage element in Comparative Example 2-1 was produced as follows.

As the negative electrode active material, a graphite having an average particle size D50 of 6 μm obtained by measurement by the laser diffractometry was used instead of the non-graphitizable carbon in Example 2-1. Instead of the non-aqueous electrolyte in Example 2-1, a non-aqueous electrolyte having 0% by weight of the first additive and the second additive (not added) was used. Then, an energy storage element in Comparative Example 2-1 was produced in the same manner as in Example 2-1 except that the negative electrode active material and the non-aqueous electrolyte were different.

In Examples 2-2 to 2-40 and Comparative Examples 2-2 to 2-152, energy storage elements were produced in the same manner as in Example 2-1 or Comparative Example 2-1 as shown in Table 3. Table 3 below shows the kind and particle size of the negative electrode active material and the amounts of the first additive and the second additive to be added to the non-aqueous electrolyte in Examples 2-1 to 2-40 and Comparative Examples 2-1 to 2-152. Namely, in Examples 2-2 to 2-40 and Comparative Examples 2-2 to 2-152, instead of the negative electrode active material and the non-aqueous electrolyte in Example 2-1 or Comparative Example 2-1, the negative electrode active material was used whose kind and particle size are shown in Table 3. Moreover, the first additive and second additive were added at the amounts shown in Table 3 to prepare the non-aqueous electrolyte. Thus, the respective energy storage elements were produced.

TABLE 3

| Added amount of LiPF$_2$(Ox)$_2$ [wt %] | Added amount of LiPF$_4$(Ox)$_2$ [wt %] | Ratio to LiPF$_2$(Ox)$_2$ | Graphite _6 μm | SC_6 μm | HC_15 μm | HC_9 μm | HC_6 μm | HC_5 μm | HC_3 μm | HC_2 μm |
|---|---|---|---|---|---|---|---|---|---|---|
| 0.0 | 0.00 | 0.00 | Comp. Example 2-1 | Comp. Example 2-25 | Comp. Example 2-49 | Comp. Example 2-73 | Comp. Example 2-97 | Comp. Example 2-111 | Comp. Example 2-125 | Comp. Example 2-139 |
| 0.2 | 0.01 | 0.05 | Comp. Example 2-2 | Comp. Example 2-26 | Comp. Example 2-50 | Comp. Example 2-74 | Comp. Example 2-98 | Comp. Example 2-112 | Comp. Example 2-126 | Comp. Example 2-140 |
| 0.2 | 0.04 | 0.20 | Comp. Example 2-3 | Comp. Example 2-27 | Comp. Example 2-51 | Comp. Example 2-75 | Comp. Example 2-99 | Comp. Example 2-113 | Comp. Example 2-127 | Comp. Example 2-141 |
| 0.2 | 0.06 | 0.30 | Comp. Example 2-4 | Comp. Example 2-28 | Comp. Example 2-52 | Comp. Example 2-76 | Comp. Example 2-100 | Comp. Example 2-114 | Comp. Example 2-128 | Comp. Example 2-142 |
| 0.3 | 0.01 | 0.03 | Comp. Example 2-5 | Comp. Example 2-29 | Comp. Example 2-53 | Comp. Example 2-77 | Comp. Example 2-101 | Comp. Example 2-115 | Comp. Example 2-129 | Comp. Example 2-143 |
| 0.3 | 0.02 | 0.07 | Comp. Example 2-6 | Comp. Example 2-30 | Comp. Example 2-54 | Comp. Example 2-78 | Example 2-1 | Example 2-11 | Example 2-21 | Example 2-31 |
| 0.3 | 0.05 | 0.17 | Comp. Example 2-7 | Comp. Example 2-31 | Comp. Example 2-55 | Comp. Example 2-79 | Example 2-2 | Example 2-12 | Example 2-22 | Example 2-32 |
| 0.3 | 0.09 | 0.30 | Comp. Example 2-8 | Comp. Example 2-32 | Comp. Example 2-56 | Comp. Example 2-80 | Example 2-3 | Example 2-13 | Example 2-23 | Example 2-33 |
| 0.3 | 0.10 | 0.33 | Comp. Example 2-9 | Comp. Example 2-33 | Comp. Example 2-57 | Comp. Example 2-81 | Comp. Example 2-102 | Comp. Example 2-116 | Comp. Example 2-130 | Comp. Example 2-144 |
| 0.5 | 0.02 | 0.04 | Comp. Example 2-10 | Comp. Example 2-34 | Comp. Example 2-58 | Comp. Example 2-82 | Comp. Example 2-103 | Comp. Example 2-117 | Comp. Example 2-131 | Comp. Example 2-145 |
| 0.5 | 0.03 | 0.06 | Comp. Example 2-11 | Comp. Example 2-35 | Comp. Example 2-59 | Comp. Example 2-83 | Example 2-4 | Example 2-14 | Example 2-24 | Example 2-34 |
| 0.5 | 0.05 | 0.10 | Comp. Example 2-12 | Comp. Example 2-36 | Comp. Example 2-60 | Comp. Example 2-84 | Example 2-5 | Example 2-15 | Example 2-25 | Example 2-35 |
| 0.5 | 0.10 | 0.20 | Comp. Example 2-13 | Comp. Example 2-37 | Comp. Example 2-61 | Comp. Example 2-85 | Example 2-6 | Example 2-16 | Example 2-26 | Example 2-36 |

TABLE 3-continued

| Added amount of LiPF$_2$(Ox)$_2$ [wt %] | Added amount of LiPF$_4$(Ox) [wt %] | Ratio to LiPF$_2$(Ox)$_2$ | Graphite _6 μm | SC_6 μm | HC_15 μm | HC_9 μm | HC_6 μm | HC_5 μm | HC_3 μm | HC_2 μm |
|---|---|---|---|---|---|---|---|---|---|---|
| 0.5 | 0.20 | 0.40 | Comp. Example 2-14 | Comp. Example 2-38 | Comp. Example 2-62 | Comp. Example 2-86 | Comp. Example 2-104 | Comp. Example 2-118 | Comp. Example 2-132 | Comp. Example 2-146 |
| 1.0 | 0.00 | 0.00 | Comp. Example 2-15 | Comp. Example 2-39 | Comp. Example 2-63 | Comp. Example 2-87 | Comp. Example 2-105 | Comp. Example 2-119 | Comp. Example 2-133 | Comp. Example 2-147 |
| 1.0 | 0.04 | 0.04 | Comp. Example 2-16 | Comp. Example 2-40 | Comp. Example 2-64 | Comp. Example 2-88 | Comp. Example 2-106 | Comp. Example 2-120 | Comp. Example 2-134 | Comp. Example 2-148 |
| 1.0 | 0.05 | 0.05 | Comp. Example 2-17 | Comp. Example 2-41 | Comp. Example 2-65 | Comp. Example 2-89 | Example 2-7 | Example 2-17 | Example 2-27 | Example 2-37 |
| 1.0 | 0.10 | 0.10 | Comp. Example 2-18 | Comp. Example 2-42 | Comp. Example 2-66 | Comp. Example 2-90 | Example 2-8 | Example 2-18 | Example 2-28 | Example 2-38 |
| 1.0 | 0.20 | 0.20 | Comp. Example 2-19 | Comp. Example 2-43 | Comp. Example 2-67 | Comp. Example 2-91 | Example 2-9 | Example 2-19 | Example 2-29 | Example 2-39 |
| 1.0 | 0.30 | 0.30 | Comp. Example 2-20 | Comp. Example 2-44 | Comp. Example 2-68 | Comp. Example 2-92 | Example 2-10 | Example 2-20 | Example 2-30 | Example 2-40 |
| 1.0 | 0.35 | 0.35 | Comp. Example 2-21 | Comp. Example 2-45 | Comp. Example 2-69 | Comp. Example 2-93 | Comp. Example 2-107 | Comp. Example 2-121 | Comp. Example 2-135 | Comp. Example 2-149 |
| 1.2 | 0.00 | 0.00 | Comp. Example 2-22 | Comp. Example 2-46 | Comp. Example 2-70 | Comp. Example 2-94 | Comp. Example 2-108 | Comp. Example 2-122 | Comp. Example 2-136 | Comp. Example 2-150 |
| 1.2 | 0.10 | 0.08 | Comp. Example 2-23 | Comp. Example 2-47 | Comp. Example 2-71 | Comp. Example 2-95 | Comp. Example 2-109 | Comp. Example 2-123 | Comp. Example 2-137 | Comp. Example 2-151 |
| 1.2 | 0.20 | 0.17 | Comp. Example 2-24 | Comp. Example 2-48 | Comp. Example 2-72 | Comp. Example 2-96 | Comp. Example 2-110 | Comp. Example 2-124 | Comp. Example 2-138 | Comp. Example 2-152 |

Here, "Added amount of LiPF$_2$(Ox)$_2$" shown in Table 3 indicates the amount of the first additive to be added to the non-aqueous electrolyte, and "Added amount of LiPF$_4$(Ox)" indicates the amount of the second additive to be added to the non-aqueous electrolyte. In the column of "Added amount of LiPF$_4$(Ox)," "Ratio to LiPF$_2$(Ox)$_2$" indicates the value of the ratio of the amount of the second additive to be added to the amount of the first additive to be added (Added amount of LiPF$_4$(Ox)/Added amount of LiPF$_2$(Ox)$_2$).

"Graphite_6 μm" indicates use of a graphite having an average particle size D50 of 6 μm as the negative electrode active material. "SC_6 μm" indicates use of a graphitizable carbon (soft carbon) having an average particle size D50 of 6 μm as the negative electrode active material. "HC_15 μm" indicates use of a non-graphitizable carbon (hard carbon) having an average particle size D50 of 15 μm as the negative electrode active material. "HC_9 μm" indicates use of a non-graphitizable carbon (hard carbon) having an average particle size D50 of 9 μm as the negative electrode active material. "HC_6 μm" indicates use of a non-graphitizable carbon (hard carbon) having an average particle size D50 of 6 μm as the negative electrode active material. "HC_5 μm" indicates use of a non-graphitizable carbon (hard carbon) having an average particle size D50 of 5 μm as the negative electrode active material. "HC_3 μm" indicates use of a non-graphitizable carbon (hard carbon) having an average particle size D50 of 3 μm as the negative electrode active material. "HC_2 μm" indicates use of a non-graphitizable carbon (hard carbon) having an average particle size D50 of 2 μm as the negative electrode active material.

Namely, in Examples 2-1 to 2-40, the amount of the first additive to be added is not less than 0.3% by weight and not more than 1.0% by weight based on the total weight of the non-aqueous electrolyte. The amount of the second additive to be added is not less than 0.05 times and not more than 0.3 times the amount of the first additive to be added. As the negative electrode active material, a non-graphitizable carbon having an average particle size D50 of not less than 2 μm and not more than 6 μm is used.

(4) Evaluation Test

Next, an evaluation test (test of battery performance after preservation at a high temperature) was performed as follows.

Using the respective batteries in Examples 2-1 to 2-40 and Comparative Examples 2-1 to 2-152, an initial discharge capacity check test was performed according to the following method. The battery was charged to 4.2 V at 25° C. and a constant current of 450 mA, and further charged at a constant voltage of 4.2 V. The total charging time was 3 hours. Then, the battery was discharged on the condition of a constant current of 450 mA and a final voltage of 2.5 V. Thus, the initial discharge capacity was measured.

Next, an initial DC resistance was measured according to the following method. The battery was charged to 3.73 V at 25° C. and a constant current of 450 mA, and further charged at a constant voltage of 3.73 V. The total charging time was 3 hours. Thereby, the SOC (State Of Charge) of the battery was set at 50%. The battery was kept at −20° C. for 5 hours, and discharged at 90 mA (I1) for 10 seconds. The voltage at this time (E1$_0$) was measured. The battery was discharged at 225 mA (I2) for 10 seconds. The voltage at this time (E2$_0$) was measured. Using the measured values, the initial DC resistance value R$_0$ at −20° C. was calculated using R$_0$=|(E1$_0$−E2$_0$)/discharge current (I1−I2)|. Here, "SOC is 50%" means that a charged electricity amount is 50% of the capacity of the battery.

After the initial discharge capacity and the initial DC resistance were measured, each of the batteries was subjected to an exposure test at 60° C. according to the following method. The battery was charged to 4.03 V at a constant current of 450 mA, and further charged at a constant voltage of 4.03 V. The total charging time was 3 hours. The SOC of the battery was set at 80%, and preserved inside of a thermostat at 60° C. for 30 days (one month). The thermostat was cooled to 25° C., and the battery was discharged on the condition of a constant current of 450 mA and a final voltage of 2.5 V. Then, charge and discharge were performed on the same condition as that in the initial charge capacity check test. The preservation test at 60° C. was repeated for 6 months.

After the preservation test at 60° C. was repeated for 6 months, the discharge capacity after preservation was measured on the same condition as that in the measurement of the discharge capacity performed on each of the batteries at the initial stage. The ratio of the thus-obtained discharge capacity after preservation to the initial discharge capacity was defined as the capacity retention rate after preservation.

Next, the DC resistance value Rx after preservation was measured on the same condition as that in the measurement of the DC resistance value performed on each of the batteries at the initial stage. The increase rate of the thus-obtained DC resistance after preservation to the initial DC resistance (DC resistance increase rate) was calculated using the following expression $(R_x - R_0)/R_0 \times 100$.

The values of the capacity retention rate thus calculated are shown in Table 4 below, and the values of the DC resistance increase rate are shown in Table 5. Namely, in Table 4 and Table 5 below, in Examples 2-1 to 2-40 and Comparative Examples 2-1 to 2-152 shown in Table 3 above, the values of the capacity retention rate of the energy storage element and the values of the DC resistance increase rate thereof are compared wherein the amount of the first additive ($LiPF_2(Ox)_2$) to be added, the amount of the second additive ($LiPF_4(Ox)$) to be added, and the kind and particle size of the negative electrode active material are varied.

TABLE 4

| Added amount of $LiPF_2(Ox)_2$ [wt %] | Added amount of $LiPF_4(Ox)$ [wt %] | Ratio to $LiPF_2(Ox)_2$ | Graphite _6 μm | SC_6 μm | HC_15 μm | HC_9 μm | HC_6 μm | HC_5 μm | HC_3 μm | HC_2 μm |
|---|---|---|---|---|---|---|---|---|---|---|
| 0.0 | 0.00 | 0.00 | 48 | 63 | 68 | 66 | 62 | 64 | 58 | 60 |
| 0.2 | 0.01 | 0.05 | 52 | 65 | 69 | 68 | 65 | 69 | 65 | 66 |
| 0.2 | 0.04 | 0.20 | 54 | 66 | 69 | 67 | 67 | 70 | 64 | 67 |
| 0.2 | 0.06 | 0.30 | 50 | 64 | 71 | 69 | 64 | 68 | 65 | 64 |
| 0.3 | 0.01 | 0.03 | 55 | 68 | 70 | 72 | 75 | 73 | 77 | 74 |
| 0.3 | 0.02 | 0.07 | 60 | 73 | 74 | 74 | 85 | 84 | 87 | 86 |
| 0.3 | 0.05 | 0.17 | 59 | 74 | 76 | 73 | 82 | 83 | 87 | 89 |
| 0.3 | 0.09 | 0.30 | 58 | 71 | 75 | 75 | 83 | 83 | 89 | 89 |
| 0.3 | 0.10 | 0.33 | 56 | 70 | 71 | 71 | 74 | 70 | 75 | 74 |
| 0.5 | 0.02 | 0.04 | 62 | 73 | 74 | 76 | 77 | 75 | 76 | 78 |
| 0.5 | 0.03 | 0.06 | 66 | 74 | 79 | 80 | 87 | 88 | 90 | 88 |
| 0.5 | 0.05 | 0.10 | 65 | 75 | 75 | 76 | 85 | 89 | 86 | 91 |
| 0.5 | 0.10 | 0.20 | 67 | 78 | 76 | 79 | 88 | 87 | 88 | 89 |
| 0.5 | 0.20 | 0.40 | 60 | 74 | 72 | 77 | 76 | 76 | 77 | 76 |
| 1.0 | 0.00 | 0.00 | 68 | 83 | 86 | 84 | 82 | 85 | 81 | 82 |
| 1.0 | 0.04 | 0.04 | 70 | 88 | 85 | 86 | 80 | 82 | 82 | 80 |
| 1.0 | 0.05 | 0.05 | 72 | 86 | 88 | 85 | 89 | 92 | 92 | 94 |
| 1.0 | 0.10 | 0.10 | 69 | 88 | 87 | 84 | 91 | 93 | 91 | 92 |
| 1.0 | 0.20 | 0.20 | 71 | 87 | 86 | 84 | 90 | 90 | 93 | 93 |
| 1.0 | 0.30 | 0.30 | 70 | 84 | 83 | 85 | 92 | 91 | 91 | 92 |
| 1.0 | 0.35 | 0.35 | 66 | 83 | 86 | 81 | 76 | 86 | 79 | 80 |
| 1.2 | 0.00 | 0.00 | 65 | 79 | 81 | 84 | 82 | 86 | 81 | 79 |
| 1.2 | 0.10 | 0.08 | 68 | 78 | 84 | 79 | 78 | 84 | 80 | 85 |
| 1.2 | 0.20 | 0.17 | 62 | 82 | 83 | 83 | 81 | 82 | 83 | 81 |

TABLE 5

| Added amount of $LiPF_2(Ox)_2$ [wt %] | Added amount of $LiPF_4(Ox)$ [wt %] | Ratio to $LiPF_2(Ox)_2$ | Graphite _6 μm | SC_6 μm | HC_15 μm | HC_9 μm | HC_6 μm | HC_5 μm | HC_3 μm | HC_2 μm |
|---|---|---|---|---|---|---|---|---|---|---|
| 0.0 | 0.00 | 0.00 | 102 | 82 | 76 | 81 | 85 | 86 | 91 | 88 |
| 0.2 | 0.01 | 0.05 | 87 | 75 | 70 | 72 | 71 | 76 | 74 | 72 |
| 0.2 | 0.04 | 0.20 | 82 | 68 | 65 | 70 | 64 | 68 | 63 | 69 |
| 0.2 | 0.06 | 0.30 | 83 | 70 | 68 | 64 | 68 | 70 | 65 | 67 |
| 0.3 | 0.01 | 0.03 | 81 | 73 | 65 | 67 | 62 | 61 | 68 | 64 |
| 0.3 | 0.02 | 0.07 | 70 | 62 | 53 | 52 | 29 | 31 | 38 | 30 |
| 0.3 | 0.05 | 0.17 | 68 | 64 | 51 | 55 | 30 | 34 | 32 | 34 |
| 0.3 | 0.09 | 0.30 | 69 | 61 | 55 | 56 | 34 | 28 | 35 | 29 |
| 0.3 | 0.10 | 0.33 | 78 | 72 | 67 | 64 | 63 | 57 | 64 | 65 |
| 0.5 | 0.02 | 0.04 | 71 | 67 | 58 | 53 | 55 | 51 | 56 | 58 |
| 0.5 | 0.03 | 0.06 | 59 | 52 | 41 | 35 | 24 | 19 | 16 | 22 |
| 0.5 | 0.05 | 0.10 | 60 | 49 | 38 | 39 | 21 | 21 | 24 | 21 |
| 0.5 | 0.10 | 0.20 | 64 | 54 | 43 | 41 | 23 | 16 | 23 | 18 |
| 0.5 | 0.20 | 0.40 | 68 | 64 | 54 | 54 | 55 | 49 | 50 | 55 |
| 1.0 | 0.00 | 0.00 | 65 | 59 | 55 | 54 | 52 | 57 | 53 | 59 |
| 1.0 | 0.04 | 0.04 | 60 | 64 | 59 | 57 | 53 | 55 | 51 | 61 |

TABLE 5-continued

| Added amount of $LiPF_2(Ox)_2$ [wt %] | Added amount of $LiPF_4(Ox)$ [wt %] | Ratio to $LiPF_2(Ox)_2$ | Graphite _6 μm | SC_6 μm | HC_15 μm | HC_9 μm | HC_6 μm | HC_5 μm | HC_3 μm | HC_2 μm |
|---|---|---|---|---|---|---|---|---|---|---|
| 1.0 | 0.05 | 0.05 | 48 | 43 | 37 | 39 | 23 | 19 | 20 | 21 |
| 1.0 | 0.10 | 0.10 | 45 | 41 | 39 | 35 | 19 | 22 | 18 | 22 |
| 1.0 | 0.20 | 0.20 | 51 | 38 | 41 | 37 | 15 | 21 | 13 | 17 |
| 1.0 | 0.30 | 0.30 | 49 | 40 | 43 | 41 | 24 | 18 | 16 | 23 |
| 1.0 | 0.35 | 0.35 | 61 | 59 | 49 | 50 | 53 | 52 | 55 | 52 |
| 1.2 | 0.00 | 0.00 | 60 | 54 | 50 | 52 | 48 | 51 | 49 | 55 |
| 1.2 | 0.10 | 0.08 | 55 | 48 | 47 | 48 | 42 | 46 | 47 | 53 |
| 1.2 | 0.20 | 0.17 | 56 | 46 | 44 | 46 | 46 | 41 | 43 | 47 |

FIG. 5A to FIG. 5E each are a graph showing the capacity retention rate of the energy storage element when the amount of the first additive, the amount of the second additive to be added, and the kind and particle size of the negative electrode active material are varied.

Figure 5A:
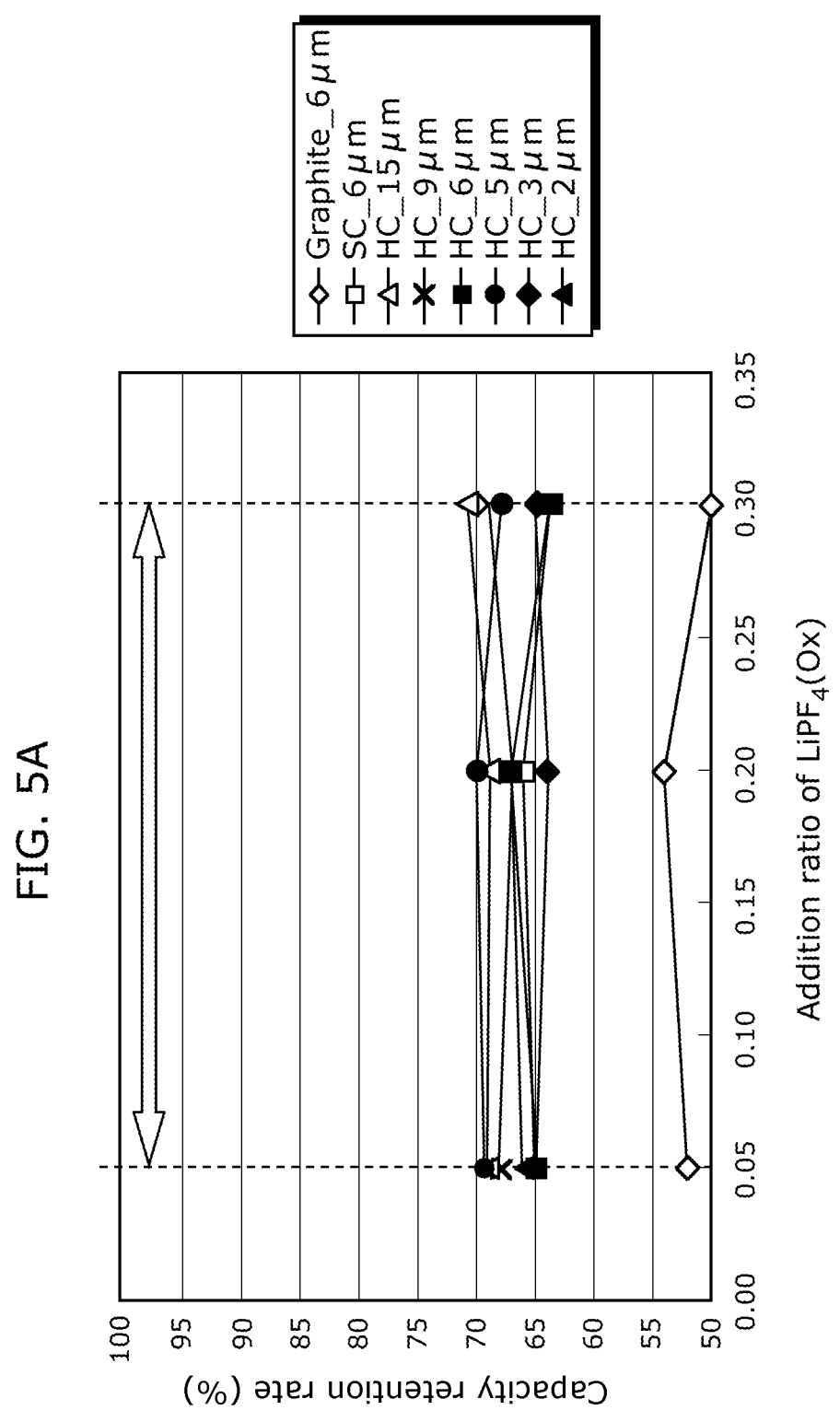

Specifically, FIG. 5A is a graph showing the capacity retention rate of the energy storage element wherein 0.2% by weight of the first additive is added, and the amount of the second additive to be added and the kind and particle size of the negative electrode active material are varied. In FIG. 5A, the values of capacity retention rate in Comparative Examples 2-2 to 2-4, 2-26 to 2-28, 2-50 to 2-52, 2-74 to 2-76, 2-98 to 2-100, 2-112 to 2-114, 2-126 to 2-128, and 2-140 to 2-142 are shown as a graph.

Here, in the graph of FIG. 5A, the abscissa designates the ratio of the amount of the second additive ($LiPF_4(Ox)$) to be added to the amount of the first additive ($LiPF_2(Ox)_2$) to be added, and the ordinate designates the capacity retention rate.

Figure 5B:
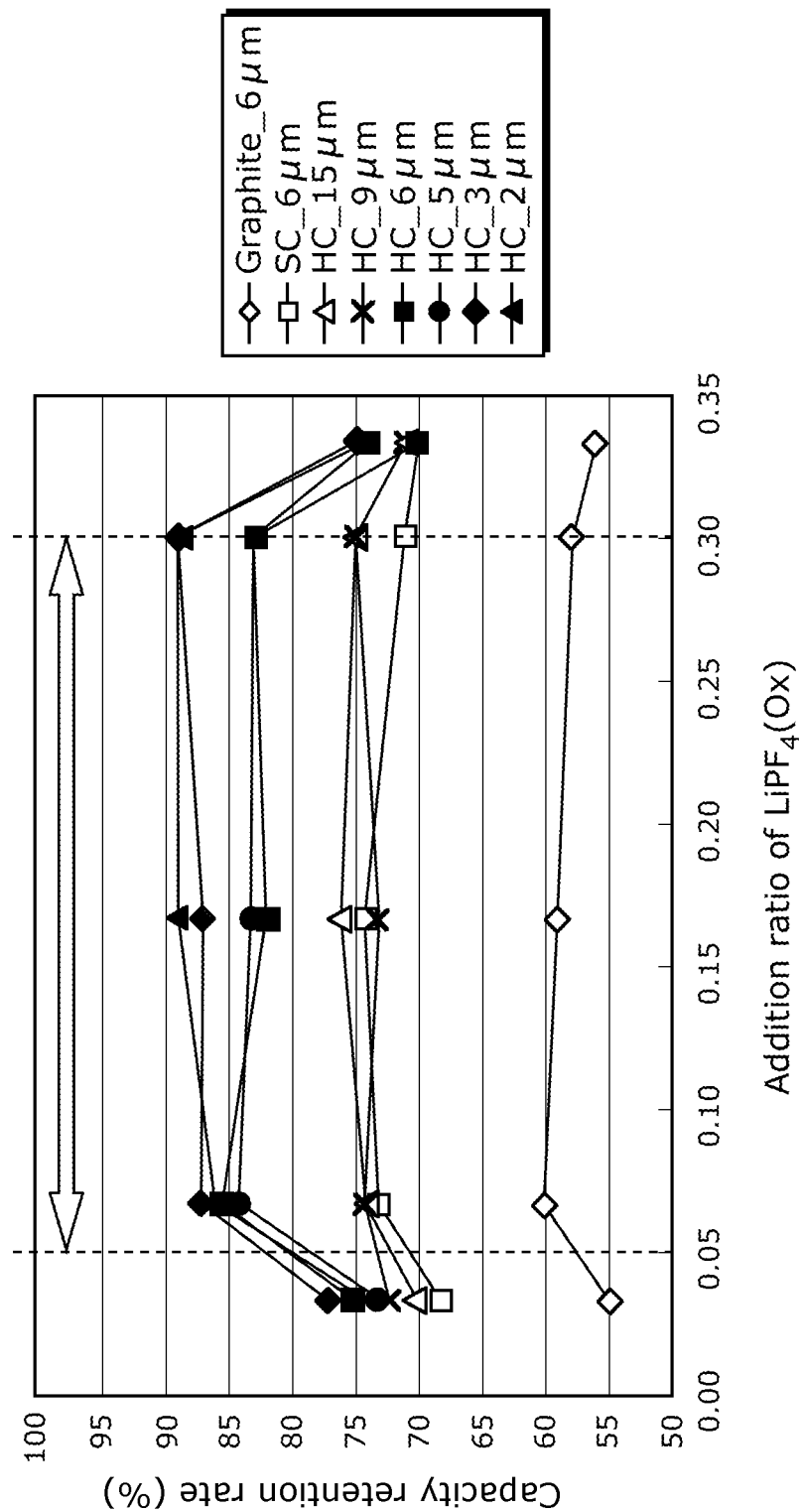
FIG. 5B is a graph showing the capacity retention rate of the energy storage element when 0.3% by weight of the first additive is added, and the amount of the second additive to be added and the kind and particle size of the negative electrode active material are varied.

Similarly, FIG. 5B is a graph showing the capacity retention rate of the energy storage element wherein 0.3% by weight of the first additive is added, and the amount of the second additive to be added and the kind and particle size of the negative electrode active material are varied. In FIG. 5B, the values of the capacity retention rate in Examples 2-1 to 2-3, 2-11 to 2-13, 2-21 to 2-23, and 2-31 to 2-33 and Comparative Examples 2-5 to 2-9, 2-29 to 2-33, 2-53 to 2-57, 2-77 to 2-81, 2-101, 2-102, 2-115, 2-116, 2-129, 2-130, 2-143, and 2-144 are shown as a graph.

Figure 5C:
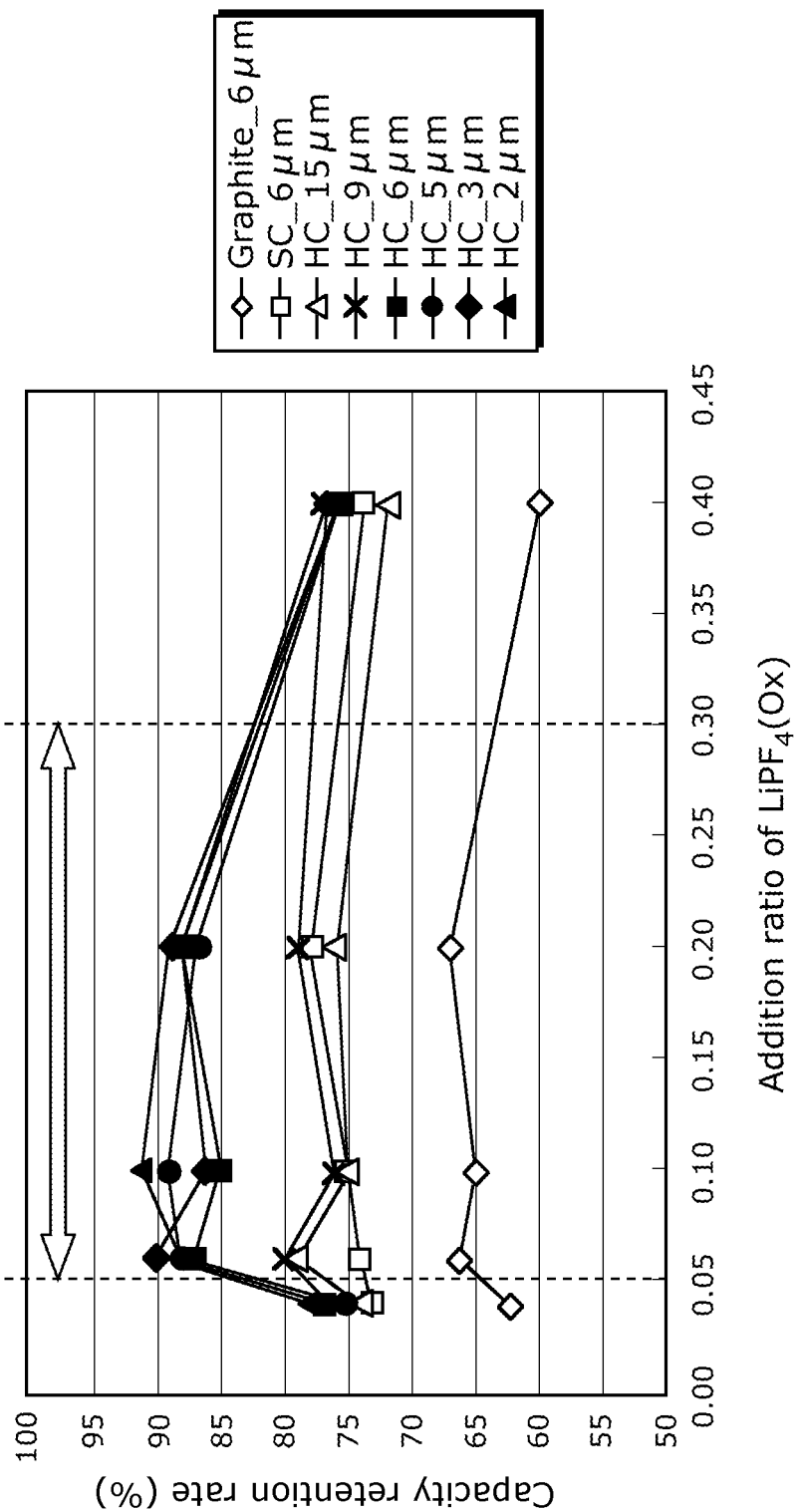
FIG. 5C is a graph showing the capacity retention rate of the energy storage element when 0.5% by weight of the first additive is added, and the amount of the second additive to be added and the kind and particle size of the negative electrode active material are varied.

FIG. 5C is a graph showing the capacity retention rate of the energy storage element wherein 0.5% by weight of the first additive is added, and the amount of the second additive to be added and the kind and particle size of the negative electrode active material are varied. In FIG. 5C, the values of the capacity retention rate in Examples 2-4 to 2-6, 2-14 to 2-16, 2-24 to 2-26, and 2-34 to 2-36 and Comparative Examples 2-10 to 2-14, 2-34 to 2-38, 2-58 to 2-62, 2-82 to 2-86, 2-103, 2-104, 2-117, 2-118, 2-131, 2-132, 2-145, and 2-146 are shown as a graph.

Figure 5D:
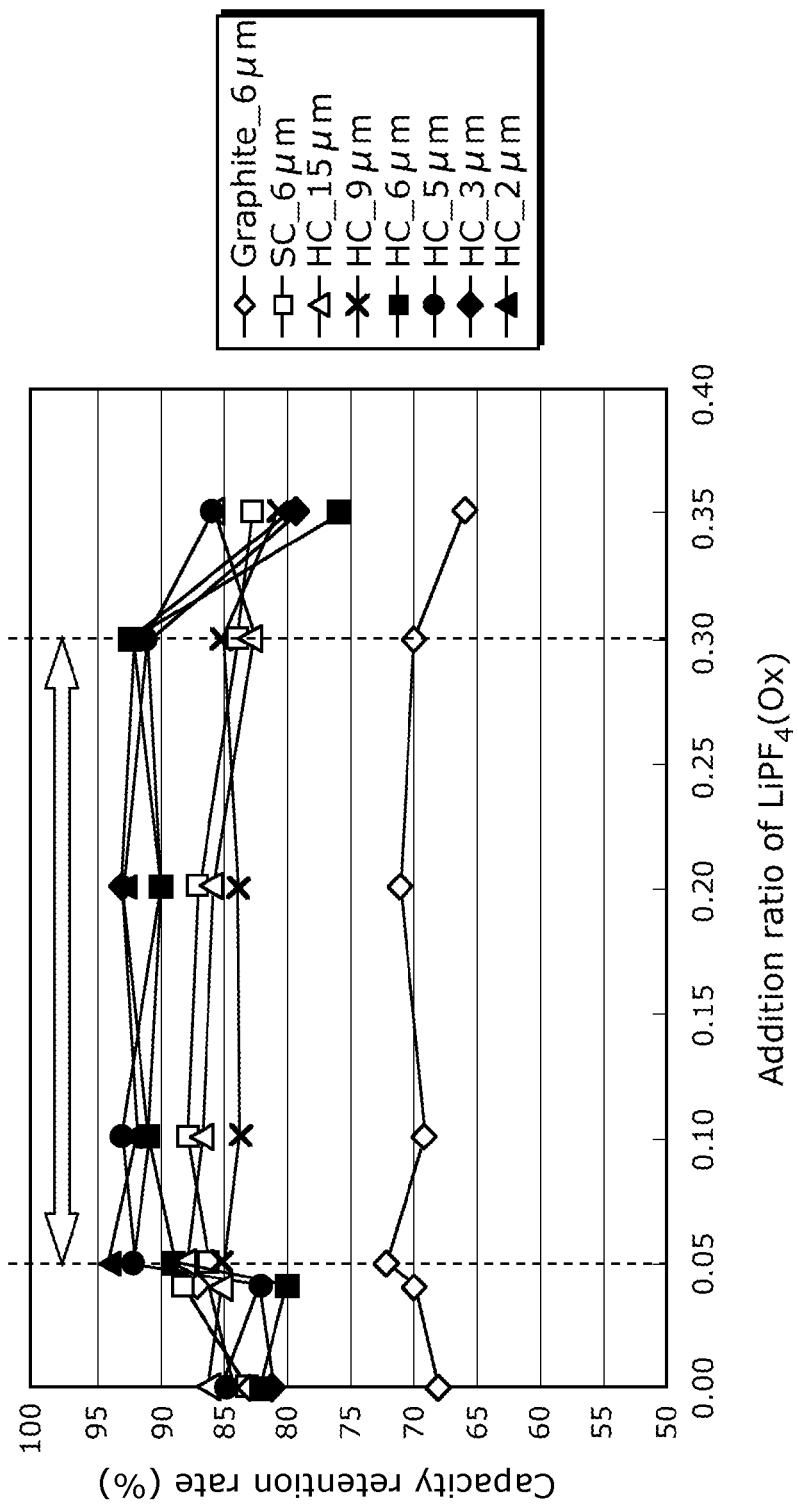
FIG. 5D is a graph showing the capacity retention rate of the energy storage element when 1.0% by weight of the first additive is added, and the amount of the second additive to be added and the kind and particle size of the negative electrode active material are varied.

FIG. 5D is a graph showing the capacity retention rate of the energy storage element wherein 1.0% by weight of the first additive is added, and the amount of the second additive to be added and the kind and particle size of the negative electrode active material are varied. In FIG. 5D, the values of the capacity retention rate in Examples 2-7 to 2-10, 2-17 to 2-20, 2-27 to 2-30, and 2-37 to 2-40 and Comparative Examples 2-15 to 2-21, 2-39 to 2-45, 2-63 to 2-69, 2-87 to 2-93, 2-105 to 2-107, 2-119 to 2-121, 2-133 to 2-135, and 2-147 to 2-149 are shown as a graph.

FIG. 5E is a graph showing the capacity retention rate of the energy storage element wherein 1.2% by weight of the first additive is added, and the amount of the second additive to be added and the kind and particle size of the negative electrode active material are varied. FIG. 5E, the values of the capacity retention rate in Comparative Examples 2-22 to 2-24, 2-46 to 2-48, 2-70 to 2-72, 2-94 to 2-96, 2-108 to 2-110, 2-122 to 2-124, 2-136 to 2-138, and 2-150 to 2-152 are shown as a graph.

As shown in Table 4 above and these graphs, the capacity retention rate indicates a significantly high value when the amount of the first additive to be added is not less than 0.3% by weight and not more than 1.0% by weight based on the total weight of the non-aqueous electrolyte, the amount of the second additive to be added is not less than 0.05 times and not more than 0.3 times the amount of the first additive to be added, and the negative electrode includes a non-graphitizable carbon having an average particle size D50 of not less than 2 μm and not more than 6 μm as the negative electrode active material. Such a high capacity retention rate can suppress reduction in the storage capacity of the energy storage element.

When the non-graphitizable carbon has an average particle size D50 less than 2 μm, such a non-graphitizable carbon has the problems in productivity and cost as described above. It is inferred, however, that the non-graphitizable carbon can demonstrate the same effect as that having an average particle size D50 of not less than 2 μm and not more than 6 μm.

FIG. 6A to FIG. 6E each are a graph showing the DC resistance increase rate of the energy storage element wherein the amount of the first additive to be added, the amount of the second additive to be added, and the kind and particle size of the negative electrode active material are varied.

Figure 6A:
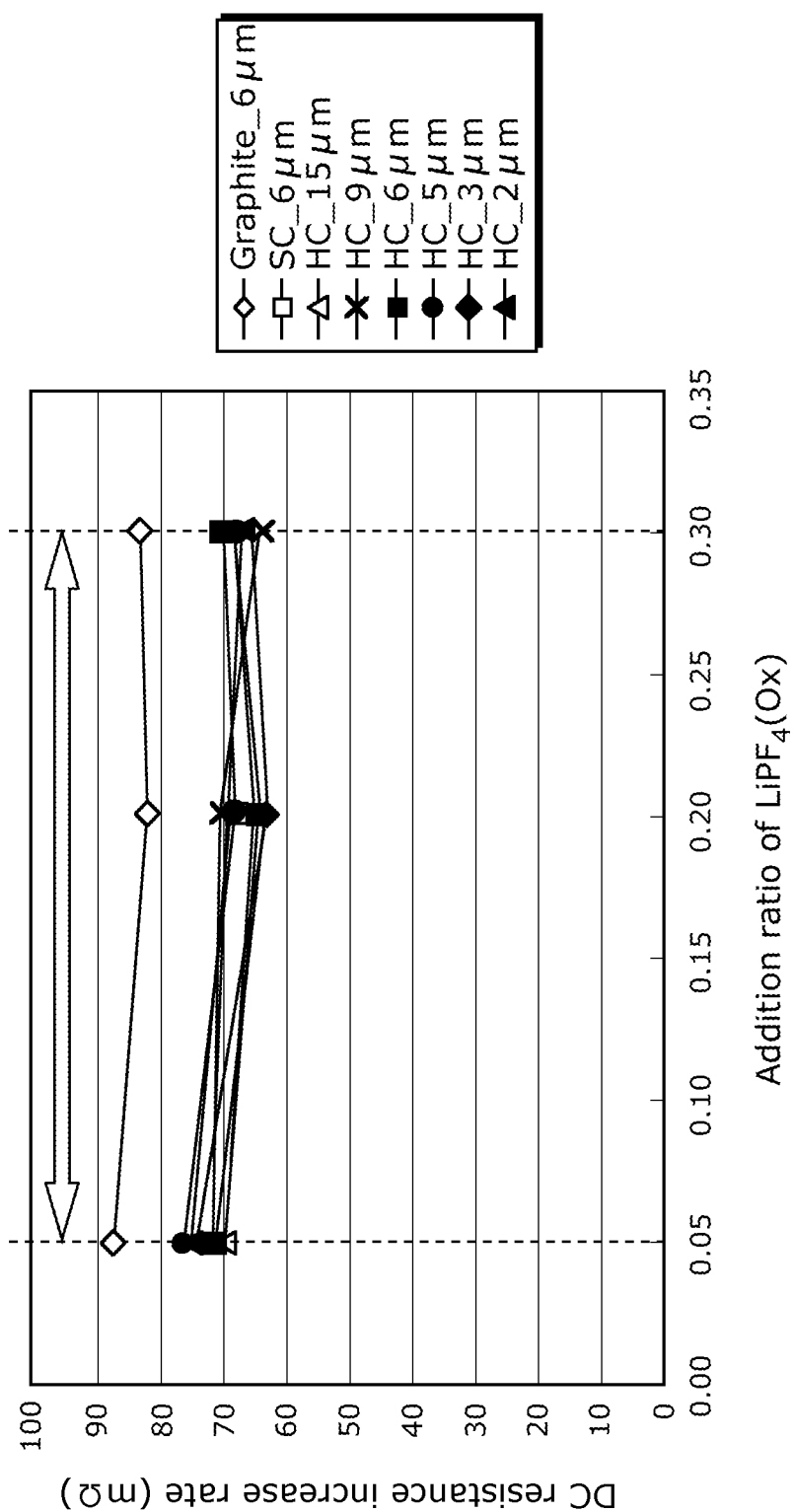
FIG. 6A is a graph showing the DC resistance increase rate of the energy storage element when 0.2% by weight of the first additive is added, and the amount of the second additive to be added and the kind and particle size of the negative electrode active material are varied.

Specifically, FIG. 6A is a graph showing the DC resistance increase rate of the energy storage element wherein the 0.2% by weight of the first additive is added, and the amount of the second additive to be added and the kind and particle size of the negative electrode active material are varied. In FIG. 6A, the values of the DC resistance increase rate in Comparative Examples 2-2 to 2-4, 2-26 to 2-28, 2-50 to 2-52, 2-74 to 2-76, 2-98 to 2-100, 2-112 to 2-114, 2-126 to 2-128, and 2-140 to 2-142 are shown as a graph.

Here, in the graph of FIG. 6A, the abscissa designates the ratio of the amount of the second additive ($LiPF_4(Ox)$) to be added to the amount of the first additive ($LiPF_2(Ox)_2$) to be added, and the ordinate designates the DC resistance increase rate.

Figure 6B:
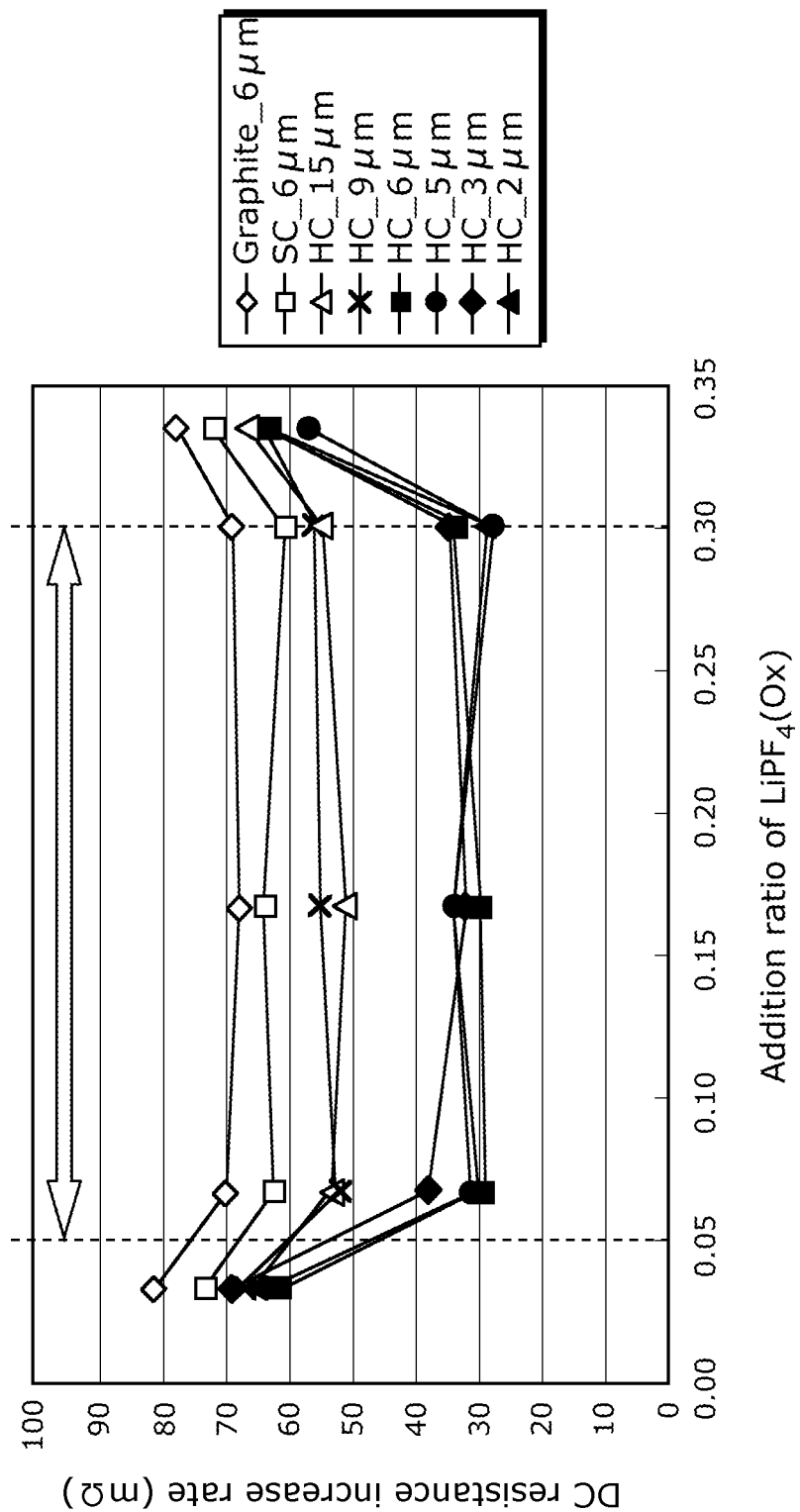
FIG. 6B is a graph showing the DC resistance increase rate of the energy storage element when 0.3% by weight of the first additive is added, and the amount of the second additive to be added and the kind and particle size of the negative electrode active material are varied.

Similarly, FIG. 6B is a graph showing the DC resistance increase rate of the energy storage element wherein 0.3% by weight of the first additive is added, and the amount of the second additive to be added and the kind and particle size of the negative electrode active material are varied. In FIG. 6B, the values of the DC resistance increase rate in Examples 2-1 to 2-3, 2-11 to 2-13, 2-21 to 2-23, and 2-31 to 2-33 and Comparative Examples 2-5 to 2-9, 2-29 to 2-33, 2-53 to 2-57, 2-77 to 2-81, 2-101, 2-102, 2-115, 2-116, 2-129, 2-130, 2-143, and 2-144 are shown as a graph.

FIG. 6C is a graph showing the DC resistance increase rate of the energy storage element wherein 0.5% by weight of the first additive is added, and the amount of the second additive to be added and the kind and particle size of the negative electrode active material are varied. In FIG. 6C, the values of the DC resistance increase rate in Examples 2-4 to 2-6, 2-14 to 2-16, 2-24 to 2-26, and 2-34 to 2-36, and Comparative Examples 2-10 to 2-14, 2-34 to 2-38, 2-58 to 2-62, 2-82 to 2-86, 2-103, 2-104, 2-117, 2-118, 2-131, 2-132, 2-145, and 2-146 are shown as a graph.

Figure 6D:
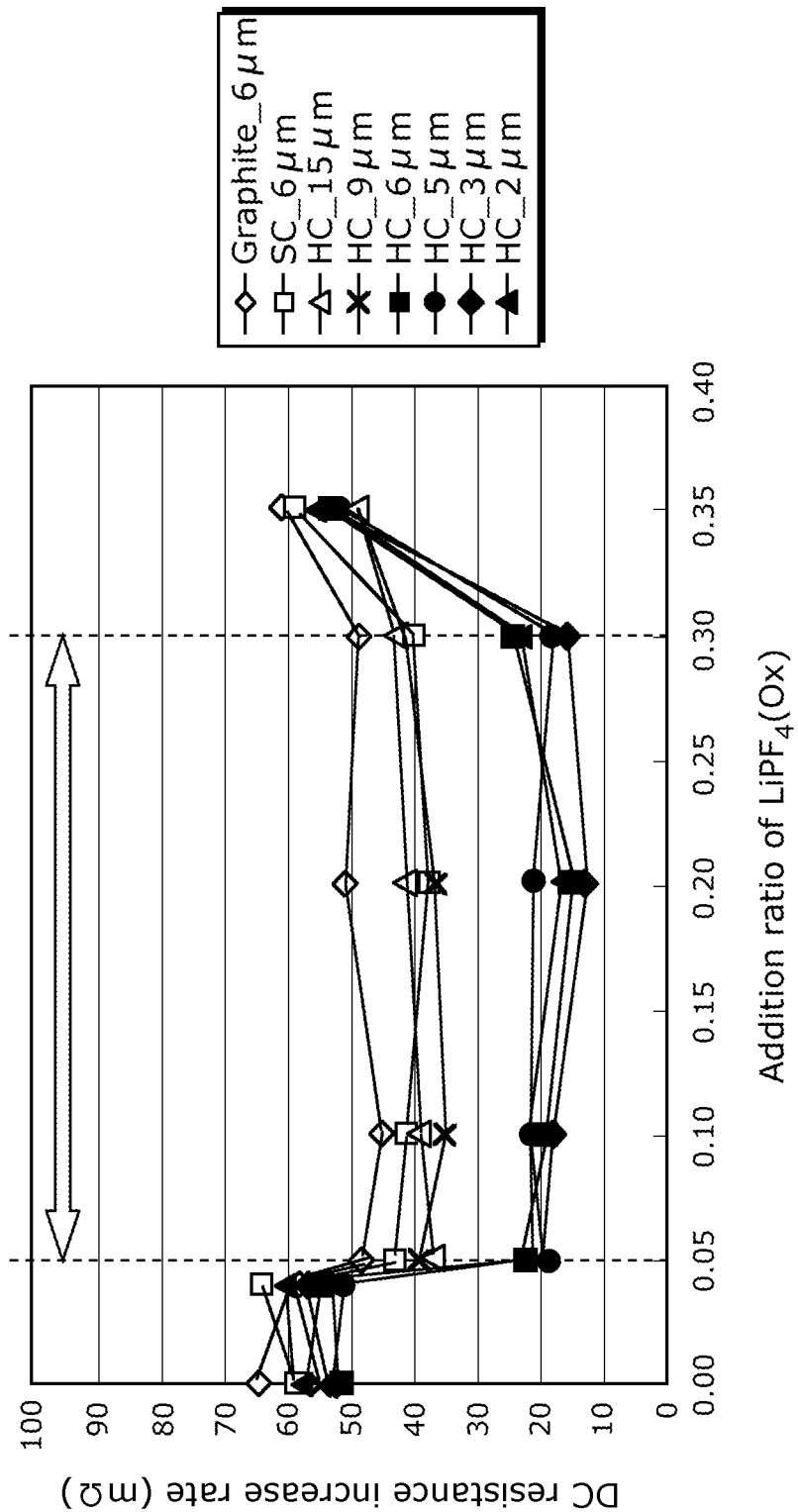
FIG. 6D is a graph showing the DC resistance increase rate of the energy storage element when 1.0% by weight of the first additive is added, and the amount of the second additive to be added and the kind and particle size of the negative electrode active material are varied.

FIG. 6D is a graph showing the DC resistance increase rate of the energy storage element wherein 1.0% by weight of the first additive is added, and the amount of the second additive to be added and the kind and particle size of the negative electrode active material are varied. In FIG. 6D, the values of the DC resistance increase rate in Examples 2-7 to 2-10, 2-17 to 2-20, 2-27 to 2-30, 2-37 to 2-40, and Comparative Examples 2-15 to 2-21, 2-39 to 2-45, 2-63 to 2-69, 2-87 to 2-93, 2-105 to 2-107, 2-119 to 2-121, 2-133 to 2-135, and 2-147 to 2-149 are shown as a graph.

FIG. 6E is a graph showing the DC resistance increase rate of the energy storage element wherein 1.2% by weight of the first additive is added, and the amount of the second additive to be added and the kind and particle size of the negative electrode active material are varied. In FIG. 6E, the values of the DC resistance increase rate in Comparative Examples 2-22 to 2-24, 2-46 to 2-48, 2-70 to 2-72, 2-94 to 2-96, 2-108 to 2-110, 2-122 to 2-124, 2-136 to 2-138, and 2-150 to 2-152 are shown as a graph.

As shown in Table 5 above and these graphs, the DC resistance increase rate indicates a significantly low value when the amount of the first additive to be added is not less than 0.3% by weight and not more than 1.0% by weight based on the total weight of the non-aqueous electrolyte, the amount of the second additive to be added is not less than 0.05 times and not more than 0.3 times the amount of the first additive to be added, and the negative electrode includes the non-graphitizable carbon having an average particle size D50 of not less than 2 μm and not more than 6 μm as the negative electrode active material. Such a low DC resistance increase rate enables a higher output of the energy storage element.

When the non-graphitizable carbon has an average particle size D50 less than 2 μm, such a non-graphitizable carbon has problems in productivity and cost as described above. It is inferred, however, that such a non-graphitizable carbon can demonstrate the same effect as that having an average particle size D50 of not less than 2 μm and not more than 6 μm.

As above, according to the energy storage element 1 according to Modification 1, the non-aqueous electrolyte 6 contains the first additive represented by Formula (5) and the second additive represented by Formula (6) in Embodiment, the amount of the first additive to be added is not less than 0.3% by weight and not more than 1.0% by weight based on the total weight of the non-aqueous electrolyte 6, and the amount of the second additive to be added is not less than 0.05 times and not more than 0.3 times the amount of the first additive to be added. The negative electrode in the energy storage element 1 includes the non-graphitizable carbon having an average particle size D50 of 6 μm or less as the negative electrode active material.

Here, a negative electrode active material having a small particle size used for a higher output of the energy storage element leads to increase in the contact area between the negative electrode active material and the non-aqueous electrolyte. For this reason, a side reaction such as reduction and decomposition of the non-aqueous electrolyte deteriorates the negative electrode active material. Namely, in the negative electrode active material having a small particle size, deterioration of the active material itself and deterioration thereof by the side reaction progress at the same time.

As a result of extensive research and studies, the present inventors found out that in the negative electrode active material containing the non-graphitizable carbon having an average particle size D50 of 6 μm or less, the side reaction of the non-aqueous electrolyte can be significantly suppressed by adding a predetermined amount of the first additive and a predetermined amount of the second additive to the non-aqueous electrolyte 6. Thus, the present inventors found out that the performance of the energy storage element such as high temperature preservation properties can be efficiently improved by significantly suppressing deterioration of the negative electrode active material in the energy storage element 1 due to the side reaction. For this reason, the energy storage element 1 enables a higher output and efficiently improved performance such as high temperature preservation properties if the energy storage element 1 has the negative electrode including the non-graphitizable carbon having an average particle size D50 of 6 μm or less as the negative electrode active material, and a predetermined amount of the first additive and a predetermined amount of the second additive are added to the non-aqueous electrolyte 6.

Moreover, as the negative electrode active material for the energy storage element 1, the non-graphitizable carbon having an average particle size D50 of 2 μm or more is used. Namely, it is difficult to handle a non-graphitizable carbon having an average particle size D50 less than 2 μm because of its excessively small particle size, leading to increased production cost. Additionally, such a non-graphitizable carbon has a problem of productivity: for example, the non-graphitizable carbon cannot be applied stably in application of the non-graphitizable carbon to the negative electrode. For this reason, improved productivity and reduced cost can be attained by using a non-graphitizable carbon having an average particle size D50 of 2 μm or more.

Moreover, according to the method of producing the energy storage element 1 according to Modification 1, the non-aqueous electrolyte 6 having a predetermined amount of the first additive and a predetermined amount of the second additive added thereto is injected into the energy storage element 1 including the non-graphitizable carbon having an average particle size D50 of 6 μm or less, and the energy storage element is pre-charged more than once before sealing the non-aqueous electrolyte injection hole. Here, the present inventors found out that the performance of the energy storage element such as high temperature preservation properties can be efficiently improved by pre-charging the energy storage element 1 more than once before sealing the electrolyte injection hole 31 in the state where the energy storage element 1 has the non-aqueous electrolyte 6 injected thereinto. For this reason, the method of producing the energy storage element 1 enables production of the energy storage element 1 whose performance such as high temperature preservation properties can be efficiently improved by pre-charging the energy storage element more than once before sealing the non-aqueous electrolyte injection hole.

The present invention can be realized not only as the energy storage element 1 or method of producing the energy storage element 1 as above, but also as the non-aqueous electrolyte 6 having the first additive and the second additive added thereto and used in the energy storage element 1 including the negative electrode including the non-graphitizable carbon having an average particle size D50 of 6 μm or less as the negative electrode active material.

Modification 2

Next, Modification 2 of Embodiment above will be described. In Embodiment, as the positive electrode active material used in the energy storage element 1, known materials can be properly used as long as the material is a positive electrode active material that can occlude and release lithium ions.

In Modification 2, however, lithium transition metal oxides represented by $Li_xCo_yNi_zMn_{(1-y-z)}O_2$ (wherein $0.95 \le x \le 1.2$, $0.1 \le y \le 0.34$, $0 < z$, and $1-y-z > 0$) are used as the positive electrode active material used in the energy storage element 1. Among these, lithium transition metal oxides represented by $Li_xNi_{(1-y)/2}Mn_{(1-y)/2}Co_yO_2$ (wherein $1.1 \le x \le 1.2$, and $0.1 \le y \le 0.34$) are preferable.

Namely, lithium transition metal oxides are used as the positive electrode active material wherein the ratio of Co to the three components of nickel (Ni), manganese (Mn), and cobalt (Co) is 10% to 34%. For example, Ni:Mn:Co=1:1:1 or 5:2:3 in lithium transition metal oxides falls within the range above.

These positive electrode active materials may have surfaces coated with a metal oxide such as $ZrO_2$, $WO_2$, MgO, and $Al_2O_3$, or lithium or a transition metal may be partially replaced by other element. The configuration other than the positive electrode active material is the same as that of the energy storage element 1 according to Embodiment, and therefore the description will be omitted.

Namely, as the electrolyte injecting step (S104 in FIG. 2) in FIG. 2, the non-aqueous electrolyte 6 having the additives added thereto is injected from the electrolyte injection hole 31 into the energy storage element 1 including the positive electrode including a lithium transition metal oxide represented by $Li_xCo_yNi_zMn_{(1-y-z)}O_2$ (wherein $0.95 \le x \le 1.2$, $0.1 \le y \le 0.34$, $0 < z$, and $1-y-z > 0$) as the positive electrode active material. The steps other than the electrolyte injecting step are the same as those in the method of producing the energy storage element 1 according to Embodiment, and therefore the description will be omitted.

As above, the first additive and second additive are added to the non-aqueous electrolyte 6 in the energy storage element 1 including the positive electrode including the lithium transition metal oxide as the positive electrode active material, and the energy storage element 1 is pre-charged. Thereby, the function of the mixed coating of the first additive and the second additive is improved, suppressing increase in the DC resistance accompanied by preservation at a high temperature.

Hereinafter, an effect of adding the first additive and the second additive to the non-aqueous electrolyte 6 in the energy storage element 1 including the lithium transition metal oxide as the positive electrode active material will be described in detail.

EXAMPLES

Examples of the energy storage element 1 and its production method according to Modification 2 will be described. Examples 3-1 to 3-30 below all relate to the energy storage element 1 and its production method according to Modification 2 described above. In Examples 3-1 to 3-30 and Comparative Examples 3-1 to 3-138 described below, the production and evaluation test of the energy storage element 1 were performed under the same conditions except that the kinds and amounts of the additives to be added to the non-aqueous electrolyte 6 were different, and the positive electrode active material were varied.

Specifically, an energy storage element in Example 3-1 was produced as follows.

(1) Production of Positive Electrode Plate

5% by mass of polyvinylidene fluoride as the binder, 5% by mass of acetylene black as the conductive agent, and 90% by mass of $LiNi_{0.45}Mn_{0.45}CO_{0.1}O_2$ as the positive electrode active material were mixed. N-methyl-2-pyrrolidone was added to the mixture to prepare a paste. The paste was applied to both surfaces of a positive electrode current collector having a thickness of 20 μm and formed of an aluminum foil, and dried. Thus, a positive electrode plate was produced, and a positive electrode lead was attached to the positive electrode plate.

(2) Production of Negative Electrode Plate

As the negative electrode active material, 92% by mass of a non-graphitizable carbon and 8% by mass of polyvinylidene fluoride as the binder were added to N-methyl-2-pyrrolidone to prepare a paste. The non-graphitizable carbon had an average particle size D50 (average particle size) of 9 μm obtained by measurement using a laser diffraction particle size distribution analyzer SALD2200 made by SHIMADZU Corporation according to the laser diffractometry. Then, the obtained paste was applied to both surfaces of a negative electrode current collector having a thickness of 10 μm and formed of a copper foil, and dried. Thus, a negative electrode plate was produced, and a negative electrode lead was attached to the negative electrode plate.

(3) Production of Battery

As the separator, a polyethylene microporous membrane was used. The non-aqueous electrolyte used was prepared according to the following method. Namely, $LiPF_6$ was dissolved in a mixed solvent of ethylene carbonate (EC):dimethyl carbonate (DMC):ethylmethyl carbonate (EMC)=3:3:4 (volume ratio), and adjusted to be 1 mol/L after preparation. Further, 0.30% by weight of the first additive represented by Formula (5) and 0.02% by weight of the second additive represented by Formula (6) in Embodiment were added based on the total mass of the non-aqueous electrolyte to prepare a non-aqueous electrolyte.

Thus, using these materials, the energy storage element in Example 3-1 having a nominal capacity of 450 mAh was produced according to the order shown in FIG. 2.

Moreover, an energy storage element in Comparative Example 3-1 was produced as follows.

As the positive electrode active material, $LiNiO_2$ was used instead of $LiNi_{0.45}Mn_{0.45}CO_{0.1}O_2$ in Example 3-1. Instead of the non-aqueous electrolyte in Example 3-1, a non-aqueous electrolyte having 0% by weight of the first additive and the second additive (not added) was used. Then, an energy storage element in Comparative Example 3-1 was produced in the same manner as in Example 3-1 except that a different positive electrode active material and a different non-aqueous electrolyte were used.

As shown in Table 6 below, in Examples 3-2 to 3-30 and Comparative Examples 3-2 to 3-138, energy storage elements were produced in the same manner as in Example 3-1 or Comparative Example 3-1. Table 6 below shows the positive electrode active material and the amounts of the first additive and the second additive to be added to the non-aqueous electrolyte in Examples 3-1 to 3-30 and Comparative Examples 3-1 to 3-138. Namely, in Examples 3-2 to 3-30 and Comparative Examples 3-2 to 3-138, instead of the positive electrode active material and non-aqueous electrolyte in Example 3-1 or Comparative Example 3-1, the positive electrode active material shown in Table 6 was used. Moreover, the amounts of the first additive and second additive to be added shown in Table 6 were added to prepare a non-aqueous electrolyte. Thus, the respective energy storage elements were produced.

TABLE 6

| Added amount of $LiPF_2(Ox)_2$ [wt %] | Added amount of $LiPF_4(Ox)$ [wt %] | Ratio to $LiPF_2(Ox)_2$ | | | Ratio of Co in $LiNiMnCoO_2$ | | | | |
|---|---|---|---|---|---|---|---|---|---|
| | | | $LiNiO_2$ | Co_10% | Co_24% | Co_34% | Co_42% | Co_67% | $LiCoO_2$ |
| 0.0 | 0.00 | 0.00 | Comp. Example 3-1 | Comp. Example 3-25 | Comp. Example 3-39 | Comp. Example 3-53 | Comp. Example 3-67 | Comp. Example 3-91 | Comp. Example 3-115 |
| 0.2 | 0.01 | 0.05 | Comp. Example 3-2 | Comp. Example 3-26 | Comp. Example 3-40 | Comp. Example 3-54 | Comp. Example 3-68 | Comp. Example 3-92 | Comp. Example 3-116 |
| 0.2 | 0.04 | 0.20 | Comp. Example 3-3 | Comp. Example 3-27 | Comp. Example 3-41 | Comp. Example 3-55 | Comp. Example 3-69 | Comp. Example 3-93 | Comp. Example 3-117 |
| 0.2 | 0.06 | 0.30 | Comp. Example 3-4 | Comp. Example 3-28 | Comp. Example 3-42 | Comp. Example 3-56 | Comp. Example 3-70 | Comp. Example 3-94 | Comp. Example 3-118 |
| 0.3 | 0.01 | 0.03 | Comp. Example 3-5 | Comp. Example 3-29 | Comp. Example 3-44 | Comp. Example 3-57 | Comp. Example 3-71 | Comp. Example 3-95 | Comp. Example 3-119 |
| 0.3 | 0.02 | 0.07 | Comp. Example 3-6 | Example 3-1 | Example 3-11 | Example 3-21 | Comp. Example 3-72 | Comp. Example 3-96 | Comp. Example 3-120 |
| 0.3 | 0.05 | 0.17 | Comp. Example 3-7 | Example 3-2 | Example 3-12 | Example 3-22 | Comp. Example 3-73 | Comp. Example 3-97 | Comp. Example 3-121 |
| 0.3 | 0.09 | 0.30 | Comp. Example 3-8 | Example 3-3 | Example 3-13 | Example 3-23 | Comp. Example 3-74 | Comp. Example 3-98 | Comp. Example 3-122 |
| 0.3 | 0.10 | 0.33 | Comp. Example 3-9 | Comp. Example 3-30 | Comp. Example 3-44 | Comp. Example 3-58 | Comp. Example 3-75 | Comp. Example 3-99 | Comp. Example 3-123 |
| 0.5 | 0.02 | 0.04 | Comp. Example 3-10 | Comp. Example 3-31 | Comp. Example 3-45 | Comp. Example 3-59 | Comp. Example 3-76 | Comp. Example 3-100 | Comp. Example 3-124 |
| 0.5 | 0.03 | 0.06 | Comp. Example 3-11 | Example 3-4 | Example 3-14 | Example 3-24 | Comp. Example 3-77 | Comp. Example 3-101 | Comp. Example 3-125 |
| 0.5 | 0.05 | 0.10 | Comp. Example 3-12 | Example 3-5 | Example 3-15 | Example 3-25 | Comp. Example 3-78 | Comp. Example 3-102 | Comp. Example 3-126 |
| 0.5 | 0.10 | 0.20 | Comp. Example 3-13 | Example 3-6 | Example 3-16 | Example 3-26 | Comp. Example 3-79 | Comp. Example 3-103 | Comp. Example 3-127 |
| 0.5 | 0.20 | 0.40 | Comp. Example 3-14 | Comp. Example 3-32 | Comp. Example 3-46 | Comp. Example 3-60 | Comp. Example 3-80 | Comp. Example 3-104 | Comp. Example 3-128 |
| 1.0 | 0.00 | 0.00 | Comp. Example 3-15 | Comp. Example 3-33 | Comp. Example 3-47 | Comp. Example 3-61 | Comp. Example 3-81 | Comp. Example 3-105 | Comp. Example 3-129 |
| 1.0 | 0.04 | 0.04 | Comp. Example 3-16 | Comp. Example 3-34 | Comp. Example 3-48 | Comp. Example 3-62 | Comp. Example 3-82 | Comp. Example 3-106 | Comp. Example 3-130 |
| 1.0 | 0.05 | 0.05 | Comp. Example 3-17 | Example 3-7 | Example 3-17 | Example 3-27 | Comp. Example 3-83 | Comp. Example 3-107 | Comp. Example 3-131 |
| 1.0 | 0.10 | 0.10 | Comp. Example 3-18 | Example 3-8 | Example 3-18 | Example 3-28 | Comp. Example 3-84 | Comp. Example 3-108 | Comp. Example 3-132 |
| 1.0 | 0.20 | 0.20 | Comp. Example 3-19 | Example 3-9 | Example 3-19 | Example 3-29 | Comp. Example 3-85 | Comp. Example 3-109 | Comp. Example 3-133 |
| 1.0 | 0.30 | 0.30 | Comp. Example 3-20 | Example 3-10 | Example 3-20 | Example 3-30 | Comp. Example 3-86 | Comp. Example 3-110 | Comp. Example 3-134 |
| 1.0 | 0.35 | 0.35 | Comp. Example 3-21 | Comp. Example 3-35 | Comp. Example 3-49 | Comp. Example 3-63 | Comp. Example 3-87 | Comp. Example 3-111 | Comp. Example 3-135 |
| 1.2 | 0.00 | 0.00 | Comp. Example 3-22 | Comp. Example 3-36 | Comp. Example 3-50 | Comp. Example 3-64 | Comp. Example 3-88 | Comp. Example 3-112 | Comp. Example 3-136 |

TABLE 6-continued

| Added amount of $LiPF_2(Ox)_2$ [wt %] | Added amount of $LiPF_4(Ox)$ [wt %] | Ratio to $LiPF_2(Ox)_2$ | Ratio of Co in $LiNiMnCoO_2$ | | | | | |
|---|---|---|---|---|---|---|---|---|
| | | | $LiNiO_2$ | Co_10% | Co_24% | Co_34% | Co_42% | Co_67% | $LiCoO_2$ |
| 1.2 | 0.10 | 0.08 | Comp. Example 3-23 | Comp. Example 3-37 | Comp. Example 3-51 | Comp. Example 3-65 | Comp. Example 3-89 | Comp. Example 3-113 | Comp. Example 3-137 |
| 1.2 | 0.20 | 0.17 | Comp. Example 3-24 | Comp. Example 3-38 | Comp. Example 3-52 | Comp. Example 3-66 | Comp. Example 3-90 | Comp. Example 3-114 | Comp. Example 3-138 |

Here, "Added amount of $LiPF_2(Ox)_2$" shown in Table 6 indicates the amount of the first additive to be added to the non-aqueous electrolyte. "Added amount of $LiPF_4(Ox)$" indicates the amount of the second additive to be added to the non-aqueous electrolyte. In the column of "Added amount of $LiPF_4(Ox)$," "Ratio to $LiPF_2(Ox)_2$" indicates the value of the ratio of the amount of the second additive to be added to the amount of the first additive to be added (Added amount of $LiPF_4(Ox)$/Added amount of $LiPF_2(Ox)_2$).

"$LiNiO_2$" indicates use of $LiNiO_2$ as the positive electrode active material. "$LiCoO_2$" indicates use of $LiCoO_2$ as the positive electrode active material.

In the column of "Ratio of Co in $LiNiMnCoO_2$," "Co_10%" indicates use of $LiNi_{0.45}Mn_{0.45}Co_{0.1}O_2$ as the positive electrode active material, which is a lithium transition metal oxide $Li_xCo_yNi_zMn_{(1-y-z)}O_2$ whose ratio of Co is 10% (y=0.1).

Similarly, "Co_24%" indicates use of $LiNi_{0.38}Mn_{0.38}CO_{0.24}O_2$ as the positive electrode active material, which is the lithium transition metal oxide whose ratio of Co is 24% (y=0.24). "Co_34%" indicates use of $LiNi_{0.33}Mn_{0.33}Co_{0.33}O_2$ as the positive electrode active material, which is the lithium transition metal oxide whose ratio of Co is ⅓ (y=0.333 . . . ). "Co_42%" indicates use of $LiNi_{0.29}Mn_{0.29}CO_{0.42}O_2$ as the positive electrode active material, which is the lithium transition metal oxide whose ratio of Co is 42% (y=0.42). "Co_67%" indicates use of $LiNi_{0.17}Mn_{0.17}CO_{0.67}O_2$ as the positive electrode active material, which is the lithium transition metal oxide whose ratio of Co is ⅔ (y=0.666 . . . ).

Namely, in Examples 3-1 to 3-30, the amount of the first additive to be added is not less than 0.3% by weight and not more than 1.0% by weight based on the total weight of the non-aqueous electrolyte, and the amount of the second additive to be added is not less than 0.05 times and not more than 0.3 times the amount of the first additive to be added. As the positive electrode active material, the lithium transition metal oxide $Li_xCo_yNi_zMn_{(1-y-z)}O_2$ (specifically, $Li_xNi_{(1-y)/2}Mn_{(1-y)/2}Co_yO_2$) is used wherein y=0.1 to ⅓ as the ratio of Co.

(4) Evaluation Test

Next, an evaluation test (test of battery performance after preservation at a high temperature) was performed as follows.

Using the respective batteries in Examples 3-1 to 3-30 and Comparative Examples 3-1 to 3-138, an initial discharge capacity check test was performed according to the following method. The battery was charged to 4.2 V at 25° C. and a constant current of 450 mA, and further charged at a constant voltage of 4.2 V. The total charging time was 3 hours. Then, the battery was discharged on the condition of a constant current of 450 mA and a final voltage of 2.5 V. Thus, the initial discharge capacity was measured.

Then, an initial DC resistance was measured according to the following method. The battery was charged to 3.73 V at 25° C. and a constant current of 450 mA, and further charged at a constant voltage of 3.73 V. The total charging time was 3 hours. Thereby, the SOC (State Of Charge) of the battery was set at 50%. The battery was kept at −20° C. for 5 hours, and discharged at 90 mA (I1) for 10 seconds. The voltage at this time ($E1_0$) was measured. The battery was discharged at 225 mA (I2) for 10 seconds. The voltage at this time ($E2_0$) was measured. Using the measured values, the DC resistance value $R_0$ at −20° C. was calculated using $R_0=|(E1_0-E2_0)/$ discharge current (I1−I2)|. Here, "SOC is 50%" means that a charged electricity amount is 50% of the capacity of the battery.

After the initial discharge capacity was measured, each of the batteries was subjected to the exposure test at 60° C. according to the following method. The battery was charged to 4.03 V at a constant current of 450 mA, and further charged at a constant voltage of 4.03 V. The total charging time was 3 hours. The SOC of the battery was set at 80%, and preserved inside of a thermostat at 60° C. for 30 days (one month). The thermostat was cooled to 25° C., and the battery was discharged on the condition of a constant current of 450 mA and a final voltage of 2.5 V. Then, charge and discharge were performed on the same condition as that in the initial charge capacity check test. The preservation test at 60° C. was repeated for 6 months.

Then, the DC resistance value Rx after preservation was measured on the same condition as that in the measurement of the DC resistance value performed on each of the batteries at the initial stage. The increase rate of the thus-obtained DC resistance after preservation to the initial DC resistance (DC resistance increase rate) was calculated using the following expression $(R_x-R_0)/R_0 \times 100$.

The values of the DC resistance increase rate thus calculated are shown in Table 7. Namely, in Table 7 below, in Examples 3-1 to 3-30 and Comparative Examples 3-1 to 3-138 shown in Table 6 above, the values of the DC resistance increase rate of the energy storage element are compared wherein the amount of the first additive ($LiPF_2(Ox)_2$) to be added, the amount of the second additive ($LiPF_4(Ox)$) to be added, and the positive electrode active material are varied.

TABLE 7

| Added amount of $LiPF_2(Ox)_2$ [wt %] | Added amount of $LiPF_4(Ox)$ [wt %] | Ratio to $LiPF_2(Ox)_2$ | $LiNiO_2$ | Ratio of Co in $LiNiMnCoO_2$ | | | | | $LiCoO_2$ |
|---|---|---|---|---|---|---|---|---|---|
| | | | | Co_10% | Co_24% | Co_34% | Co_42% | Co_67% | |
| 0.0 | 0.00 | 0.00 | 109 | 100 | 98 | 102 | 104 | 110 | 115 |
| 0.2 | 0.01 | 0.05 | 105 | 94 | 92 | 90 | 100 | 95 | 113 |
| 0.2 | 0.04 | 0.20 | 102 | 90 | 92 | 87 | 95 | 94 | 111 |
| 0.2 | 0.06 | 0.30 | 105 | 95 | 89 | 88 | 97 | 97 | 110 |
| 0.3 | 0.01 | 0.03 | 99 | 90 | 91 | 84 | 94 | 90 | 107 |
| 0.3 | 0.02 | 0.07 | 91 | 43 | 40 | 40 | 74 | 70 | 99 |
| 0.3 | 0.05 | 0.17 | 87 | 42 | 45 | 39 | 70 | 72 | 101 |
| 0.3 | 0.09 | 0.30 | 89 | 48 | 49 | 45 | 75 | 75 | 105 |
| 0.3 | 0.10 | 0.33 | 90 | 85 | 83 | 74 | 86 | 87 | 95 |
| 0.5 | 0.02 | 0.04 | 87 | 80 | 78 | 76 | 85 | 82 | 95 |
| 0.5 | 0.03 | 0.06 | 85 | 35 | 28 | 35 | 60 | 63 | 88 |
| 0.5 | 0.05 | 0.10 | 81 | 32 | 36 | 32 | 58 | 60 | 81 |
| 0.5 | 0.10 | 0.20 | 77 | 39 | 34 | 29 | 62 | 59 | 79 |
| 0.5 | 0.20 | 0.40 | 78 | 70 | 72 | 68 | 74 | 73 | 87 |
| 1.0 | 0.00 | 0.00 | 76 | 65 | 59 | 52 | 67 | 54 | 90 |
| 1.0 | 0.04 | 0.04 | 68 | 71 | 61 | 51 | 66 | 57 | 82 |
| 1.0 | 0.05 | 0.05 | 54 | 20 | 14 | 12 | 46 | 40 | 63 |
| 1.0 | 0.10 | 0.10 | 48 | 17 | 18 | 10 | 40 | 39 | 68 |
| 1.0 | 0.20 | 0.20 | 57 | 18 | 16 | 14 | 43 | 42 | 60 |
| 1.0 | 0.30 | 0.30 | 45 | 15 | 19 | 10 | 41 | 39 | 67 |
| 1.0 | 0.35 | 0.35 | 67 | 52 | 55 | 48 | 55 | 50 | 78 |
| 1.2 | 0.00 | 0.00 | 68 | 60 | 57 | 48 | 60 | 51 | 85 |
| 1.2 | 0.10 | 0.08 | 64 | 62 | 57 | 46 | 52 | 58 | 81 |
| 1.2 | 0.20 | 0.17 | 61 | 57 | 51 | 52 | 55 | 50 | 83 |

FIG. 7A to FIG. 7E each are a graph showing the DC resistance increase rate of the energy storage element wherein the amount of the first additive to be added, the amount of the second additive to be added, and the positive electrode active material are varied.

Specifically, FIG. 7A is a graph showing the DC resistance increase rate of the energy storage element wherein 0.2% by weight of the first additive is added, and the amount of the second additive to be added and the positive electrode active material are varied. In FIG. 7A, the values of the DC resistance increase rate in Comparative Examples 3-2 to 3-4, 3-26 to 3-28, 3-40 to 3-42, 3-54 to 3-56, 3-68 to 3-70, 3-92 to 3-94, and 3-116 to 3-118 are shown as a graph.

Here, in the graph of FIG. 7A, the abscissa designates the ratio of the amount of the second additive ($LiPF_4(Ox)$) to be added to the amount of the first additive ($LiPF_2(Ox)_2$) to be added, and the ordinate designates the DC resistance increase rate.

Similarly, FIG. 7B is a graph showing the DC resistance increase rate of the energy storage element wherein 0.3% by weight of the first additive is added, and the amount of the second additive to be added and the positive electrode active material are varied. In FIG. 7B, the values of the DC resistance increase rate in Examples 3-1 to 3-3, 3-11 to 3-13, and 3-21 to 3-23 and Comparative Examples 3-5 to 3-9, 3-29, 3-30, 3-43, 3-44, 3-57, 3-58, 3-71 to 3-75, 3-95 to 3-99, and 3-119 to 3-123 are shown as a graph.

FIG. 7C is a graph showing the DC resistance increase rate of the energy storage element wherein 0.5% by weight of the first additive is added, and the amount of the second additive to be added and the positive electrode active material are varied. In FIG. 7C, the values of the DC resistance increase rate in Examples 3-4 to 3-6, 3-14 to 3-16, and 3-24 to 3-26 and Comparative Example 3-10 to 3-14, 3-31, 3-32, 3-45, 3-46, 3-59, 3-60, 3-76 to 3-80, 3-100 to 3-104, and 3-124 to 3-128 are shown as a graph.

FIG. 7D is a graph showing the DC resistance increase rate of the energy storage element wherein 1.0% by weight of the first additive is added, and the amount of the second additive to be added and the positive electrode active material are varied. In FIG. 7D, the values of the DC resistance increase rate in Examples 3-7 to 3-10, 3-17 to 3-20, and 3-27 to 3-30 and Comparative Examples 3-15 to 3-21, 3-33 to 3-35, 3-47 to 3-49, 3-61 to 3-63, 3-82 to 3-87, 3-105 to 3-111, and 3-129 to 3-135 are shown as a graph.

Figure 7E:
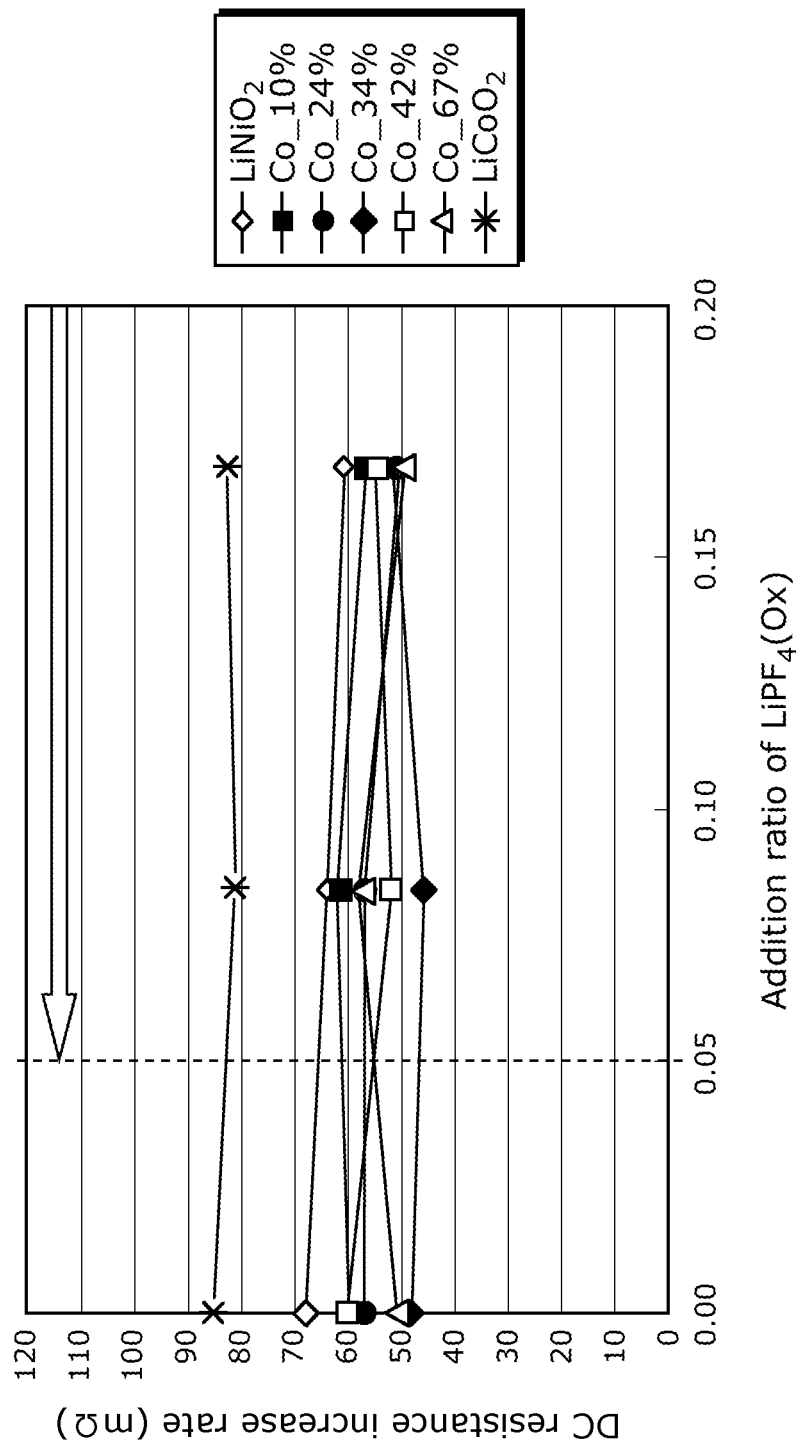
FIG. 7E is a graph showing the DC resistance increase rate of the energy storage element when 1.2% by weight of the first additive is added, and the amount of the second additive to be added and the positive electrode active material are varied.

FIG. 7E is a graph showing the DC resistance increase rate of the energy storage element wherein 1.2% by weight of the first additive is added, and the amount of the second additive to be added and the positive electrode active material are varied. In FIG. 7E, the values of the DC resistance increase rate in Comparative Examples 3-22 to 3-24, 3-36 to 3-38, 3-50 to 3-52, 3-64 to 3-66, 3-88 to 3-90, 3-112 to 3-114, and 3-136 to 3-138 are shown as a graph.

As shown in Table 7 above and these graphs, the DC resistance increase rate indicates a significantly low value when the amount of the first additive to be added is not less than 0.3% by weight and not more than 1.0% by weight based on the total weight of the non-aqueous electrolyte, the amount of the second additive to be added is not less than 0.05 times and not more than 0.3 times the amount of the first additive to be added, and the positive electrode includes the lithium transition metal oxide represented by $Li_xCo_yNi_zMn_{(1-y-z)}O_2$ (wherein $0.95 \leq x \leq 1.2$, $0.1 \leq y \leq 0.34$, $0 < z$, and $1-y-z > 0$) as the positive electrode active material. Particularly, the DC resistance increase rate indicates a significantly low value when the positive electrode includes the lithium transition metal oxide as $Li_xNi_{(1-y)/2}Mn_{(1-y)/2}Co_yO_2$ (wherein $1.1 \leq x \leq 1.2$, and $0.1 \leq y \leq 0.34$) as the positive electrode active material. Such a low DC resistance increase rate enables a higher output of the energy storage element.

Examples 3-21 to 3-30 are the case of using the lithium transition metal oxide at $y = \frac{1}{3}$ (0.333 . . . ). Considering errors more or less, it can be inferred that the same effect as that in Examples 3-21 to 3-30 can be demonstrated in the case of using the lithium transition metal oxide wherein y is up to 0.34.

In Examples 3-1 to 3-30, considering the stability of the crystal structure of the positive electrode active material, the lithium transition metal oxide is used wherein Ni and Mn have the same ratio. It is thought the DC resistance increase rate is influenced by the ratio of Co. For this reason, it can be inferred that the same effect as that in Examples 3-1 to 3-30 can be demonstrated at a ratio of Co of 10 to 34% even if the ratio of Ni is different from the ratio of Mn. This is also true of the ratio of Li. Namely, it can be inferred that the same effect as that in Examples 3-1 to 3-30 can be demonstrated when the positive electrode active material is the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$).

As above, according to the energy storage element 1 according to Modification 2, the non-aqueous electrolyte 6 contains the first additive represented by Formula (5) and the second additive represented by Formula (6) in Embodiment. The amount of the first additive to be added is not less than 0.3% by weight and not more than 1.0% by weight based on the total weight of the non-aqueous electrolyte 6, and the amount of the second additive to be added is not less than 0.05 times and not more than 0.3 times the amount of the first additive to be added. The positive electrode in the energy storage element 1 includes the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$) as the positive electrode active material.

Here, the positive electrode active material using a complex oxide using three components of nickel (Ni), manganese (Mn), and cobalt (Co) enables a higher output of the energy storage element. When the complex oxide is used, however, cobalt is used in the positive electrode active material. This causes oxidation and decomposition of the non-aqueous electrolyte in the positive electrode. As a result, the non-aqueous electrolyte deteriorates, reducing the battery performance.

As a result of extensive research and studies, the present inventors found out that by adding a predetermined amount of the first additive and a predetermined amount of the second additive to the non-aqueous electrolyte 6, oxidation and decomposition of the non-aqueous electrolyte 6 can be significantly suppressed in the positive electrode active material using the lithium transition metal oxide in which the ratio of cobalt is adjusted to 10 to 34%. Thus, the present inventors found out that the performance of the energy storage element 1 such as high temperature preservation properties can be efficiently improved by significantly suppressing deterioration of the non-aqueous electrolyte 6 caused by the positive electrode active material. For this reason, the energy storage element 1 enables efficiently improved performance such as high temperature preservation properties when the energy storage element 1 includes the positive electrode having the positive electrode active material containing the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$), and a predetermined amount of the first additive and a predetermined amount of the second additive are added to the non-aqueous electrolyte 6.

The lithium transition metal oxide contained in the positive electrode as the positive electrode active material is preferably represented by $Li_xNi_{(1-y)/2}Mn_{(1-y)/2}Co_yO_2$ (wherein $1.1 \leq x \leq 1.2$, and $0.1 \leq y \leq 0.34$). Namely, the positive electrode preferably includes the lithium transition metal oxide as the positive electrode active material wherein Ni and Mn have the same ratio. Thus, when Ni and Mn in the positive electrode active material have the same ratio, the positive electrode active material has higher stability of the crystal structure. For this reason, an energy storage element 1 having high cycle performance and preservation performance can be achieved.

Moreover, according to the method of producing the energy storage element 1 according to Modification 2, the non-aqueous electrolyte 6 having a predetermined amount of the first additive and a predetermined amount of the second additive added thereto is injected into the energy storage element 1 including the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$), and the energy storage element 1 is pre-charged more than once before sealing the non-aqueous electrolyte injection hole. Here, the present inventors found out that the performance of the energy storage element such as high temperature preservation properties can be efficiently improved by pre-charging the energy storage element 1 more than once before sealing the electrolyte injection hole 31 in the state where the energy storage element 1 has the non-aqueous electrolyte 6 injected thereinto. For this reason, the method of producing the energy storage element 1 enables production of the energy storage element 1 whose performance such as high temperature preservation properties can be efficiently improved by pre-charging the energy storage element more than once before sealing the non-aqueous electrolyte injection hole.

The present invention can be realized not only as the energy storage element 1 or method of producing the energy storage element 1 as above, but also as the non-aqueous electrolyte 6 having the first additive and the second additive added thereto and used in the energy storage element 1 including the positive electrode including the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$) as the positive electrode active material.

As above, the energy storage element 1 and its production method according to Embodiment and its Modifications have been described, but the present invention will not be limited to Embodiment, its Modifications, and Examples.

Namely, Embodiment, its Modifications, and Examples disclosed here are only exemplified in all respects, and should not be construed as limiting the present invention. It is intended that the scope of the present invention is specified by the scope of claims not by the description above, and meaning equivalent to the scope of claims and all modifications within the scope are included.

Moreover, Embodiment and its Modifications may be arbitrarily combined. For example, Modification 1 and Modification 2 above may be combined. Namely, in the energy storage element 1 according to Embodiment, the non-graphitizable carbon having an average particle size D50 of 6 μm or less (hard carbon) may be used as the negative electrode active material, and the lithium transition metal oxide represented by $Li_xCo_yNi_zMn_{(1-y-z)}O_2$ (wherein $0.95 \leq x \leq 1.2$, $0.1 \leq y \leq 0.34$, $0<z$, and $1-y-z>0$) may be used as the positive electrode active material. This also provides the same effect as those in Embodiment and Modifications 1 and 2.

Although only the exemplary embodiment of the present invention has been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be applied to energy storage elements such as lithium ion secondary batteries that can

The invention claimed is:

1. An energy storage element comprising: a positive electrode including a substance that occludes and releases lithium ions, a negative electrode including a substance that occludes and releases lithium ions, and a non-aqueous electrolyte,
wherein the non-aqueous electrolyte contains:
lithium difluorobis(oxalato)phosphate that is a first additive represented by Formula (1):

[Formula 1]

$$\mathrm{Li}^+ \left[ \begin{array}{c} \text{structure} \end{array} \right]^- \quad (1)$$

and
lithium tetrafluorooxalatophosphate that is a second additive represented by Formula (2):

[Formula 2]

$$\mathrm{Li}^+ \left[ \begin{array}{c} \text{structure} \end{array} \right]^- \quad (2)$$

and
an amount of the first additive to be added is not less than 0.3% by weight and not more than 1.0% by weight based on a total weight of the non-aqueous electrolyte, and an amount of the second additive to be added is not less than 0.05 times and not more than 0.3 times the amount of the first additive to be added; and
the positive electrode includes a lithium transition metal oxide represented by $\mathrm{Li}_x\mathrm{Co}_y\mathrm{Ni}_z\mathrm{Mn}_{(1-y-z)}\mathrm{O}_2$ as a positive electrode active material wherein $0.95 \leq x \leq 1.2$, $0.1 \leq y \leq 0.34$, $0 < z$, and $1-y-z > 0$.

2. The energy storage element according to claim 1, wherein the negative electrode includes a non-graphitizable carbon having an average particle size D50 of 6 μm or less as a negative electrode active material.

3. The energy storage element according to claim 2, wherein the non-graphitizable carbon has an average particle size D50 of 2 μm or more.

4. The energy storage element according to claim 1, wherein the lithium transition metal oxide is represented by $\mathrm{Li}_x\mathrm{Ni}_{(1-y)/2}\mathrm{Mn}_{(1-y)/2}\mathrm{Co}_y\mathrm{O}_2$ wherein $1.1 \leq x \leq 1.2$, and $0.1 \leq y \leq 0.34$.

5. The energy storage element according to claim 1, wherein the lithium transition metal oxide is represented by $\mathrm{Li}_x\mathrm{Ni}_{(1-y)/2}\mathrm{Mn}_{(1-y)/2}\mathrm{Co}_y\mathrm{O}_2$ wherein $1.1 \leq x \leq 1.2$, and $0.1 \leq y \leq 0.3$.

6. A method of producing an energy storage element including a positive electrode including a substance that occludes and releases lithium ions, a negative electrode including a substance that occludes and releases lithium ions, and a non-aqueous electrolyte, the method comprising:
injecting the non-aqueous electrolyte into the energy storage element, the non-aqueous electrolyte having lithium difluorobis(oxalato)phosphate and lithium tetrafluorooxalatophosphate added, the lithium difluorobis(oxalato)phosphate being a first additive represented by Formula (3):

[Formula 3]

$$\mathrm{Li}^+ \left[ \begin{array}{c} \text{structure} \end{array} \right]^- \quad (3)$$

and
the lithium tetrafluorooxalatophosphate being a second additive represented by Formula (4):

[Formula 4]

$$\mathrm{Li}^+ \left[ \begin{array}{c} \text{structure} \end{array} \right]^- \quad (4)$$

and;
pre-charging the energy storage element more than once before sealing a non-aqueous electrolyte injection hole, the energy storage element having the injected non-aqueous electrolyte,
wherein in the non-aqueous electrolyte that is injected into the energy storage, an amount of the first additive is not less than 0.3% by weight and not more than 1.0% by weight based on a total weight of the non-aqueous electrolyte and an amount of the second additive is not less than 0.05 times and not more than 0.3 times the amount of the first additive; and
the positive electrode includes a lithium transition metal oxide represented by $\mathrm{Li}_x\mathrm{Co}_y\mathrm{Ni}_z\mathrm{Mn}_{(1-y-z)}\mathrm{O}_2$ as a positive electrode active material wherein $0.95 \leq x \leq 1.2$, $0.1 \leq y \leq 0.34$, $0 < z$, and $1-y-z > 0$.

7. The method of producing an energy storage element according to claim 6,
wherein the non-aqueous electrolyte having the first additive and the second additive is injected into the energy storage element including the negative electrode including a non-graphitizable carbon having an average particle size D50 of 6 μm or less as a negative electrode active material.

8. The method of producing an energy storage element according to claim 6,
wherein the lithium transition metal oxide is represented by $\mathrm{Li}_x\mathrm{Ni}_{(1-y)/2}\mathrm{Mn}_{(1-y)/2}\mathrm{Co}_y\mathrm{O}_2$ wherein $1.1 \leq x \leq 1.2$, and $0.1 \leq y \leq 0.3$.

9. A non-aqueous electrolyte for an energy storage element including a positive electrode including a substance that occludes and releases lithium ions, a negative electrode including a substance that occludes and releases lithium ions, and a non-aqueous electrolyte, wherein the non-aqueous electrolyte contains:
lithium difluorobis(oxalato)phosphate that is a first additive represented by Formula (5):

[Formula 5]

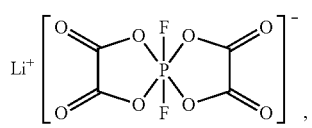
(5)

and
lithium tetrafluorooxalatophosphate that is a second additive represented by Formula (6):

[Formula 6]

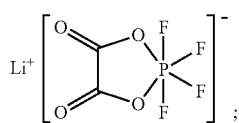
(6)

wherein the amount of the first additive to be added is not less than 0.3% by weight and not more than 1.0% by weight based on a total weight of the non-aqueous electrolyte, and the amount of the second additive to be added is not less than 0.05 times and not more than 0.3 times the amount of the first additive to be added; and the non-aqueous electrolyte is used in the energy storage element including the positive electrode including a lithium transition metal oxide represented by $Li_xCo_yNi_zMn_{(1-y-z)}O_2$ as a positive electrode active material wherein $0.95 \leq x \leq 1.2$, $0.1 \leq y \leq 0.34$, $0 < z$, and $1-y-z > 0$.

10. The non-aqueous electrolyte according to claim 9,
wherein the non-aqueous electrolyte is used in the energy storage element including the negative electrode including a non-graphitizable carbon having an average particle size D50 of 6 μm or less as a negative electrode active material.

11. The non-aqueous electrolyte according to claim 9,
wherein the lithium transition metal oxide is represented by $Li_xNi_{(1-y)/2}Mn_{(1-y)/2}Co_yO_2$ wherein $1.1 \leq x \leq 1.2$, and $0.1 \leq y \leq 0.3$.

* * * * *

UNITED STATES PATENT AND TRADEMARK OFFICE
CERTIFICATE OF CORRECTION

PATENT NO. : 8,986,881 B2
APPLICATION NO. : 13/739170
DATED : March 24, 2015
INVENTOR(S) : Kako et al.

Page 1 of 1

It is certified that error appears in the above-identified patent and that said Letters Patent is hereby corrected as shown below:

In the Claims

Column 50, Lines 9 to 10, (Claim 9), delete

"$Li_x\text{-}Co_yNi_zMn_{(1-y-z)}O_2$" and insert --$Li_xCo_yNi_zMn_{(1-y-z)}O_2$--.

Signed and Sealed this
Eighth Day of September, 2015

Michelle K. Lee
*Director of the United States Patent and Trademark Office*